United States Patent
Katsumata et al.

(10) Patent No.: US 11,533,348 B2
(45) Date of Patent: *Dec. 20, 2022

(54) INFORMATION PROCESSING APPARATUS, INFORMATION PROCESSING METHOD, AND PROGRAM

(71) Applicant: SONY GROUP CORPORATION, Tokyo (JP)

(72) Inventors: Mitsuru Katsumata, Tokyo (JP); Toshiya Hamada, Saitama (JP); Naotaka Ojiro, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 159 days.

This patent is subject to a terminal disclaimer.

(21) Appl. No.: 17/040,252

(22) PCT Filed: Dec. 26, 2018

(86) PCT No.: PCT/JP2018/047793
§ 371 (c)(1),
(2) Date: Sep. 22, 2020

(87) PCT Pub. No.: WO2019/187434
PCT Pub. Date: Oct. 3, 2019

(65) Prior Publication Data
US 2021/0021656 A1   Jan. 21, 2021

(30) Foreign Application Priority Data
Mar. 29, 2018 (JP) .............................. JP2018-065013

(51) Int. Cl.
*H04N 21/233* (2011.01)
*H04N 21/235* (2011.01)
*H04N 21/236* (2011.01)
*H04N 21/84* (2011.01)
*H04L 65/613* (2022.01)
*H04L 65/75* (2022.01)
*H04L 67/02* (2022.01)

(52) U.S. Cl.
CPC .......... *H04L 65/613* (2022.05); *H04L 65/764* (2022.05); *H04N 21/233* (2013.01);
(Continued)

(58) Field of Classification Search
CPC ..... H04L 65/613; H04L 65/764; H04L 67/02; H04N 21/233; H04N 21/2353;
(Continued)

(56) References Cited

U.S. PATENT DOCUMENTS

2011/0311207 A1   12/2011   Urabe et al.
2012/0002947 A1*  1/2012   Rhyu ............... H04N 21/23892
                                            386/248
2017/0092280 A1*  3/2017   Hirabayashi ......... H04N 21/439

FOREIGN PATENT DOCUMENTS

EP        3151240 A1    4/2017
WO    WO 2015/182491 A1  12/2015
(Continued)

OTHER PUBLICATIONS

ISO/IEC, Information technology—Coding of audio-visual objects—Part 12: ISO base media file format, Oct. 1, 2005, pp. i-84.
(Continued)

*Primary Examiner* — Kunal Langhnoja
(74) *Attorney, Agent, or Firm* — Paratus Law Group, PLLC

(57) ABSTRACT

There are provided an information processing apparatus, an information processing method, and a program. The information processing apparatus includes a generating unit configured to generate a content file including object selection information for selecting object audio data in accordance with a display state of an image, in which the generating unit stores the object selection information in a metadata file included in the content file.

16 Claims, 62 Drawing Sheets

(52) U.S. Cl.
CPC ... *H04N 21/2353* (2013.01); *H04N 21/23614* (2013.01); *H04N 21/84* (2013.01); *H04L 67/02* (2013.01)

(58) Field of Classification Search
CPC ............. H04N 21/23614; H04N 21/84; H04N 21/235; H04N 21/2668
See application file for complete search history.

(56) References Cited

FOREIGN PATENT DOCUMENTS

| WO | WO-2015182491 A1 * | 12/2015 | ............. G06F 13/00 |
|---|---|---|---|
| WO | WO 2016/084592 A1 | 6/2016 | |
| WO | WO 2017/035376 A2 | 3/2017 | |

OTHER PUBLICATIONS

ISO/IEC JTC 1, Information technology—Dynamic adaptive streaming over HTTP (DASH)—Part 1: Media presentation description and segment formats, Amendment 4: Segment Independent SAP Signalling (SISSI), MPD chaining, MPD reset and other extensions, Oct. 23, 2015, pp. i-51.

ISO/IEC JTC 1, Information technology—High efficiency coding and media delivery in heterogeneous environments—Part 3: 3D audio, Amendment 2: MPEG-H 3D Audio File Format Support, Feb. 20, 2015, pp. i-14.

* cited by examiner

FIG. 19

| value | description |
|---|---|
| direction_azimuth | azimuth INFORMATION FOR INDICATING DIRECTION OF CLIPPED IMAGE. INDICATED WITH ANGLE. |
| direction_elevation | elevation INFORMATION FOR INDICATING DIRECTION OF CLIPPED IMAGE. INDICATED WITH ANGLE. |
| clipping_azimuth_range | INDICATE ANGLE OF VIEW OF CLIPPED IMAGE. SEPARATE BY "-", AND INDICATE MINIMUM AND MAXIMUM OF azimuth_range. (E.G. "0-10" INDICATES 0 DEGREES TO 10 DEGREES) |
| clipping_elevation_range | INDICATE ANGLE OF VIEW OF CLIPPED IMAGE. SEPARATE BY "-", AND INDICATE MINIMUM AND MAXIMUM OF elevation_range. (E.G. "0-10" INDICATES 0 DEGREES TO 10 DEGREES) |
| viewing_azimuth_range | INDICATE VIEWING ANGLE OF VIEW. SEPARATE BY "-", AND INDICATE MINIMUM AND MAXIMUM OF azimuth_range. (E.G. "0-10" INDICATES 0 DEGREES TO 10 DEGREES) |
| viewing_elevation_range | INDICATE VIEWING ANGLE OF VIEW. SEPARATE BY "-", AND INDICATE MINIMUM AND MAXIMUM OF elevation_range. (E.G. "0-10" INDICATES 0 DEGREES TO 10 DEGREES) |
| AdaptationSet_list | LIST OF AdaptationSet INCLUDING OBJECT AUDIO DATA TO BE REPRODUCED. adaptationSet@id IS DESCRIBED WHILE THEY ARE SEPARATED BY SPACE. |

FIG. 20

```
1   <MPD><Period>
2   
3   <Preselection id="1" preselectionComponents="o2 o3"> // COMBINATION OF default
4   <SupplementalProperty schemeIdUri="urn:mpeg:dash:objectAudio:objectSelection" value="0,0,0-30,0-15,0-10,0-5, o4"/> // (1)
5   <SupplementalProperty schemeIdUri="urn:mpeg:dash:objectAudio:objectSelection" value="0,0,0-30,0-15,60-180,30-90, o1 o2"/> // (2)
6   <SupplementalProperty schemeIdUri="urn:mpeg:dash:objectAudio:objectSelection" value="0,0,30-90,15-90,0-20,0-10", o4"/> // (3)
7   <SupplementalProperty schemeIdUri="urn:mpeg:dash:objectAudio:objectSelection" value="0,0,30-90,15-90,100-180,50-90, o1 o2"/> // (4)
8   </Preselection>
9   
10  <AdaptationSet id="o1" > <Representation><BaseURL> file1-1 </BaseURL></Representation></AdaptationSet>
11  <AdaptationSet id="o2" > <Representation><BaseURL> file2-1 </BaseURL></Representation></AdaptationSet>
12  <AdaptationSet id="o3" > <Representation><BaseURL> file3-1 </BaseURL></Representation></AdaptationSet>
13  <AdaptationSet id="o4" > <Representation><BaseURL> file4-1 </BaseURL></Representation></AdaptationSet>
14  
15  </Period></MPD>
```

FIG.21

| DIRECTION INFORMATION (direction_azimuth, direction_elevation) | CLIPPING ANGLE OF VIEW INFORMATION (clipping_azimuth_range, clipping_elevation_range) | VIEWING ANGLE OF VIEW INFORMATION (viewing_azimuth_range, viewing_elevation_range) | UTILIZATION INFORMATION (AdaptationSet_list) | CORRESPONDING SupplementProperty |
|---|---|---|---|---|
| 0,0 | 0~30,0~15 | 0~10,0~5 | o4 | (1) |
|  |  | 10~60,5~30 | o2,o3 | NONE (default) |
|  |  | 60~180,30~90 | o1,o2 | (2) |
|  | 30~90,15~90 | 0~20, 0~10 | o4 | (3) |
|  |  | 20~100,5~50 | o2,o3 | NONE (default) |
|  |  | 100~180,50~90 | o1,o2 | (4) |
| OTHER THAN ABOVE |  |  | o2,o3 | NONE (default) |

FIG.23

```
1   <MPD><Period>
2
3   <Preselection id="1" preselectionComponents="o1 o2">
4     <SupplementalProperty schemeIdUri="urn:mpeg:dash:objectAudio:objectSelection" value="0,0,0-30,0-15,60-180,30-90"/> // (2)
5     <SupplementalProperty schemeIdUri="urn:mpeg:dash:objectAudio:objectSelection" value="0,0,30-90,15-90,100-180,50-90"/> // (4)
6   </Preselection>
7   <Preselection id="2" preselectionComponents="o3 o2"/> // default
8   <Preselection id="3" preselectionComponents="o4">
9     <SupplementalProperty schemeIdUri="urn:mpeg:dash:objectAudio:objectSelection" value="0,0,0-30,0-15,0-10,0-5"/> // (1)
10    <SupplementalProperty schemeIdUri="urn:mpeg:dash:objectAudio:objectSelection" value="0,0,30-90,15-90,0-20,0-10"/> //(3)
11  </Preselection>
12
13  <AdaptationSet id="o1"> <Representation><BaseURL> file1-1 </BaseURL></Representation></AdaptationSet>
14  <AdaptationSet id="o2"> <Representation><BaseURL> file2-1 </BaseURL></Representation></AdaptationSet>
15  <AdaptationSet id="o3"> <Representation><BaseURL> file3-1 </BaseURL></Representation></AdaptationSet>
16  <AdaptationSet id="o4"> <Representation><BaseURL> file4-1 </BaseURL></Representation></AdaptationSet>
17
18  </Period></MPD>
```

FIG.24

| value | description |
|---|---|
| object1_azimuth | azimuth INFORMATION OF FIRST OBJECT FOR CALCULATING ANGLE. |
| object1_elevation | elevation INFORMATION OF FIRST OBJECT FOR CALCULATING ANGLE. |
| object2_azimuth | azimuth INFORMATION OF SECOND OBJECT FOR CALCULATING ANGLE. |
| object2_elevation | elevation INFORMATION OF SECOND OBJECT FOR CALCULATING ANGLE. |
| threshold_range | INDICATE RANGE OF ANGLE UPON VIEWING object1 and object2. (E.G. "0-10" INDICATES 0 DEGREES TO 10 DEGREES) |
| AdaptationSet_list | LIST OF AdaptationSet INCLUDING OBJECT AUDIO DATA TO BE REPRODUCED. adaptationSet@id IS DESCRIBED WHILE THEY ARE SEPARATED BY SPACE. |

FIG.25

```
1    <MPD><Period>
2    <Preselection id="1" preselectionComponents="o2 o3"> // COMBINATION OF default
3    <SupplementalProperty schemeIdUri="urn:mpeg:dash:objectAudio:objectSelectionAngle" value="23.0,-23.0,0.0-30,o4"/> //(1)
4    <SupplementalProperty schemeIdUri="urn:mpeg:dash:objectAudio:objectSelectionAngle" value="-30.0,-15.0,30-180,o1 o2"/> //(2)
5    </Preselection>
6
7    <AdaptationSet id="o1"> <Representation><BaseURL>file1-1</BaseURL></Representation></AdaptationSet>
8    <AdaptationSet id="o2"> <Representation><BaseURL>file2-1</BaseURL></Representation></AdaptationSet>
9    <AdaptationSet id="o3"> <Representation><BaseURL>file3-1</BaseURL></Representation></AdaptationSet>
10   <AdaptationSet id="o4"> <Representation><BaseURL>file4-1</BaseURL></Representation></AdaptationSet>
11
12   </Period></MPD>
```

FIG.26

| POSITION INFORMATION OF FIRST OBJECT (object1_azimuth, object1_elevation) | POSITION INFORMATION OF SECOND OBJECT (object2_azimuth, object2_elevation) | ANGLE INFORMATION (DEGREES) (threshold_range) | UTILIZATION INFORMATION (AdaptationSet_list) | CORRESPONDING SupplementProperty |
|---|---|---|---|---|
| 23,0 | −23,0 | 0~30 | o4 | (1) |
| −30,0 | −15,0 | 30~180 | o1,o2 | (2) |

FIG.28

```
1   <MPD><Period>
2
3   <Preselection id="1" preselectionComponents="o2 o3">
4   <SupplementalProperty schemeIdUri="urn:mpeg:dash:objectAudio:objectMetadataFile" value="m1"/> // LINK TO FILE STORED ONLY OBJECT METADATA
5   <SupplementalProperty schemeIdUri="urn:mpeg:dash:objectAudio:objectSelectionAngle" value="m:1,3,4,0,-30,o4"/> // THIRD AND FOURTH OBJECT META OF m1
6   <SupplementalProperty schemeIdUri="urn:mpeg:dash:objectAudio:objectSelectionAngle" value="m:1,1,2,30,-180,o1 o2"/> // FIRST AND SECOND OBJECT META OF m1
7   </Preselection>
8
9   <AdaptationSet id="o1"> <Representation><BaseURL> file1-1 </BaseURL></Representation></AdaptationSet>
10  <AdaptationSet id="o2"> <Representation><BaseURL> file2-1 </BaseURL></Representation></AdaptationSet>
11  <AdaptationSet id="o3"> <Representation><BaseURL> file3-1 </BaseURL></Representation></AdaptationSet>
12  <AdaptationSet id="o4"> <Representation><BaseURL> file4-1 </BaseURL></Representation></AdaptationSet>
13
14  <AdaptationSet id="m1"> <Representation><BaseURL> meta1 </BaseURL></Representation></AdaptationSet>
15
16  </Period></MPD>
```

FIG.31

```
1   // DEFINITION OF SampleEntry OF metadata file
2   A3AMetadataSampleEntry() extends MetadataSampleEntry('a3am') {
3     unsigned int(8) num_reference_streamID;  // NUMBER OF OBJECT FILES OF METADATA INCLUDED
4     for(i=0; i< num_reference_streamID; i++){ // ALSO INDICATE ORDER OF METADATA INCLUDED IN sample
5       unsigned int(8) reference_streamID;
6     }
7   }
8
9   // DEFINITION OF sample format
10  // 3da_meta_data IS STORED IN ORDER OF OBJECT FILE INDICATED IN SampleEntry
11  aligned class sample {
12    for(i=0; i< num_reference_streamID; i++){
13      unsigned int(32) size;
14      unsigned int(size*8) 3da_meta_data; // METADATA OF OBJECT FOR EACH FILE
15    }
16  }
```

FIG.33

```
1   // DEFINITION OF SampleEntry OF metadata file
2   A3AMetadataSampleEntry() extends MetadataSampleEntry('a3am') {
3     unsigned int(8) num_reference_streamID;   // NUMBER OF OBJECT FILES OF METADATA INCLUDED
4     for(i=0; K num_reference_streamID; i++){  // ALSO INDICATE ORDER OF METADATA INCLUDED IN sample
5       unsigned int(8) reference_streamID;
6     }
7     objectSelectionMetadataConfigurationBox();
8   }
9
10  // DEFINITION OF sample format
11  // 3da_meta_data IS STORED IN ORDER OF OBJECT FILE INDICATED IN SampleEntry
12  aligned class sample {
13    for(i=0; K num_reference_streamID; i++){
14      unsigned int(32) size;
15      unsigned int(size*8) 3da_meta_data();  // METADATA OF OBJECT FOR EACH FILE
16    }
17    if(IN CASES WHERE objectSelectionMetadataConfigurationBox EXISTS){
18      unsigned int(32) size2;
19      unsigned int(size2*8) objectSelectionMetadata();
20    }
21  }
```

FIG.35

```
1  // DEFINITION OF SampleEntry OF object selection metadata file
2  A3AObjectSelectionMetadataSampleEntry() extends MetadataSampleEntry('a3az'){
3      objectSelectionMetadataConfigurationBox();
4  }
5
6  // DEFINITION OF sample format
7  aligned class sample {
8      unsigned int(32) size2;
9      unsigned int(size2*8) objectSelectionMetadata();
10 }
```

FIG.36

```
1   aligned(8) class objectSelectionMetadataConfigurationBox extends FullBox('zmmC') {
2       unsigned int(8) object_id_num;
3       for(i=0; i<object_id_num; i++){
4           unsigned int(8) object_id;
5           unsigned int(8) stream_id;
6           unsigned int(8) object_num_in_stream;
7       }
8       unsigned int(8) default_object_num;
9       for(j=0; j<default_object_num; j++){
10          unsigned int(8) default_object_id;
11      }
12  }
```

FIG.37

| value | description |
|---|---|
| object_id_num | NUMBER OF object_id INCLUDING IN THIS metadata |
| object_id | object id UTILIZED IN metadata |
| stream_id | stream id INCLUDING OBJECT AUDIO DATA OF OBJECT INDICATED WITH object id |
| object_num_in_stream | INDICATE WHAT NUMBER OF OBJECT DATA IN stream IS OBJECT AUDIO DATA OF OBJECT INDICATED WITH object id |
| default_object_num | NUMBER OF OBJECTS TO BE UTILIZED IN STATE OF default |
| default_object_id | id OF OBJECTS TO BE UTILIZED IN STATE OF default |

FIG.38

```
1   aligned(8) class objectSelectionMetadata{
2     unsigned int(8) mixed_object_list_num;
3     for(i=0; i<mixed_object_list_num; i++){
4       signed int(32) direction_azimuth;
5       signed int(32) direction_elevation;
6       unsigned int(32) min_clipping_azimuth_range;
7       unsigned int(32) max_clipping_azimuth_range;
8       unsigned int(32) min_clipping_elevation_range;
9       unsigned int(32) max_clipping_elevation_range;
10      unsigned int(32) min_viewing_azimuth_range;
11      unsigned int(32) max_viewing_azimuth_range;
12      unsigned int(32) min_viewing_elevation_range;
13      unsigned int(32) max_viewing_elevation_range;
14      unsigned int(8) object_num;
15      for(j=0;j<object_num;j++){
16        unsigned int(8) object_id
17      }
18    }
19  }
```

FIG.39

| value | description |
|---|---|
| mixed_object_list_num | NUMBER OF OBJECT LISTS THAT CAN BE INTEGRATED |
| direction_azimuth | azimuth INFORMATION FOR INDICATING DIRECTION. INDICATED WITH ANGLE. RANGE OF VALUE IS -180*2$^{16}$ to 180*2$^{16}$-1 |
| direction_elevation | elevation INFORMATION FOR INDICATING DIRECTION. INDICATED WITH ANGLE. RANGE OF VALUE IS -90*2$^{16}$ to 90*2$^{16}$ |
| min_clipping_azimuth_range max_clipping_azimuth_range | INDICATE MINIMUM VALUE (MAXIMUM VALUE) OF ANGLE OF VIEW OF CLIPPED IMAGE. RANGE OF VALUE IS 0 to 360*2$^{16}$ |
| min_clipping_elevation_range max_clipping_elevation_range | INDICATE MINIMUM VALUE (MAXIMUM VALUE) OF ANGLE OF VIEW OF CLIPPED IMAGE. RANGE OF VALUE IS 0 to 180*2$^{16}$ |
| min_viewing_azimuth_range max_viewing_azimuth_range | INDICATE MINIMUM VALUE (MAXIMUM VALUE) OF ANGLE OF VIEW UPON VIEWING. RANGE OF VALUE IS 0 to 360*2$^{16}$ |
| min_viewing_elevation_range max_viewing_elevation_range | INDICATE MINIMUM VALUE (MAXIMUM VALUE) OF ANGLE OF VIEW UPON VIEWING. RANGE OF VALUE IS 0 to 180*2$^{16}$ |
| object_num | NUMBER OF OBJECTS TO BE UTILIZED |
| object_id | id OF OBJECTS TO BE UTILIZED |

FIG.40

```
1    unsigned int(8) del_object_num;
2        for(j=0;j< del_object_num;j++){
3            unsigned int(8) del_object_id
4        }
5    unsigned int(8) add_object_num;
6        for(j=0;j< add_object_num;j++){
7            unsigned int(8) add_object_id
8        }
```

FIG.41

| value | description |
|---|---|
| del_object_num | NUMBER OF OBJECTS NOT TO BE UTILIZED FROM default object |
| del_object_id | id OF OBJECTS NOT TO BE UTILIZED FROM default object |
| add_object_num | NUMBER OF OBJECTS TO BE ADDED TO default object |
| add_object_id | id OF OBJECTS TO BE ADDED TO default object |

FIG.42

```
1  aligned(8) class objectSelectionMetadataConfigurationBox extends FullBox('zmmC'){
2    unsigned int(8) default_stream_num;
3    for(i=0; i<default_stream_num; i++){
4      unsigned int(8) default_stream_id;
5    }
6  }
```

FIG.43

| value | description |
|---|---|
| default_stream_num | NUMBER OF streams TO BE UTILIZED IN STATE OF default |
| default_stream_id | id OF streams TO BE UTILIZED IN STATE OF default |

FIG. 44

```
1   aligned(8) class objectSelectionMetadata{
2     unsigned int(8) stream_list_num;
3     for(i=0; i<stream_list_num; i++){
4       signed int(32) direction_azimuth;
5       signed int(32) direction_elevation;
6       unsigned int(32) min_clipping_azimuth_range;
7       unsigned int(32) max_clipping_azimuth_range;
8       unsigned int(32) min_clipping_elevation_range;
9       unsigned int(32) max_clipping_elevation_range;
10      unsigned int(32) min_viewing_azimuth_range;
11      unsigned int(32) max_viewing_azimuth_range;
12      unsigned int(32) min_viewing_elevation_range;
13      unsigned int(32) max_viewing_elevation_range;
14      unsigned int(8) stream_num;
15      for(j=0;j<stream_num;j++){
16        unsigned int(8) stream_id
17      }
18    }
19  }
```

FIG.45

| value | description |
|---|---|
| stream_list_num | NUMBER OF stream LISTS |
| direction_azimuth | azimuth INFORMATION FOR INDICATING DIRECTION. INDICATED WITH ANGLE. RANGE OF VALUE IS $-180*2^{16}$ to $180*2^{16}-1$ |
| direction_elevation | elevation INFORMATION FOR INDICATING DIRECTION. INDICATED WITH ANGLE. RANGE OF VALUE IS $-90*2^{16}$ to $90*2^{16}$ |
| min_clipping_azimuth_range<br>max_clipping_azimuth_range | INDICATE MINIMUM VALUE (MAXIMUM VALUE) OF ANGLE OF VIEW OF CLIPPED IMAGE. RANGE OF VALUE IS 0 to $360*2^{16}$ |
| min_clipping_elevation_range<br>max_clipping_elevation_range | INDICATE MINIMUM VALUE (MAXIMUM VALUE) OF ANGLE OF VIEW OF CLIPPED IMAGE. RANGE OF VALUE IS 0 to $180*2^{16}$ |
| min_viewing_azimuth_range<br>max_viewing_azimuth_range | INDICATE MINIMUM VALUE (MAXIMUM VALUE) OF ANGLE OF VIEW UPON VIEWING. RANGE OF VALUE IS 0 to $360*2^{16}$ |
| min_viewing_elevation_range<br>max_viewing_elevation_range | INDICATE MINIMUM VALUE (MAXIMUM VALUE) OF ANGLE OF VIEW UPON VIEWING. RANGE OF VALUE IS 0 to $180*2^{16}$ |
| stream_num | NUMBER OF streams TO BE UTILIZED |
| stream_id | id OF streams TO BE UTILIZED |

FIG.46

```
1   aligned(8) class objectSelectionMetadata{
2     unsigned int(8) mixed_object_list_num;
3     for(i=0; i<mixed_object_list_num; i++){
4       unsigned int(32) object1_azimuth;
5       unsigned int(32) object1_elevation;
6       unsigned int(32) object2_azimuth;
7       unsigned int(32) object2_elevation;
8       unsigned int(32) threshold_azimuth_range;
9       unsigned int(32) threshold_elevation_range;
10      unsigned int(8) object_num;
11      for(j=0;j< object_num;j++){
12        unsigned int(8) object_id
13      }
14    }
15  }
```

FIG.47

| value | description |
|---|---|
| mixed_object_list_num | NUMBER OF OBJECT LIST THAT CAN BE INTEGRATED |
| object1_azimuth | azimuth INFORMATION OF FIRST OBJECT FOR CALCULATING ANGLE. RANGE OF VALUE IS $-180*2^{16}$ to $180*2^{16}-1$ |
| object1_elevation | elevation INFORMATION OF FIRST OBJECT FOR CALCULATING ANGLE. RANGE OF VALUE IS $-90*2^{16}$ to $90*2^{16}$ |
| object2_azimuth | azimuth INFORMATION OF SECOND OBJECT FOR CALCULATING ANGLE. RANGE OF VALUE IS $-180*2^{16}$ to $180*2^{16}-1$ |
| object2_elevation | elevation INFORMATION OF SECOND OBJECT FOR CALCULATING ANGLE. RANGE OF VALUE IS $-90*2^{16}$ to $90*2^{16}$ |
| threshold_azimuth_range | ANGLE INFORMATION IN HORIZONTAL DIRECTION BETWEEN REFERENCE OBJECTS TO DETERMINE WHETHER TO UTILIZE OBJECT AUDIO DATA BEFORE INTEGRATION OR TO UTILIZE OBJECT AUDIO DATA AFTER INTEGRATION RANGE OF VALUE IS 0 to $180*2^{16}$ |
| threshold_elevation_range | ANGLE INFORMATION IN VERTICAL DIRECTION BETWEEN REFERENCE OBJECTS TO DETERMINE WHETHER TO UTILIZE OBJECT AUDIO DATA BEFORE BEING INTEGRATED OR TO UTILIZE OBJECT AUDIO DATA AFTER BEING INTEGRATED RANGE OF VALUE IS 0 to $180*2^{16}$ |
| object_num | NUMBER OF OBJECTS TO BE UTILIZED |
| object_id | id OF OBJECTS TO BE UTILIZED |

FIG.48

```
1    unsigned int(8) before_object_num;
2       for(j=0;j< before_object_num;j++){
3          unsigned int(8) before_object_id
4       }
5    unsigned int(8) after_object_num;
6       for(j=0;j< after_object_num;j++){
7          unsigned int(8) after_object_id
8       }
```

FIG.49

| value | description |
|---|---|
| before_object_num | NUMBER OF OBJECTS BEFORE BEING REPLACED |
| before_object_id | id OF OBJECTS BEFORE BEING REPLACED |
| after_object_num | NUMBER OF OBJECTS AFTER BEING REPLACED |
| after_object_id | id OF OBJECTS AFTER BEING REPLACED |

FIG.50

```
1   aligned(8) class objectSelectionMetadataConfigurationBox extends
2   FullBox('zmmC'){
3     unsigned int(1) list_is_object;
4     unsigned int(7) sample_type;
5
6     if(list_is_object){
7       unsigned int(8) object_id_num;
8       for(i=0; i<object_id_num; i++){
9         unsigned int(8) object_id;
10        unsigned int(8) stream_id;
11        unsigned int(8) object_num_in_stream;
12      }
13      unsigned int(8) default_object_num;
14      for(i=0; i<default_object_num; i++){
15        unsigned int(8) default_object_id;
16      }
17    }
18    else{
19      unsigned int(8) default_stream_num;
20      for(i=0; i<default_stream_num; i++){
21        unsigned int(8) default_stream_id;
22      }
23    }
24  }
25  }
```

FIG.51

| value | description |
|---|---|
| list_is_object | IN CASE WHERE OBJECTS UTILIZED IN STATE OF default ARE INDICATED WITH LIST OF OBJECT, 1. IN CASE OF LIST OF stream, 0 |
| sample_type | INDICATE TYPE OF metadata FOR SELECTING object INCLUDED IN sample 1: METHOD USING ANGLE OF VIEW. LIST OF OBJECTS 2:... ANY OF objectSelectionMetadata CAN BE SIGNALED |
| object_id_num | NUMBER OF object_id INCLUDED IN THIS metadata |
| object_id | object id UTILIZED IN metadata |
| stream_id | stream id INCLUDING OBJECT DATA OF OBJECT INDICATED WITH object id |
| object_num_in_stream | INDICATE WHAT NUMBER OF OBJECT DATA IN stream IS OBJECT DATA OF OBJECT INDICATED WITH object id |
| default_object_num | NUMBER OF OBJECTS TO BE UTILIZED IN STATE OF default |
| default_object_id | id OF OBJECTS TO BE UTILIZED IN STATE OF default |
| object_num | NUMBER OF streams TO BE UTILIZED IN STATE OF default |
| default_stream_num | id OF streams TO BE UTILIZED IN STATE OF default |

FIG.52

```
1  <MPD><Period>
2  <Preselection id="1" preselectionComponents=" o1 o2")
3  <SupplementalProperty schemaIdUri=" urn:mpeg:dash:objectAudio:objectMetadataFile" value="m1">
4  </Preselection>
5
6  <AdaptationSet id="o1"><Representation><BaseURL> file1-1 </BaseURL></Representation></AdaptationSet>
7  <AdaptationSet id="o2"><Representation><BaseURL> file2-1 </BaseURL></Representation></AdaptationSet>
8  <AdaptationSet id="o3"><Representation><BaseURL> file3-1 </BaseURL></Representation></AdaptationSet>
9  <AdaptationSet id="o4"><Representation><BaseURL> file4-1 </BaseURL></Representation></AdaptationSet>
10
11 <AdaptationSet id="m1">
12 <SupplementalProperty schemaIdUri=" urn:mpeg:dash:objectAudio:objectMetadataStreamID" value="4,1, o1, 2, o2, 3, o3, 4, o4">
13 <Representation id="op">
14 <BaseURL> file-meta </BaseURL>
15 </Representation>
16 </AdaptationSet>
17 </Period></MPD>
```

FIG.53

```
1   <MPD><Period>
2   <Preselection id="1" preselectionComponents=" o1 o2">
3   <SupplementalProperty schemeIdUri="urn:mpeg:dash:objectAudio:objectMetadataFile" value="m1">
4   <SupplementalProperty schemeIdUri="urn:mpeg:dash:objectAudio:objectSelectionMetadataFile" value="m2">
5   </Preselection>
6
7   <AdaptationSet id="o1"> <Representation><BaseURL> file1-1 </BaseURL></Representation></AdaptationSet>
8   <AdaptationSet id="o2"> <Representation><BaseURL> file2-1 </BaseURL></Representation></AdaptationSet>
9   <AdaptationSet id="o3"> <Representation><BaseURL> file3-1 </BaseURL></Representation></AdaptationSet>
10  <AdaptationSet id="o4"> <Representation><BaseURL> file4-1 </BaseURL></Representation></AdaptationSet>
11
12  <AdaptationSet id="m1">
13  <SupplementalProperty schemeIdUri="urn:mpeg:dash:objectAudio:objectMetadataStreamID" value="4,1, o1,2, o2,3, o3,4, o4">
14  <Representation id="op">
15  <BaseURL> file-meta </BaseURL>
16  </Representation>
17
18  <AdaptationSet id="m2">
19  <SupplementalProperty schemeIdUri="urn:mpeg:dash:objectAudio:objectMetadataFile" value="m1">
20  <SupplementalProperty schemeIdUri="urn:mpeg:dash:objectAudio:objectMetadataStreamID" value="4,1, o1,2, o2,3, o3,4, o4">
21  <Representation id="op2">
22  <BaseURL> file-meta2 </BaseURL>
23  </Representation>
24
25  </AdaptationSet>
26  </Period></MPD>
```

FIG. 54

```
1   <MPD><Period>
2   <Preselection id="1" preselectionComponents="o1 o2">
3   <SupplementalProperty schemeIdUri="urn:mpeg:dash:objectAudio:objectMetadataFile" value="m1">
4   <SupplementalProperty schemeIdUri="urn:mpeg:dash:objectAudio:objectSelectionMetadataFile" value="m2">
5   </Preselection>
6
7   <AdaptationSet id="o1"> <Representation><BaseURL> file1-1 </BaseURL></Representation></AdaptationSet>//INCLUDING OBJECTS (1) and (2)
8   <AdaptationSet id="o2"> <Representation><BaseURL> file2-1 </BaseURL></Representation></AdaptationSet>//INCLUDING OBJECT (3)
9   <AdaptationSet id="o3"> <Representation><BaseURL> file3-1 </BaseURL></Representation></AdaptationSet>//INCLUDING OBJECT (4)
10  <AdaptationSet id="o4"> <Representation><BaseURL> file4-1 </BaseURL></Representation></AdaptationSet>//INCLUDING OBJECT (5)
11
12  <AdaptationSet id="m1">
13  <SupplementalProperty schemeIdUri="urn:mpeg:dash:objectAudio:objectMetadataStreamID" value="4,1, o1,2, o2,3, o3,4, o4">
14  <Representation id="op1">
15  <BaseURL> file-meta </BaseURL>
16  </Representation>
17
18  <AdaptationSet id="m2">
19  <SupplementalProperty schemeIdUri="urn:mpeg:dash:objectAudio:objectMetadataStreamID" value="4,1, o1,2, o2,3, o3,4, o4">
20  <Representation id="op2" associationId ="op1">
21  <BaseURL> file-meta </BaseURL>
22  </Representation>
23
24  </AdaptationSet>
25  </Period></MPD>
26
```

FIG.59

```
1  <MPD><Period>
2
3  <Preselection id="1" preselectionComponents="o1 o2 o3"> // view1
4  <Viewpoint schemeIdUri="urn:mpeg:dash:viewpoint:2011" value="view1"/>
5  <SupplementalProperty schemeIdUri="urn:mpeg:dash:objectAudio:objectSelection" value="90,0.0,-30,0,-15,0,-10,0,-5,o3 o4"/>
6  </Preselection>
7  <Preselection id="2" preselectionComponents="o1 o2 o3"> // view2
8  <Viewpoint schemeIdUri="urn:mpeg:dash:viewpoint:2011" value="view2"/>
9  <SupplementalProperty schemeIdUri="urn:mpeg:dash:objectAudio:objectSelection" value="180,0.0,-30,0,-15,0,-10,0,-5,o2 o5"/>
10 </Preselection>
11
12 <AdaptationSet id="o1"> <Representation><BaseURL> file1-1 </BaseURL></Representation></AdaptationSet>
13 <AdaptationSet id="o2"> <Representation><BaseURL> file2-1 </BaseURL></Representation></AdaptationSet>
14 <AdaptationSet id="o3"> <Representation><BaseURL> file3-1 </BaseURL></Representation></AdaptationSet>
15 <AdaptationSet id="o4"> <Representation><BaseURL> file4-1 </BaseURL></Representation></AdaptationSet>
16 <AdaptationSet id="o5"> <Representation><BaseURL> file5-1 </BaseURL></Representation></AdaptationSet>
17
18 </Period></MPD>
```

FIG.61

```
aligned(8) class MHAMultiStreamBox() extends FullBox('maeM', version=0, 0) {
    unsigned int(1) isMainStream;
    unsigned int(7) thisStreamID;
    if (isMainStream) {
        unsigned int(1) reserved = 0;
        unsigned int(7) mae_numGroups;
        unsigned int(1) reserved = 0;
        unsigned int(7) numAuxiliaryStreams;
        for (i=0; i< mae_numGroups; i++) {
            unsigned int(7) mae_groupID;
            unsigned int(1) isInMainStream;
            if (!isInMainStream) {
                unsigned int(1) reserved = 0;
                unsigned int(7) auxiliaryStreamID;
            }
        }
    }
}
```

FIG.62

| Syntax | No. of Bits | Mnemonic |
|---|---|---|
| 3da_meta_data() {<br>  Scene_Description_Header();<br>  if(number_of_object_signals > 0){<br>    Object_Data() ;<br>  }<br>  if(3da_extertded_dataA){<br>    cnt = 3da_extension_sizeA;<br>    if(cnt == 15)<br>      cnt += 3da_esc_countA;<br>    num_bits_left = 8*cnt;<br>    while (num_bits_left > 2) {<br>      3da_extension_idx;<br>      num_bits_left -= 3;<br>      3da_extension(3da_extension_idx, num_bits_left);<br>    }<br>  }<br>  byte_alignment();<br>} | <br><br><br><br><br><br><br>1<br>4<br><br>8<br><br>3 | <br><br><br><br><br><br><br><br><br><br><br><br>Note1<br><br>Note2 |
| Note1: 3da_extension() shall decrease the variable num_bits_left by the number of bits read from the bitstream within 3da_extension(). The 3da_extension() element is reserved for future use.<br>Note2: This byte_alignment shall be relative to the start of the 3da_meta_data(). | | |

FIG.63

| Syntax | No. of Bits | Mnemonic |
|---|---|---|
| data_stream_element() {  |  |  |
|   element_instance_tag; | 4 | uimsbf |
|   data_byte_align_flag; | 1 | uimsbf |
|   cnt = ciunt; | 8 | uimsbf |
|   if (cnt == 255) |  |  |
|     cnt += esc_count; | 8 | uimsbf |
|   if (data_byte_align_flag) |  |  |
|     byte_alignment(); |  |  |
|   for (i = 0; i < cnt; i++) |  |  |
|     data_stream_byte[element_instance_tag][i] | 8 | uimsbf |
| } |  |  |

FIG.64

| Syntax | No. of Bits | Mnemonic |
|---|---|---|
| 3da_ancillary_data(){<br>  switch(ancillary_data_sync){<br>  case 0xDB6D:<br>    frag_cnt<br>    frag_terminate_flag<br>    if(frag_cnt == 0){<br>      num_of_delay_samples<br>    }<br>    3da_meta_data();<br>    break;<br>  }<br>} | <br><br><br>16<br>7<br>1<br><br>16 | <br><br><br>bslfb<br>bslfb<br>bslfb<br><br>bslfb |

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2018/047793 (filed on Dec. 26, 2018) under 35 U.S.C. § 371, which claims priority to Japanese Patent Application No. 2018-065013 (filed on Mar. 29, 2018), which are all hereby incorporated by reference in their entirety.

FIELD

The present disclosure relates to an information processing apparatus, an information processing method, and a program.

BACKGROUND

In recent years, as a fundamental technology of streaming service on the Internet, moving picture experts group phase-dynamic adaptive streaming over HTTP (MPEG-DASH) is becoming common (see, for example, Non Patent Literature 1).

In delivery of audio content which is performed using MPEG-DASH, adaptive streaming delivery is realized by a delivery server preparing audio data for each object (the data will be referred to as "object audio data"), and a client requesting optimal object audio data in accordance with a condition, or the like, of a transmission path.

Further, as a coding technology for realizing reproduction of higher realistic sensation which surpasses 5.1 channel surround reproduction in related art, and transmission of a plurality of pieces of object audio data, MPEG-H 3D Audio is known (see, for example, Non Patent Literature 2).

CITATION LIST

Non Patent Literature

Non Patent Literature 1: ISO/IEC 23009-1:2014 Information technology—Dynamic adaptive streaming over HTTP (DASH)
Non Patent Literature 2: ISO/IEC 23008-3:2015 Information technology—High efficiency coding and media delivery in heterogeneous environments

SUMMARY

Technical Problem

However, in standards of MPEG-DASH described in Non Patent Literature 1 as described above, it has been impossible to select object audio data to be reproduced for each display state.

Therefore, the present disclosure proposes a new and improved information processing apparatus, information processing method and program which are capable of selecting object audio data in accordance with a display state.

Solution to Problem

According to the present disclosure, an information processing apparatus is provided that includes: a generating unit configured to generate a content file including object selection information for selecting object audio data in accordance with a display state of an image, wherein the generating unit stores the object selection information in a metadata file included in the content file.

Moreover, according to the present disclosure, an information processing method to be executed by an information processing apparatus is provided that includes: generating a content file including object selection information for selecting object audio data in accordance with a display state of an image, wherein the object selection information is stored in a metadata file included in the content file.

Moreover, according to the present disclosure, a program is provided that causes a computer to realize: a function of generating a content file including object selection information for selecting object audio data in accordance with a display state of an image, wherein the object selection information is stored in a metadata file included in the content file.

Advantageous Effects of Invention

As described above, according to the present disclosure, it is possible to select object audio data in accordance with a display state.

Note that the above effects are not necessarily limited, and it is possible to obtain any of effects described in this specification or other effects that can be detected from this specification together with or instead of the above effects.

BRIEF DESCRIPTION OF DRAWINGS

FIG. 19 is a table indicating values to be signaled and detailed description (description) of the respective values.

FIG. 20 is a view illustrating an example of an MPD file to be generated by an MPD file generating unit 114.

FIG. 21 is a table indicating respective pieces of information in the MPD file illustrated in FIG. 20.

FIG. 23 is a view illustrating an example of an MPD file to be generated by an MPD file generating unit 114.

FIG. 24 is a table indicating values to be signaled and detailed description (description) of the respective values.

FIG. 25 is a view illustrating an example of an MPD file to be generated by an MPD file generating unit 114.

FIG. 26 is a table indicating respective pieces of information in the MPD file illustrated in FIG. 25.

FIG. 28 is a view illustrating an example of an MPD file to be generated by an MPD file generating unit 114.

FIG. 31 is a view illustrating a syntax of the metadata file illustrated in FIG. 29 and FIG. 30.

FIG. 33 is a view illustrating a syntax of the extended metadata file.

FIG. 35 is a view illustrating a syntax of the object selection metadata file.

FIG. 36 is a view illustrating an example of objectSelectionMetadataConfigurationBox.

FIG. 37 is a table indicating values of objectSelectionMetadataConfigurationBox illustrated in FIG. 36 and detailed description of the respective values.

FIG. 38 is a view illustrating an example of objectSelectionMetadata.

FIG. 39 is a table indicating values of objectSelectionMetadata illustrated in FIG. 38 and detailed description of the respective values.

FIG. 40 is a view illustrating a modified example of objectSelectionMetadata.

FIG. 41 is a table indicating detailed description of the respective values illustrated in FIG. 40.

FIG. 42 is a view illustrating an example of objectSelectionMetadataConfigurationBox.

FIG. 43 is a table indicating values of objectSelectionMetadataConfigurationBox illustrated in FIG. 42 and detailed description of the respective values.

FIG. 44 is a view illustrating an example of objectSelectionMetadata.

FIG. 45 is a table indicating values of objectSelectionMetadata illustrated in FIG. 44 and detailed description of the respective values.

FIG. 46 is a view illustrating an example of objectSelectionMetadata.

FIG. 47 is a table indicating values of objectSelectionMetadata illustrated in FIG. 46 and detailed description of the respective values.

FIG. 48 is a view illustrating a modified example of objectSelectionMetadata.

FIG. 49 is a table indicating detailed description of the respective values illustrated in FIG. 48.

FIG. 50 is a view illustrating an example of objectSelectionMetadataConfigurationBox.

FIG. 51 is a table indicating values of objectSelectionMetadataConfigurationBox illustrated in FIG. 50 and detailed description of the respective values.

FIG. 52 is a view illustrating an example of an MPD file to be generated.

FIG. 53 is a view illustrating an example of an MPD file to be generated.

FIG. 54 is a view illustrating another example of the MPD file to be generated.

FIG. 59 is a view illustrating an example of an MPD file to be generated in a case where object audio data to be utilized is different depending on a viewing position.

FIG. 61 is a view illustrating a structure of MHAMultiStreamBox.

FIG. 62 is a view illustrating a structure of 3da_meta_data( ).

FIG. 63 is a view illustrating a structure of DSE.

FIG. 64 is a view illustrating a structure of 3da_ancillary_data to be stored in data_stream_byte in DSE.

DESCRIPTION OF EMBODIMENTS

Figure 1:
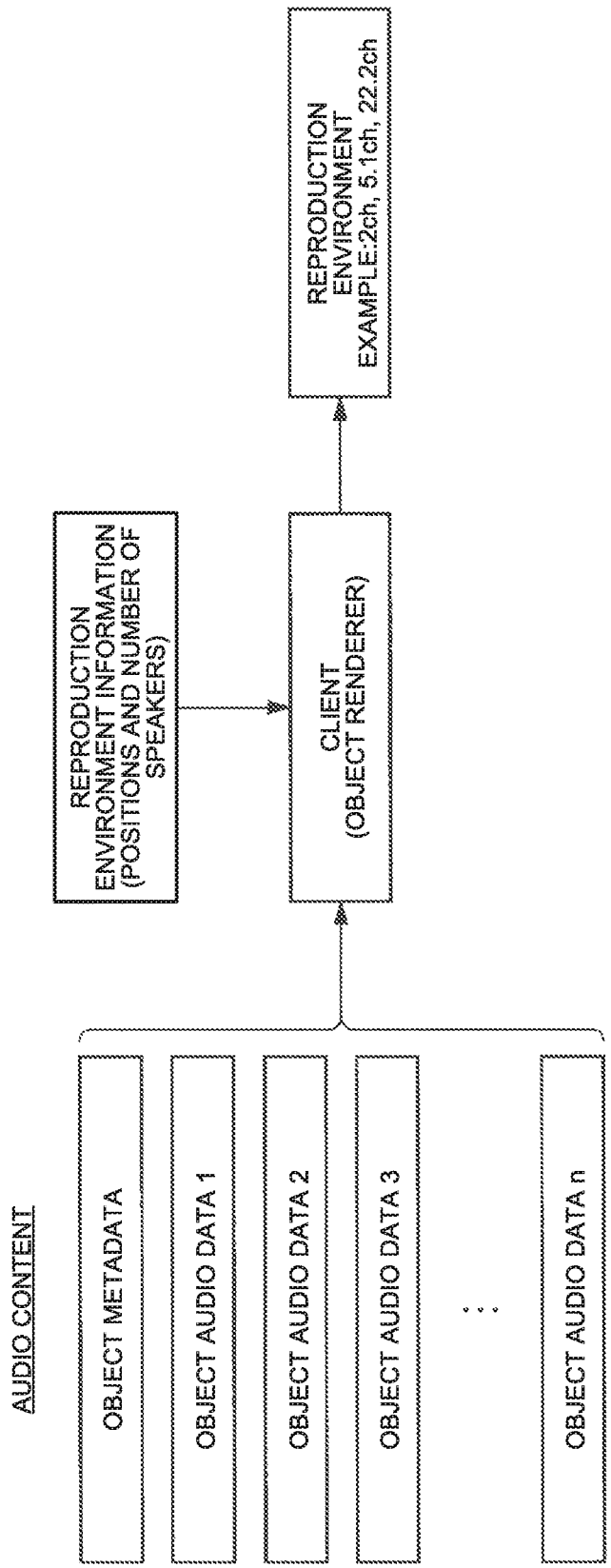
FIG. 1 is an explanatory diagram for explaining background of the present disclosure.

Hereinafter, preferred embodiments of the present disclosure will be described in detail with reference to the accompanying drawings. In this specification and the drawings, components having substantially the same functional configuration are denoted by the same reference numerals, and redundant description is omitted.

Furthermore, in this specification and the drawings, a plurality of components having substantially the same functional configuration will be distinguished by giving the same reference numerals followed by different alphabets in some cases. However, in a case where there is no need to particularly distinguish each of a plurality of components having substantially the same functional configuration, a same reference numeral alone will be attached.

The description will be given in the following order.
<<1. Introduction>>
<<2. Configuration example>>
<<3. Example of object selection information (Example 1)>>
<<4. Example of filing in view of display state (Example 2)>>
<<5. Example of signaling in a case where combination of object audio data does not change over time (Example 3)>>
<<6. Example of signaling in a case where combination of object audio data changes over time (Example 4)>>
<<7. Application example>>
<<8. Hardware configuration example>>
<<9. Conclusion>>

1. Introduction

1-1. Background

Background of the present disclosure will be described first.

MPEG-H 3D Audio is standards which can deal with object audio data which is audio data generated for each object. Audio content is constituted with a plurality of pieces of object audio data which are waveform data of a sound source, and object metadata including information regarding a position of an object, spread of sound, various kinds of effects, or the like.

FIG. 1 is an explanatory diagram for explaining background of the present disclosure. For example, as illustrated in FIG. 1, object metadata and a plurality of pieces of object audio data (in FIG. 1, object audio data 1 to object audio data n are indicated) are provided to a client by a server, or the like. When an object renderer of the client receives the object metadata and the object audio data, the object renderer performs rendering on the basis of reproduction environment information (such as, for example, positions and the number of speakers), and realizes reproduction of audio content by providing waveform data to a reproduction environment such as a speaker.

Figure 2:
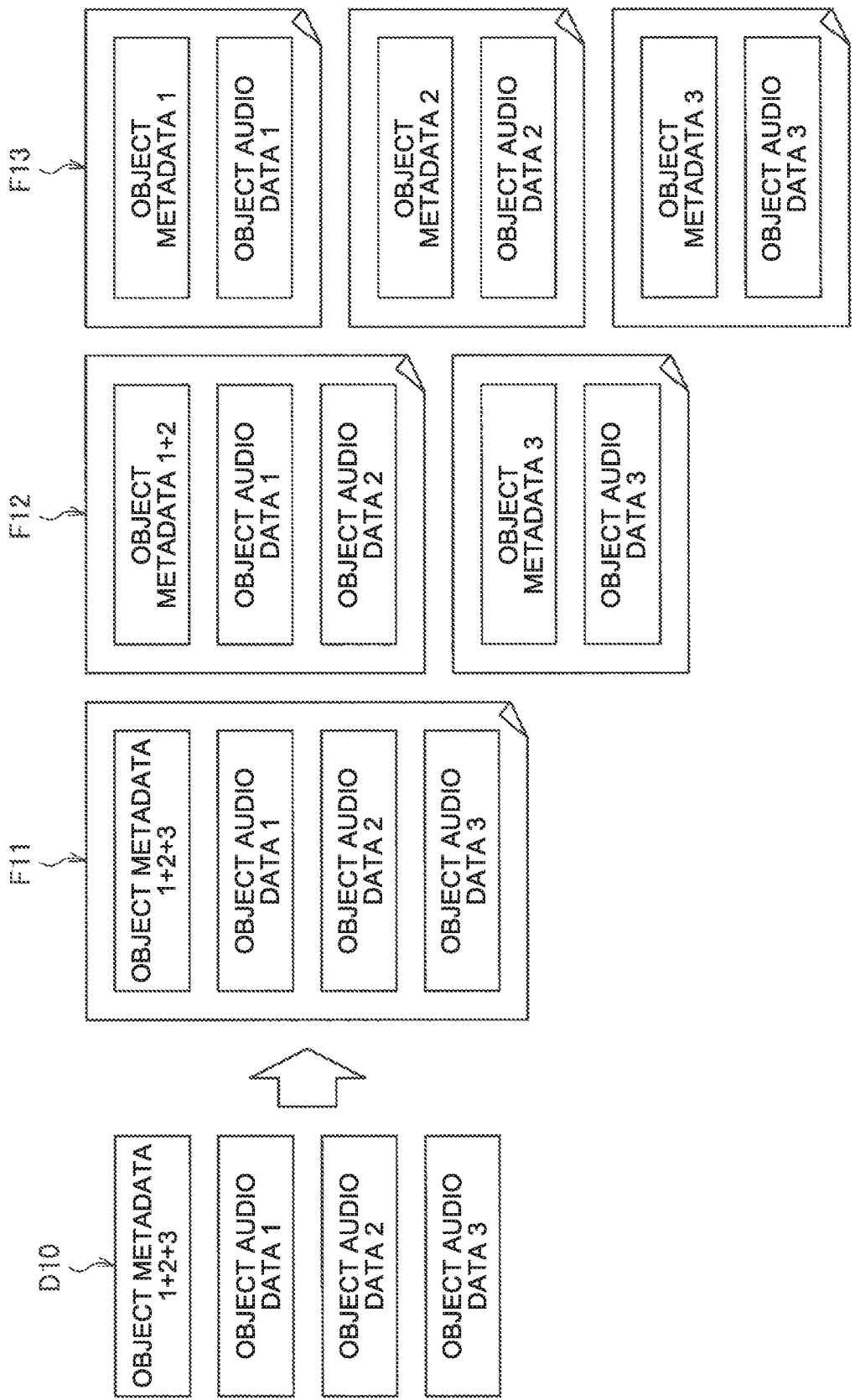
FIG. 2 is an explanatory diagram for explaining background of the present disclosure.

In a case where audio content is provided, the object audio data is stored in an audio file and transmitted to the client. Here, a specific example will be described with reference to FIG. 2. FIG. 2 is an explanatory diagram for explaining background of the present disclosure. In a case where the object audio data 1 to the object audio data 3, and the object metadata corresponding to these data exist as indicated with D10 in FIG. 2, there are roughly three possible patterns of aspects of storage in an audio file as indicated in filing examples F11 to F13.

More specifically, all the data may be stored in one audio file as indicated in the filing example F11, or one or two or more pieces of object audio data and object metadata corresponding to these may be respectively stored in audio files as indicated in the filing example F12. Further, one piece of object audio data and object metadata corresponding to this may be stored in one audio file as indicated in the filing example F13.

Figure 3:
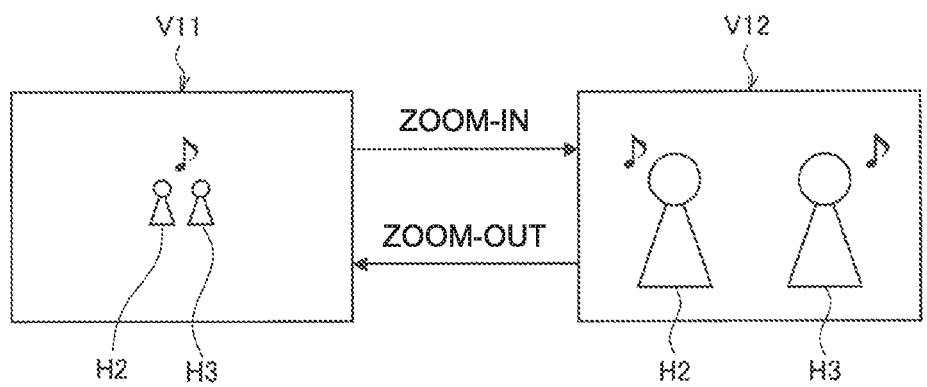
FIG. 3 is an explanatory diagram for explaining relationship between a display state of an image and object audio data.

Here, relationship between a display state of an image and object audio data will be described with reference to FIG. 3. FIG. 3 is an explanatory diagram for explaining relationship between a display state of an image and object audio data.

FIG. 3 illustrates an example where an image in which two vocalists H2 and H3 are singing is displayed in two display states V11 and V12. The display state V11 and the display state V12 can transition to each other through zoom-in and zoom-out, and, if a central portion is zoomed in at the display state V11, the image becomes the display state V12, and if the image is zoomed out at the display state V12, the image becomes the display state V12. Note that zoom-in and zoom-out may be performed through, for example, image clipping processing by the client.

In a case of the display state V11, because the two vocalists H2 and H3 are compactly displayed at the center, even if one of the vocalists is singing or both vocalists are singing, it can be considered that it is sufficient if sound comes from one direction at the center. Meanwhile, in a case of the display state V12, because, from a user, the two vocalists appear to be separated from each other, and the user can clearly distinguish between positions of the respective vocalists, it is desirable that sound comes from a left direction when the left vocalist H2 is singing, and sound comes from a right direction when the right vocalist H3 is singing. Such a state is referred to as a state where sound localization is known.

In MPEG-DASH which is standards for performing streaming service, transmission of object audio data in accordance with the display state as described above is not taken into account, and the object audio data is transmitted regardless of the display state.

For example, in a case where content including an image and audio data as illustrated in FIG. 3 is delivered using MPEG-DASH, the following two methods (which will be respectively referred to as a first comparative method and a second comparative method) as will be described with reference to FIG. 4 can be employed.

Figure 4A:
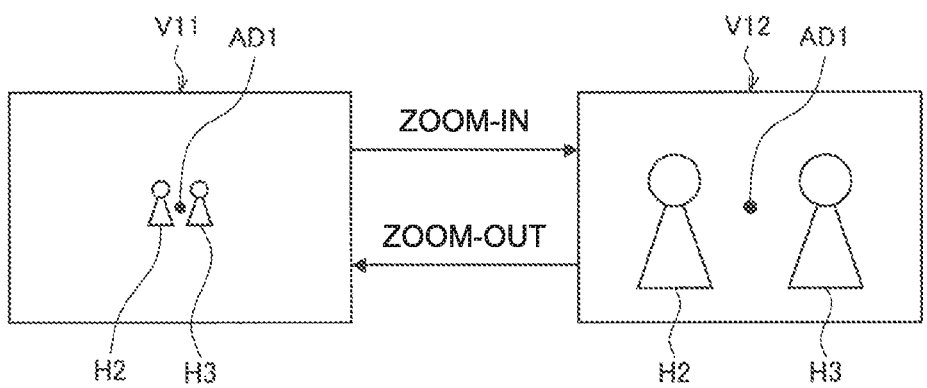
FIG. 4A is an explanatory diagram for explaining delivery of audio data according to a first comparative method.

FIG. 4A is an explanatory diagram for explaining delivery of audio data according to a first comparative method. The first comparative method is a method of delivering one piece of object audio data AD1 in accordance with the display state V11. As illustrated in FIG. 4A, according to the first comparative method, because sound comes from only one direction at the center also in a case of the display state V12 as well as in a case of the display state V11, sound cannot be heard from directions in accordance with positions of the respective vocalists as described with reference to FIG. 3.

Figure 4B:
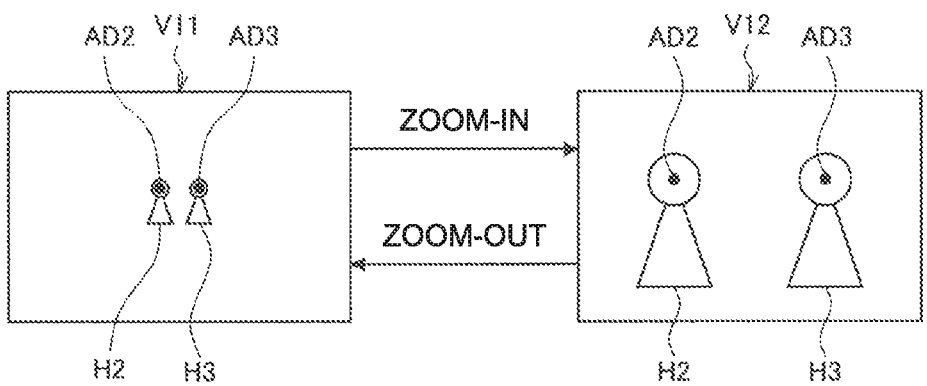
FIG. 4B is an explanatory diagram for explaining delivery of audio data according to a second comparative method.

FIG. 4B is an explanatory diagram for explaining delivery of audio data according to a second comparative method. The second existing method is a method of delivering two piece of object audio data AD2 and AD3 in accordance with the display state V12. As illustrated in FIG. 4B, according to the second comparative method, while sound can be heard from directions in accordance with positions of the respective vocalists in the display state V12, in the display state V11, two pieces of object audio data are rendered, and sound comes from one direction as a result. That is, with the second comparative method, in a case of the display state V11, because two pieces of object audio data are required although it is sufficient if sound comes from one direction, extra transmission bands and rendering processing are required compared to the first comparative method.

1-2. Outline

Therefore, a method for selecting and acquiring object audio data to be utilized in accordance with a display state (hereinafter, referred to as a proposed method) is employed in an embodiment of the present disclosure which will be described below. The proposed method can be realized by, for example, a server storing all object audio data which is necessary for each display state in advance, and a client selecting and acquiring object audio data in accordance with an expression state.

Figure 5:
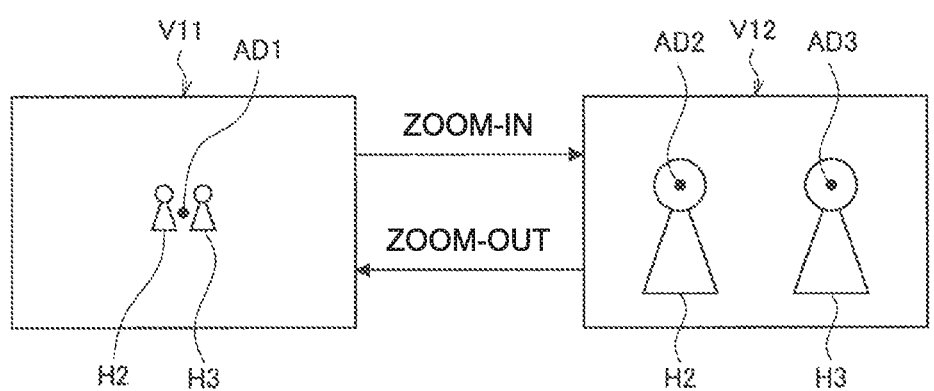
FIG. 5 is an explanatory diagram for explaining outline of a proposed method according to an embodiment of the present disclosure.

FIG. 5 is an explanatory diagram for explaining outline of a proposed method according to an embodiment of the present disclosure. In the proposed method, one piece of object audio data AD1 is delivered in the display state V11, and two pieces of object audio data AD2 and AD3 are delivered in the display state V12. According to the proposed method, it becomes possible to deliver object audio data so that sound comes from more appropriate positions without causing extra transmission bands and rendering processing.

By the way, as described above, in existing MPEG-DASH, transmission of object audio data in accordance with a display state is not taken into account. Therefore, to realize delivery of object audio data using the proposed method as described above, in the present disclosure, the following four mechanisms are provided.

First, information for selecting object audio data in accordance with a display state of an image, and a mechanism for selecting object audio data by utilizing the information are provided. For example, in an example illustrated in FIG. 5, meta information (hereinafter, also referred to as object selection information) for selecting object audio data AD1 in a case of the display state V11, and object audio data AD2 and AD3 in a case of the display state V12 are newly required. Such object selection information and an example of selection of object audio data using the object selection information will be described in <<3. Example of object selection information (Example 1)>>.

Second, a mechanism for filing object audio data in view of the display state is provided. As described with reference to FIG. 2, in existing MPEG-DASH, object audio data is stored in an audio file, and the client selects and acquires the file.

For example, in a case where all of the object audio data to be utilized for each display state is filed so as to be stored in one audio file as in the filing example F11 illustrated in FIG. 2, an advantage is provided that it is only necessary to always select and acquire one audio file in accordance with the display state. However, it is necessary to prepare files of the same number as the number of display states, and, in a case where a plurality of display states which utilizes common object audio data exists, the server requires to store a plurality of audio files including the same object audio data, which can lead to wasting of storage capacity.

Meanwhile, in a case where one piece of object audio data is filed so as to be stored in one audio file as in the filing example F13 illustrated in FIG. 2, an advantage is provided that the server only requires to store only an audio file corresponding to the necessary object audio data. However, because it is necessary to acquire audio files of the number corresponding to the number of pieces of object audio data in accordance with the display state when the client acquires the file, there is a possibility that the number of HTTP connections may increase, and processing load of the server may increase.

Therefore, a mechanism is desired which can support various display states and which files object audio data while suppressing both an amount of data to be stored in the server and the number of files to be acquired by the client. An example of such a mechanism which files object audio data in view of a display state will be described in <<4. Example of filing in view of display state (Example 2)>>.

Third, in a case where combination of object audio data to be utilized does not change over time, a mechanism of signaling the object selection information is provided. In a case where combination of object audio data to be utilized does not change over time, it is possible to commonly utilize the same object selection information at all times. However, because such a mechanism of signaling object selection information is not prepared in the existing MPEG-DASH, a new mechanism of signaling is required. An example of a mechanism of signaling object selection information in a case where combination of object audio data to be utilized does not change over time, will be described in <<5. Example of signaling in a case where combination of object audio data does not change over time (Example 3)>>.

Fourth, in a case where object audio data to be utilized changes over time, a mechanism of signaling object selection information is provided. There can be a case where the above-described object selection information changes over time. For example, there is a case where object audio data to be utilized changes depending on time even in the same display state. Such a case will be described with reference to FIG. 6.

Figure 6:
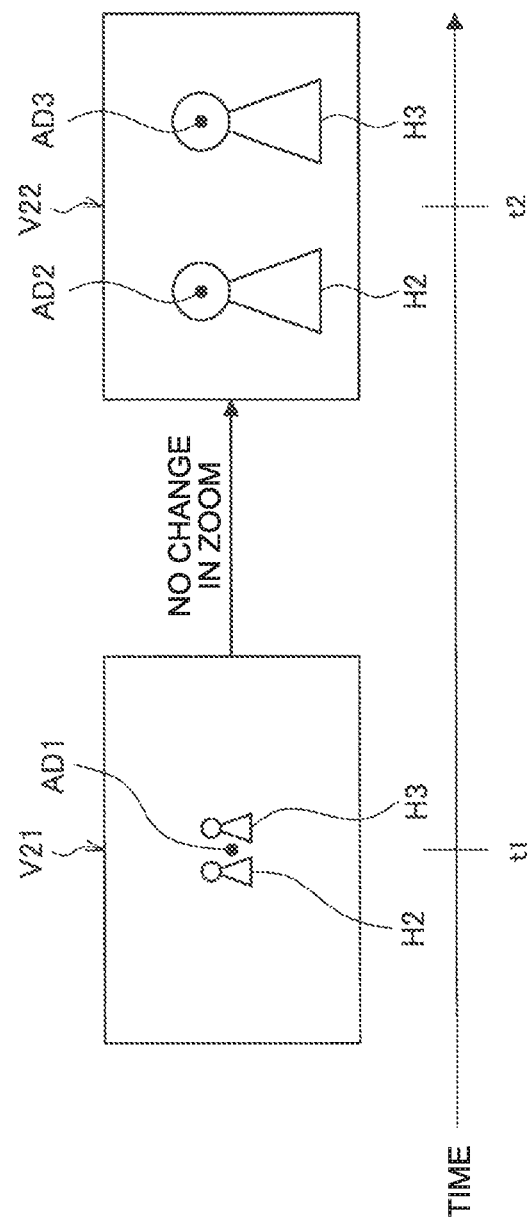
FIG. 6 is an explanatory diagram for explaining an example where combination of object audio data to be utilized changes in accordance with time even if the display state does not change.

FIG. 6 is an explanatory diagram for explaining an example where combination of object audio data to be utilized changes in accordance with time even if the display state does not change. In an example illustrated in FIG. 6, while there is no change in zoom from time t1 to time t2, and a display state V21 at time t1 is the same as a display state V22 at time t2, two vocalists H1 and H2 come closer to the front side from time t1 to time t2. Note that, in the present specification, for example, in a case where elements such as an angle of view which can determine the display state does not change, the states are expressed as the same display state.

Because the two vocalists H1 and H2 appear to be together in the distance at time t1, it is desirable to utilize one piece of object audio data AD1. Meanwhile, at time t2, because it is possible to clearly distinguish between positions of the respective vocalists as a result of two vocalists H1 and H2 coming closer, it is desirable to utilize two pieces of object audio data AD2 and AD3. In this manner, in a case where sound sources in the image move for each time, combination of object audio data to be utilized can change over time. Further, also in a case where sound sources in the image change for each time, combination of object audio data to be utilized can change over time.

In a case where combination of object audio data to be utilized changes over time in this manner, it is desirable to signal object selection information which is different for each time. A mechanism of storing object selection information which is different for each time in a file, and a mechanism of signaling the file are not prepared in the existing MPEG-DASH. An example of a mechanism of storing object selection information in a file for each time and signaling the file in a case where combination of object audio data to be utilized changes over time, will be described in <<6. Example of signaling in a case where combination of object audio data changes over time (Example 4)>>.

The background of the present disclosure and the outline of an embodiment of the present disclosure have been described above. An embodiment of the present disclosure will be described in more detail below.

2. Configuration Example

2-1. System Configuration Example

Figure 7:
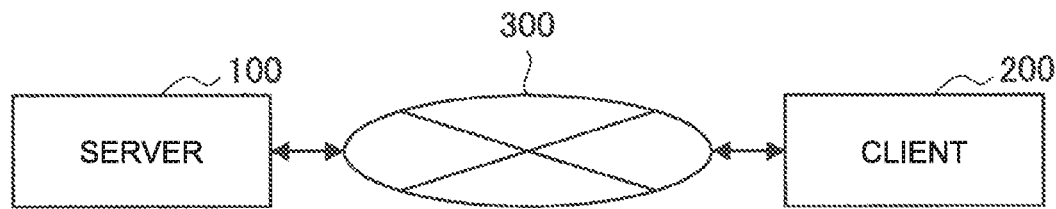
FIG. 7 is a block diagram illustrating a system configuration example of an information processing system according to the embodiment.

First, a system configuration example of an information processing system according to the present embodiment will be described with reference to FIG. 7. FIG. 7 is a block diagram illustrating a system configuration example of an information processing system according to the present embodiment.

Referring to FIG. 7, the information processing system according to the present embodiment includes a server 100 and a client 200. Further, the server 100 and the client 200 are connected to each other with a communication network 300.

The server 100 is an information processing apparatus (transmission apparatus) which streams (transmits) object audio data to be utilized for audio content to the client 200 on the basis of MPEG-DASH. More specifically, the server 100 acquires audio data to be used for audio content for each object, and generates stream data by encoding the data in units of object. Further, the server 100 generates an audio file by filing the stream data for each time unit from several seconds to approximately 10 seconds, which is called a segment, or for all pieces of content.

Note that the object is a sound source, and audio data of each object (object audio data) is acquired with, for example, a microphone, or the like, attached to each object. The object may be a body such as a fixed microphone stand or may be a dynamic body such as a human.

Further, in the present embodiment, one sound source may be one object, or a plurality of sound sources may be one object. Further, a plurality of objects may exist so as to correspond to a given sound source. For example, in the example illustrated in FIG. 5, an object corresponding to the vocalist H2 which is a sound source is different depending on the display state, and singing voice of the vocalist H2 can be included in both the object audio data AD1 and the object audio data AD2.

Further, the server 100 encodes object metadata including position information, or the like, of each object. The server 100 generates a metadata file by filing the encoded data of the object metadata in units of segment.

Further, the server 100 generates a management file which manages an audio file. In the present embodiment, the management file may be a media presentation description (MPD) file which is defined in standards of ISO/IEC 23009-1.

Further, the server 100 transmits the above-described audio file, metadata file, MPD file, or the like, to the client 200 in response to a request from the client 200.

The client 200 is an information processing apparatus (reception apparatus) which reproduces audio content. More specifically, the client 200 acquires the MPD file from the server 100 and acquires the metadata file and the audio file from the server 100 on the basis of the MPD file. Then, the client 200 decodes the audio file acquired from the server 100 and realizes reproduction of the audio content by synthesizing and outputting the audio file.

The system configuration example of the information processing system according to the present embodiment has been described above. Note that the above-described configuration described with reference to FIG. 7 is merely an example, and the configuration of the information processing system according to the present embodiment is not limited to such an example. For example, part of the functions of the server 100 may be provided at the client 200 or other external apparatuses. For example, software (for example, web application, or the like, in which predetermined application programming interface (API) is used) which provides part of the functions of the server 100 may be executed on the client 200. Further, inversely, part of the functions of the client 200 may be provided at the server 100 or other external apparatuses. The configuration of the information processing system according to the present embodiment can be flexibly transformed in accordance with specifications and operation.

2-2. Functional Configuration Example of Server

Figure 8:
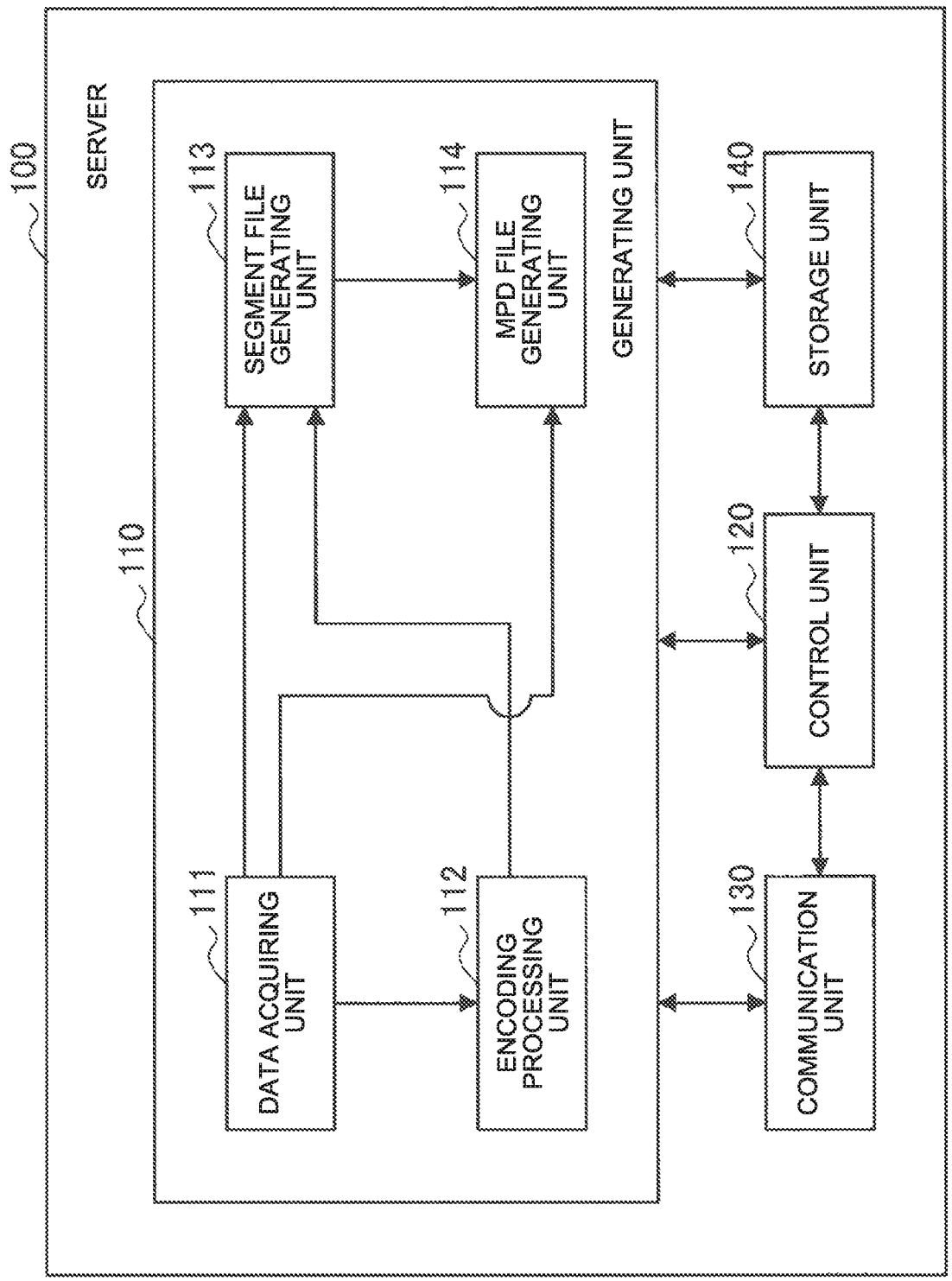
FIG. 8 is a block diagram illustrating a functional configuration example of a server 100 according to the embodiment.

The system configuration example of the information processing system according to the present embodiment has been described above. Subsequently, a functional configuration example of the server 100 will be described with reference to FIG. 8. FIG. 8 is a block diagram illustrating a functional configuration example of a server 100 according to the present embodiment. As illustrated in FIG. 8, the server 100 includes a generating unit 110, a control unit 120, a communication unit 130 and a storage unit 140.

The generating unit 110 is a functional component which performs processing regarding provision of audio content. As illustrated in FIG. 8, the generating unit 110 includes a data acquiring unit 111, an encoding processing unit 112, a segment file generating unit 113 and an MPD file generating unit 114.

The data acquiring unit 111 acquires an image and audio data for each object (in other words, acquires object audio data). The data acquiring unit 111 may acquire the image and the object audio data from inside of the server 100 or may acquire the image and the object audio data from an external apparatus connected to the server 100. The data acquiring unit 111 provides the acquired image and object audio data to the encoding processing unit 112.

The encoding processing unit 112 generates image stream data and audio stream data by encoding the image and the object audio data of each object provided from the data acquiring unit 111. Further, the encoding processing unit 112 encodes the object metadata including object position information, or the like, of each object input from outside. The encoding processing unit 112 provides the image stream data, the audio stream data of each object and the encoded data of the object metadata to the segment file generating unit 113.

The segment file generating unit 113 is a functional component which generates a segment file which is data in units in which data can be delivered as content. For example, the segment file generating unit 113 generates an audio file by filing the audio stream data of each object provided from the encoding processing unit 112 in units of segment. There exist various aspects of generation (which will be also referred to as filing) of an audio file. For example, the segment file generating unit 113 generates an audio file by storing one or two or more pieces of object audio data in one audio file on the basis of combination of object audio data in accordance with the display state so that the same object audio data is not included in a plurality of audio files. Details of generation of an audio file based on combination of object audio data in accordance with the display state will be described later.

Further, the segment file generating unit 113 can also generate a metadata file in which only object metadata is stored by filing the encoded data of the object metadata provided from the encoding processing unit 112, in units of segment. A case where such a metadata file is generated will be described later.

Further, the segment file generating unit generates an image file by filing the image stream data provided from the encoding processing unit 112 in units of segment.

The MPD file generating unit 114 is a functional component which generates an MPD file. In the present embodiment, the MPD file generating unit 114 generates an MPD file including metadata file access information for accessing a metadata file including the object selection information. The MPD file generated by the MPD file generating unit 114 will be described in detail later.

The control unit 120 is a functional component which comprehensively controls overall processing to be performed by the server 100. For example, the control unit 120 can control activation and stop of each component on the basis of request information, or the like, from the client 200 received via the communication unit 130. Note that control content by the control unit 120 is not particularly limited. For example, the control unit 120 may control processing which is typically performed in a general-purpose computer, a PC, a tablet PC, or the like.

The communication unit 130 performs various kinds of communication with the client 200. For example, the communication unit 130 receives request information from the client 200. Further, the communication unit 130 also functions as a transmitting unit, and transmits an MPD file, a metadata file, an audio file, an image file, or the like, to the client 200 as a response to the request information. Note that communication content by the communication unit 130 is not limited to these.

The storage unit 140 is a functional component which stores various kinds of information. For example, the storage unit 140 stores an audio file, an image file, a metadata file, an MPD file, or the like, or stores programs, parameters, or the like, to be used by the respective functional components of the server 100. Note that information stored in the storage unit 140 is not limited to these.

The functional configuration example of the server 100 has been described above. Note that the functional components described above using FIG. 8 are merely an example, and the functional configuration of the server 100 is not limited to the example. For example, the server 100 does not necessarily have to include all the functional components illustrated in FIG. 8. Further, the functional configuration of the server 100 can be flexibly transformed in accordance with specifications and operation.

2-3. Functional Configuration Example of Client

Figure 9:
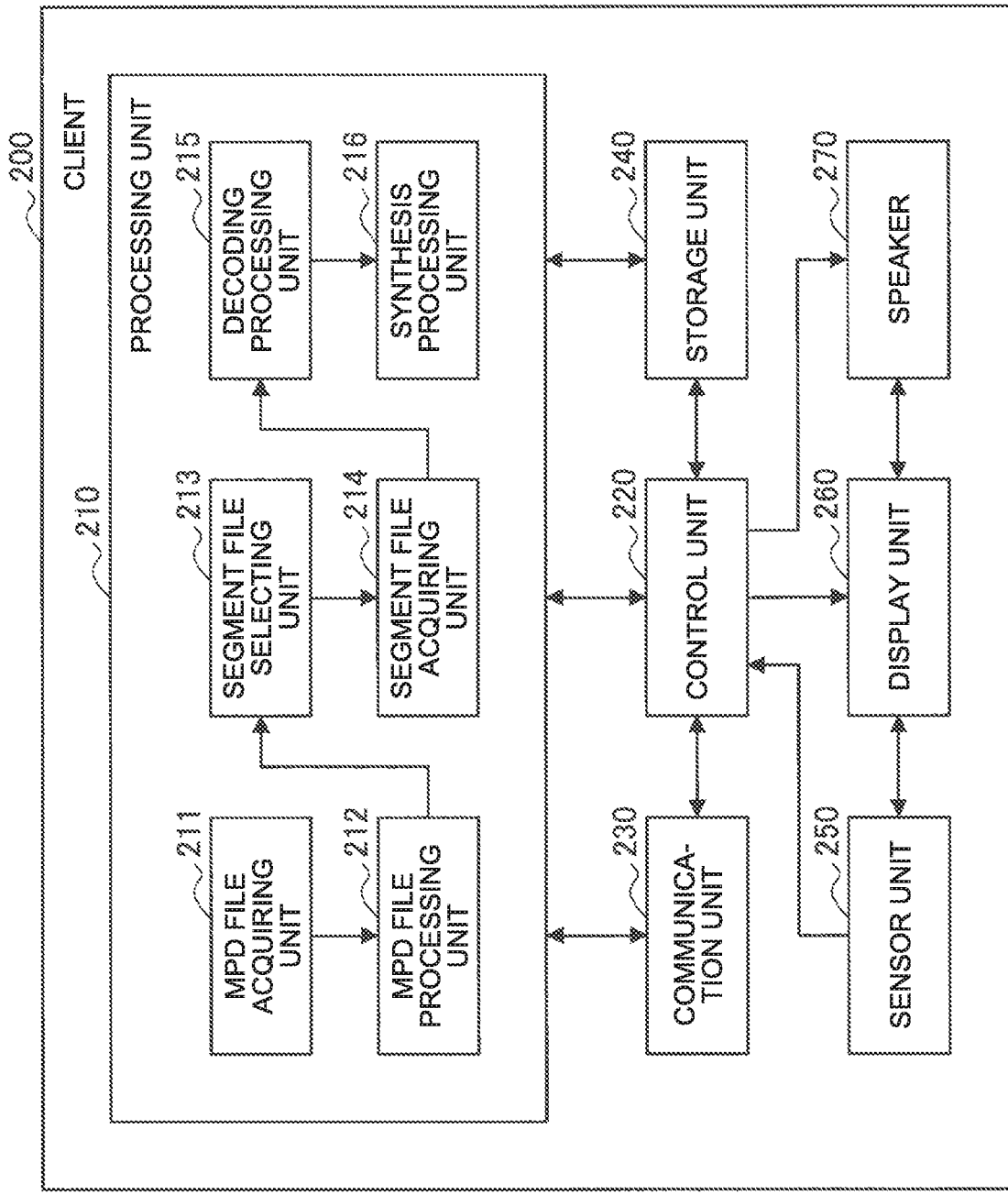
FIG. 9 is a block diagram illustrating a functional configuration example of a client 200 according to the embodiment.

The functional configuration example of the server 100 has been described above. Subsequently, a functional configuration example of the client 200 will be described with reference to FIG. 9. FIG. 9 is a block diagram illustrating a functional configuration example of a client 200 according to the present embodiment. As illustrated in FIG. 9, the client 200 includes a processing unit 210, a control unit 220, a communication unit 230, a storage unit 240, a sensor unit 250, a display unit 260, and a speaker 270.

The processing unit 210 is a functional component which performs processing regarding reproduction of content. As illustrated in FIG. 9, the processing unit 210 includes an MPD file acquiring unit 211, an MPD file processing unit 212, a segment file selecting unit 213, a segment file acquiring unit 214, a decoding processing unit 215, and a synthesis processing unit 216.

The MPD file acquiring unit 211 is a functional component which acquires an MPD file from the server 100 prior to reproduction of content. More specifically, the MPD file acquiring unit 211 acquires an MPD file from the server 100 by generating request information of the MPD file on the basis of user operation, or the like and providing the request information to the server 100 via the communication unit 230. The MPD file acquiring unit 211 provides the acquired MPD file to the MPD file processing unit 212.

The MPD file processing unit 212 is a functional component which performs processing regarding the MPD file provided from the MPD file acquiring unit 211. More specifically, the MPD file processing unit 212 recognizes information (such as, for example, URL) necessary for acquiring an audio file, a metadata file, or the like, on the basis of analysis of the MPD file. Further, the MPD file processing unit 212 according to the present embodiment acquires the object selection information on the basis of analysis of the MPD file. The MPD file processing unit 212 provides these kinds of information to the segment file selecting unit 213.

The segment file selecting unit 213 is a functional component which selects a segment file to be acquired. More specifically, the segment file selecting unit 213 selects an audio file or a metadata file to be acquired on the basis of various kinds of information described above provided from the MPD file processing unit 212. For example, the segment file selecting unit 213 according to the present embodiment selects object audio data to be utilized on the basis of the object selection information and selects an audio file including the selected object audio data.

The segment file acquiring unit 214 is a functional component which acquires a segment file. More specifically, the segment file acquiring unit 214 acquires an image file, an audio file or a metadata file from the server 100 by generating request information of these files on the basis of various kinds of information provided from the segment file selecting unit 213, and transmitting the request information to the server 100 via the communication unit 230. The segment file acquiring unit 214 provides these acquired files to the decoding processing unit 215.

The decoding processing unit 215 is a functional component which decodes data included in the image file, the audio file or the metadata file provided from the segment file acquiring unit 214. The decoding processing unit 215 provides an image obtained through decoding processing (hereinafter, also referred to as a decoded image) to the control unit 220. Further, the decoding processing unit 215 provides object audio data, or the like, obtained through decoding processing to the synthesis processing unit 216.

The synthesis processing unit 216 is a functional component which synthesizes a plurality of pieces of object audio data provided from the decoding processing unit 215 and outputs the synthesized data. The synthesis processing unit 216 provides the synthesized data to the control unit 220.

The control unit 220 is a functional component which comprehensively controls overall processing to be performed by the client 200. For example, the control unit 220 controls display of the display unit 260. The control unit 220 may cause the decoded image provided from the decoding processing unit 215 to be displayed as is at the display unit 260 or may perform processing on the decoded image provided from the decoding processing unit 215 and cause the decoded image subjected to the processing to be displayed at the display unit 260. For example, the control unit 220 may perform processing (clipping processing) of clipping part of a region from the decoded image provided from the decoding processing unit 215 on the basis of sensor data provided from the sensor unit 250. Then, the control unit 220 may cause an image (hereinafter, also referred to as a clipped image) which is clipped through the clipping processing to be displayed at the display unit 260. Note that the clipping processing of the decoded image based on the sensor data may be similar to clipping processing to be performed in, for example, reproduction of a so-called 360-degree image. Further, the control unit 220 provides audio content to the user by controlling the speaker 270 and outputting the synthesized data provided from the synthesis processing unit 216. Further, the control unit 220 may control various kinds of processing on the basis of input performed by the user using an input unit (which is not illustrated) such as a mouse and a keyboard. Note that control content by the control unit 220 is not particularly limited. For example, the control unit 220 may control processing which is typically performed at a general-purpose computer, a PC, a tablet PC, or the like.

The communication unit 230 performs various kinds of communication with the server 100. For example, the communication unit 230 transmits request information provided from the processing unit 210 to the server 100. Further, the communication unit 230 also functions as a receiving unit, and receives an MPD file, a metadata file, an audio file, an image file, or the like, from the server 100 as a response to the request information. Note that communication content by the communication unit 230 is not limited to these.

The storage unit 240 is a functional component which stores various kinds of information. For example, the storage unit 240 stores an audio file, an image file, an audio file, object meta data, a metadata file, an MPD file, or the like, acquired from the server 100, or stores programs, parameters, or the like, to be used by the respective functional components of the client 200. Note that information stored in the storage unit 240 is not limited to these.

The sensor unit 250 acquires sensor data regarding the user through sensing. For example, the sensor unit 250 may include sensors such as an acceleration sensor and an angular velocity sensor, and may acquire sensor data regarding an attitude and a position of the user. The sensor unit 250 provides the acquired sensor data to the control unit 220.

The display unit 260 displays an image in accordance with control by the control unit 220. Note that the image displayed at the display unit 260 as described above may be the decoded image provided from the decoding processing unit 215 as is or may be the clipped image clipped through clipping processing by the control unit 220.

The speaker 270 performs audio output in accordance with control by the control unit 220.

The functional configuration example of the client 200 has been described above. Note that the functional components described above using FIG. 9 are merely an example, and the functional configuration of the client 200 is not limited to the example. For example, the client 200 does not necessarily have to include all the functional components illustrated in FIG. 9. Further, the functional configuration of the client 200 can be flexibly transformed in accordance with specifications and operation. For example, the functional components of the sensor unit 250, the display unit 260 and the speaker 270 illustrated in FIG. 9 may be provided at other apparatuses connected to the client 200.

3. Example of Object Selection Information (Example 1)

The configuration example of the present embodiment has been described above. Subsequently, two examples (Example 1-1 and Example 1-2) will be described regarding the object selection information for selecting object audio data to be utilized in accordance with a display state and selection of object audio data using the object selection information in the present embodiment.

3-1. Example of Object Selection Information Using Angle of View (Example 1-1)

First, as Example 1-1, an example of object selection information using an angle of view will be described. As described above, the control unit 220 of the client 200 may cause the decoded image provided from the processing unit 210 as is at the display unit 260 or may cause the clipped image clipped through clipping processing to be displayed at the display unit 260. Here, the display state can differ and the object audio data to be acquired by the client 200 can differ between in a case where the decoded image is displayed as is and in a case where the clipped image which is clipped is displayed. Such a difference in object audio data to be acquired through clipping processing will be described with reference to FIG. 10. Note that, while a horizontal angle of view will be mainly described in the following description, the description will be similar for a vertical angle of view.

Figure 10A:
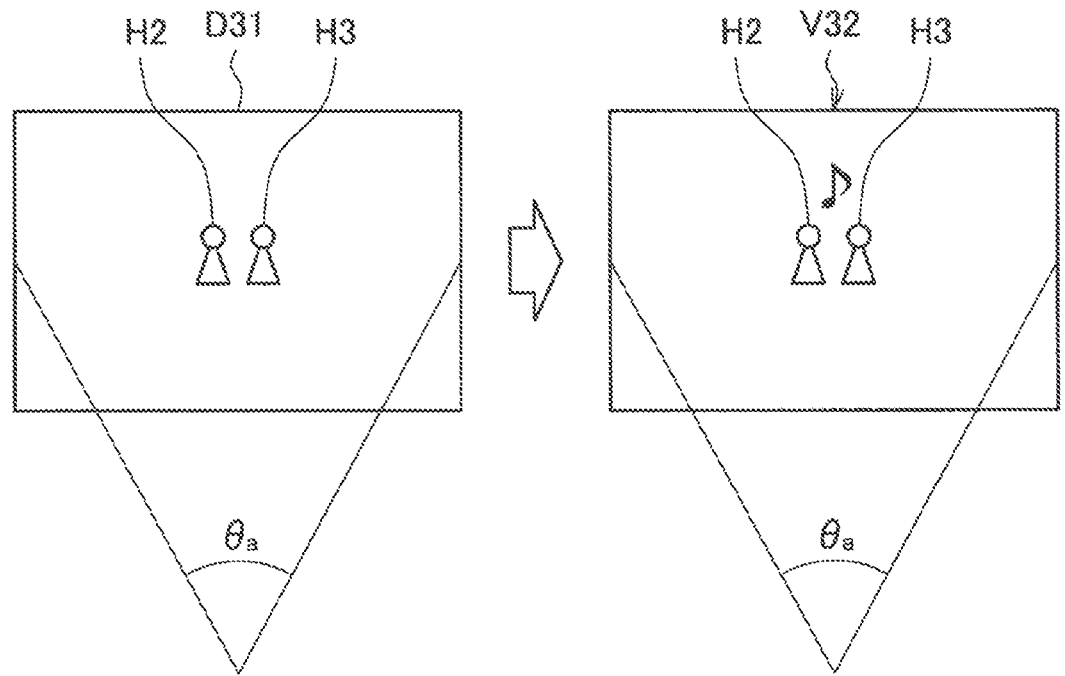
FIG. 10A is an explanatory diagram for explaining object audio data to be utilized in a case where a decoded image is displayed at a display unit 260 as is.

FIG. 10A is an explanatory diagram for explaining object audio data to be utilized in a case where a decoded image is displayed at a display unit 260 as is. A decoded image D31 illustrated in FIG. 10A is an image based on imaging at an angle of view ea, and two vocalists H1 and H2 are in the decoded image D31.

In a case where such a decoded image D31 is displayed as is, and is viewed at an angle of view ea which is the same as the angle of view upon imaging, two vocalists H2 and H3 are compactly displayed at the center as in a display state V32 illustrated in FIG. 10A. Therefore, in the display state V32, it is considered that it is sufficient if sound comes from one direction, in which case, the client 200 only requires to select and acquire one piece of object audio data.

Note that, the example illustrated in FIG. 10A can be interpreted as an example where the whole of the decoded image is clipped as the clipped image at the angle of view $\theta_a$ which is the same as the angle of view upon imaging and displayed.

Figure 10B:
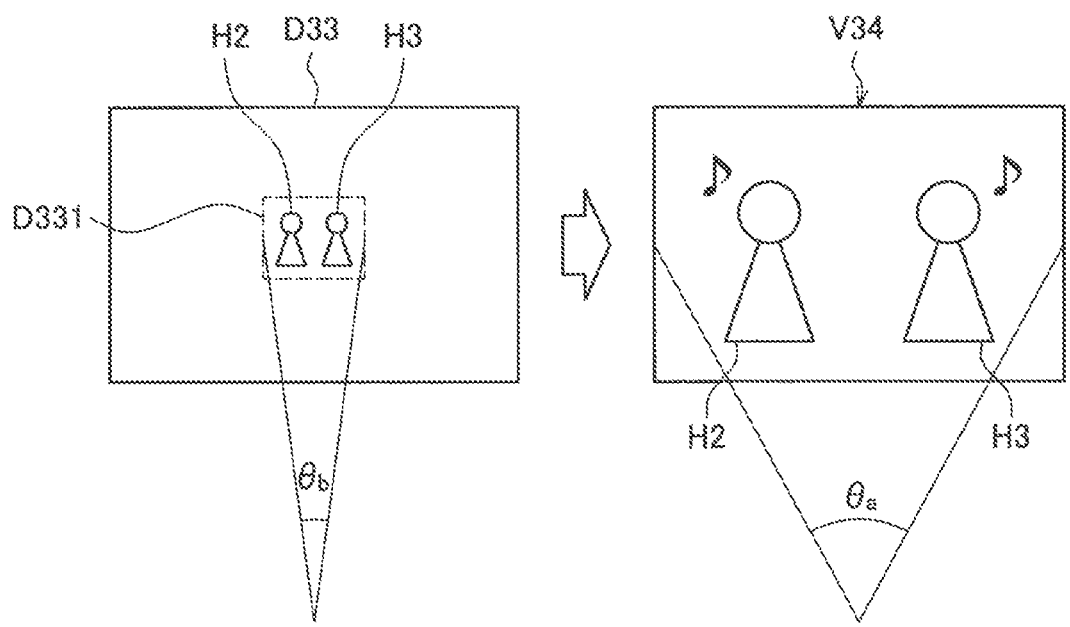
FIG. 10B is an explanatory diagram for explaining object audio data to be utilized in a case where a clipped image obtained by clipping the decoded image is displayed at the display unit 260.

FIG. 10B is an explanatory diagram for explaining object audio data to be utilized in a case where a clipped image obtained by clipping the decoded image is displayed at the display unit 260. A decoded image D33 illustrated in FIG. 10B, in a similar manner to the decoded image D31 illustrated in FIG. 10A, is an image based on imaging at an angle of view $\theta_a$, and two vocalists H1 and H2 are in the decoded image D33.

Here, in a case where a clipped image D331 clipped at an angle of view $\theta_b$ from such a decoded image D33 is displayed and viewed at the angle of view $\theta_a$, from the user, the two vocalists appear to be separate from each other as in a display state V34 illustrated in FIG. 10B, and the user can clearly distinguish between positions of the respective vocalists. Therefore, in the display state V34, it is desirable that sound separately come from two directions, in which case, the client 200 requires to select and acquire two pieces of object audio data.

As described above, the display state can differ and the object audio data to be utilized can differ between in a case where the decoded image is displayed as is and in a case where the clipped image which is clipped is displayed. Further, even in a case where the clipped image is displayed, the display state can differ and the object audio data to be utilized can differ depending on an angle of view (for example, $\theta_b$ in the example illustrated in FIG. 10B) and a direction (position) at which the clipped image is clipped.

Further, even in a case where the displayed clipped image is the same, the display state can differ and the object audio data to be utilized can differ depending on an angle of view upon viewing (hereinafter, also referred to as a viewing angle of view). Such a difference in object audio data to be utilized due to an angle of view upon viewing will be described with reference to FIG. 11. Note that, while a horizontal angle of view will be mainly described in the following description, the description will be similar for a vertical angle of view.

Figure 11:
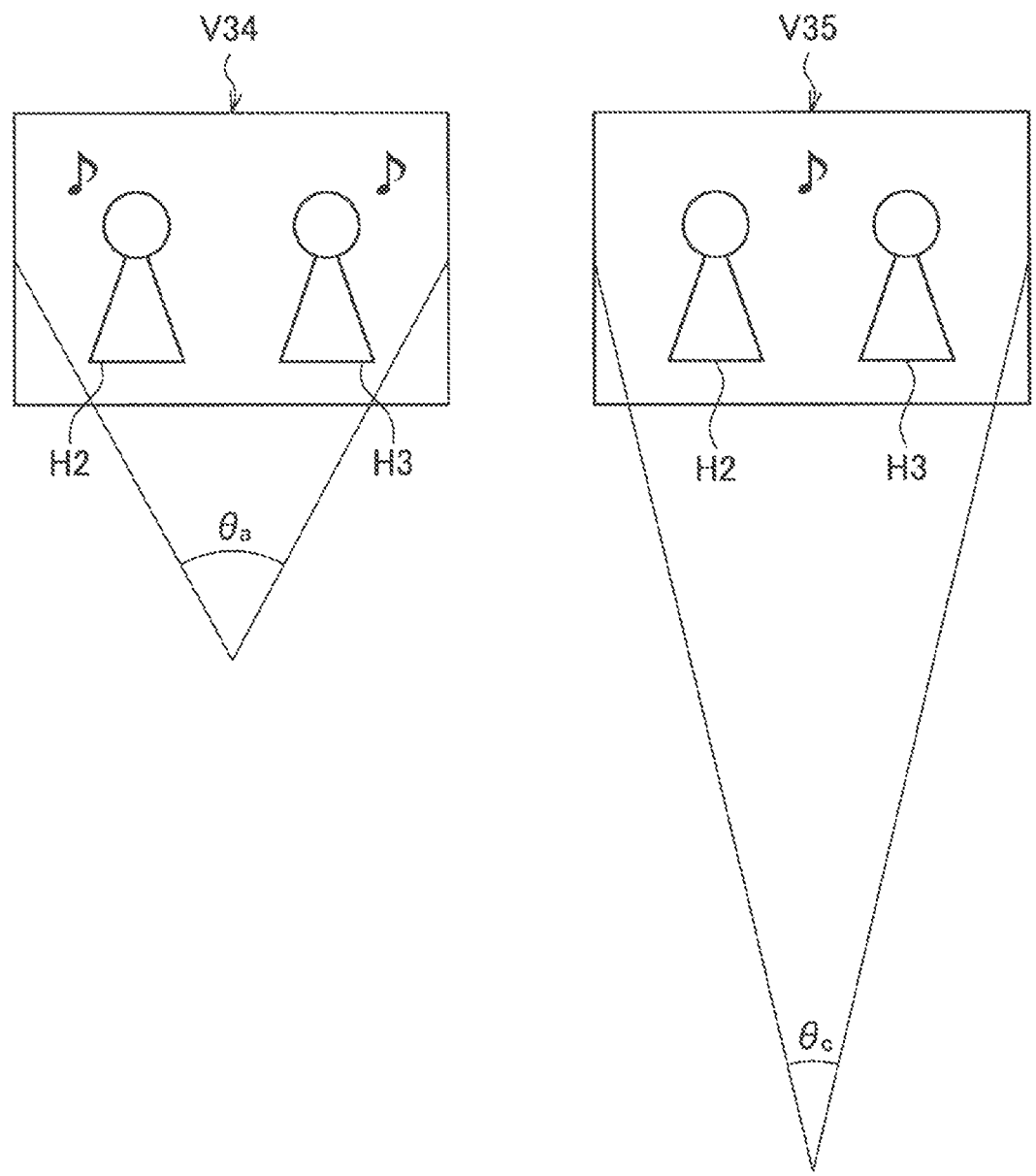
FIG. 11 is an explanatory diagram for explaining a difference of object audio data to be utilized due to a difference in an angle of view upon viewing.

FIG. 11 is an explanatory diagram for explaining a difference of object audio data to be utilized due to a difference in an angle of view upon viewing. A display state V34 illustrated in FIG. 11 is the same as the display state V34 illustrated in FIG. 10B. That is, an image displayed in the display state V34 illustrated in FIG. 11 is the clipped image D331 illustrated in FIG. 10B, and the user views the image at the viewing angle of view at the angle of view $\theta_a$. In such a display state V34, as described above, it is desirable that sound separately come from two directions, and the client 200 requires to select and acquire two pieces of object audio data.

Further, the image displayed in the display state V35 illustrated in FIG. 11 is the same as the image in the display state V34, and may be the clipped image D331 illustrated in FIG. 10B. However, in the display state V35 illustrated in FIG. 11, the user views the image at the viewing angle of view at an angle of view $\theta_c$ which is smaller than the angle of view $\theta_a$. In a case where the image is viewed at a small viewing angle of view as in the display state V35, from the user, two vocalists H2 and H3 appear to be together, and it is considered that it is sufficient if sound comes from one direction at the center. Therefore, in such a case, the client 200 only requires to select and acquire one piece of object audio data.

In conclusion of the above, combination of object audio data to be utilized (to be acquired) by the client 200 can differ depending on combination of a direction and an angle of view of the clipped image, and an angle of view upon viewing. Note that, even in a case where the decoded image is a so-called 360-degree image, in a similar manner to the above-described example, combination of object audio data to be utilized can differ depending on combination of a direction, an angle of view of the image clipped from the 360-degree image and an angle of view upon viewing. In the present example, the display state is specified by using these kinds of information, so that it is possible to specify combination of object audio data to be utilized.

In the present example, object selection information for selecting object audio data may include the following information.

direction information regarding a direction of the clipped image clipping angle of view information regarding an angle of view of the clipped image viewing angle of view information regarding an angle of view upon viewing with respect to the displayed image utilization information regarding object audio data to be utilized Note that there is a case where, among the above-described information, the clipping angle of view information and the viewing angle of view information will be collectively simply referred to as angle of view information.

The direction information may include, for example, information of an angle in a horizontal direction and information of an angle in a vertical direction. Alternatively, the direction information may include information of a range of an angle from a clipping direction vector specified from the angle in the horizontal direction and the angle in the vertical direction in addition to the information of the angle in the horizontal direction and the information of the angle in the vertical direction. Alternatively, the direction information may include information of a range of the angle in the horizontal direction and information of a range of the angle in the vertical direction.

The clipping angle of view information may include, for example, information of a range of a horizontal angle of view of the clipped image, and information of a range of a vertical angle of view. Alternatively, in a case where the horizontal angle of view and the vertical angle of view of the clipped image in a display state which becomes a reference are determined in advance as reference angles of view, the clipping angle of view information may include information of a range of magnification with respect to the reference angles of view.

The viewing angle of view information may include, for example, information of a range of a horizontal angle of view upon viewing with respect to a displayed image, and information of a range of a vertical angle of view. Alternatively, in a case where the horizontal angle of view and the vertical angle of view upon viewing with respect to the displayed image in a display state which becomes a reference are determined in advance as reference angles of view, the viewing angle of view information may include information of a range of magnification with respect to the reference angles of view.

The utilization information may include information indicating all types of combination of the object audio data to be utilized. Alternatively, the utilization information may include information indicating a difference of combination of object audio data to be utilized with respect to combination of predetermined (default) object audio data determined in advance.

Note that the combination of the predetermined object audio data may be determined in advance regardless of whether or not the utilization information includes the combination of the predetermined object audio data. For example, in a display state in which the corresponding object selection information is not prepared, by utilizing the predetermined object audio data, time and effort for preparing the object selection information so that all display states are expressed are omitted.

Figure 12:
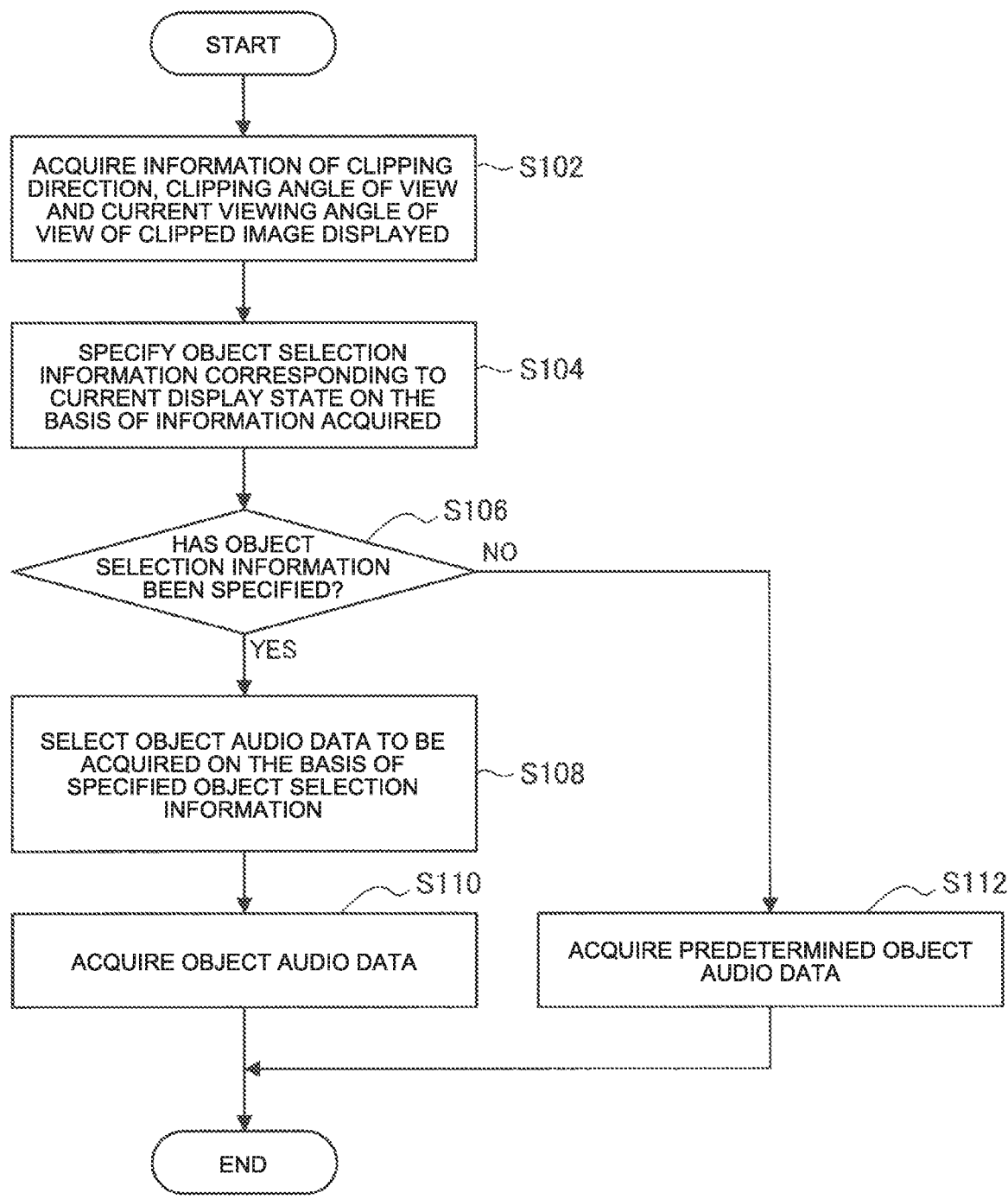
FIG. 12 is a flowchart illustrating a method of a client 200 selecting and acquiring object audio data to be utilized on the basis of object selection information.

A method of the processing unit 210 of the client 200 selecting and acquiring object audio data to be utilized on the basis of the object selection information according to the above-described example will be described with reference to FIG. 12. FIG. 12 is a flowchart illustrating a method of a client 200 selecting and acquiring object audio data to be utilized on the basis of object selection information according to the present example. Note that, in an example illustrated in FIG. 12, it is assumed that combination of the predetermined object audio data is determined in advance, and a plurality of pieces of object selection information has already been acquired by the client 200 and, for example, is stored in the storage unit 240.

First, as illustrated in FIG. 12, the processing unit 210 acquires information of a clipping direction, a clipping angle of view and a current viewing angle of view of the clipped image displayed by the client 200 (S102). Here, the information of the clipping direction and the clipping angle of view of the clipped image displayed by the client 200 may be determined by, for example, the control unit 220 which performs clipping processing and may be provided from the control unit 220 to the processing unit 210. Further, the information of the current viewing angle of view may be specified by the control unit 220 on the basis of the sensor data acquired by the sensor unit 250 and may be provided from the control unit 220 to the processing unit 210.

Subsequently, the processing unit 210 specifies object selection information corresponding to a current display state among a plurality of pieces of object selection information stored in the storage unit 240 on the basis of the information acquired in step S102.

For example, the processing unit 210 may specify one piece of object selection information which matches or includes in a range, the information acquired in step S102. Specifically, the direction information included in each piece of the object selection information is compared with the object clipping direction of the displayed clipped image, and the object selection information having direction information which matches or includes in a range, the clipping direction of the displayed clipped image is extracted. Then, the processing unit 210 compares the angle of view information included in each piece of the extracted object selection information with information of the clipping angle of view and the current viewing angle of view of the displayed clipped image. Then, the processing unit 210 may specify one piece of object selection information including angle of view information including the clipping angle of view and the current viewing angle of view of the clipped image.

Note that, in a case where the object selection information which matches or includes in a range, the information acquired in step S102 cannot be found among the object selection information stored in the storage unit 240, the processing unit 210 does not have to specify the object selection information in step S104.

In a case where the object selection information corresponding to the current display state is specified (S106: Yes), the processing unit 210 selects combination of object audio data to be acquired on the basis of the utilization information included in the specified object selection information (S108). For example, in a case where information indicating all types of combination of object audio data to be utilized is included in the object selection information as the utilization information, the processing unit 210 only requires to select the object audio data indicated by the utilization information as is. Alternatively, in a case where information indicating a difference of combination of object audio data to be utilized with respect to combination of the predetermined object audio data is included in the object selection information as the utilization information, the processing unit 210 only requires to select the object audio data to be acquired on the basis of the combination of the predetermined object audio data.

Subsequently, the processing unit 210 acquires the object audio data selected in step S108 from the server 100. Note that a method for acquiring the selected object audio data will be described in detail later.

Meanwhile, in a case where the object selection information corresponding to the current display state has not been specified (S106: No), the processing unit 210 acquires the predetermined object audio data (S110).

Note that, among the above-described processing, processing from step S104 to S108 can be executed by, for example, the segment file selecting unit 213, and processing in step S110 and S112 can be executed by, for example, the segment file acquiring unit 214.

3-2. Example of Object Selection Information Using Angle Between Objects (Example 1-2)

The example of the object selection information using an angle of view has been described above as Example 1-1. Subsequently, an example of the object selection information using an angle between objects will be described as Example 1-2. In Example 1-2 described below, an angle between two objects is calculated from positions of the two objects upon viewing and a viewing position of the user, and object audio data to be utilized is selected on the basis of the angle between the objects.

Figure 13:
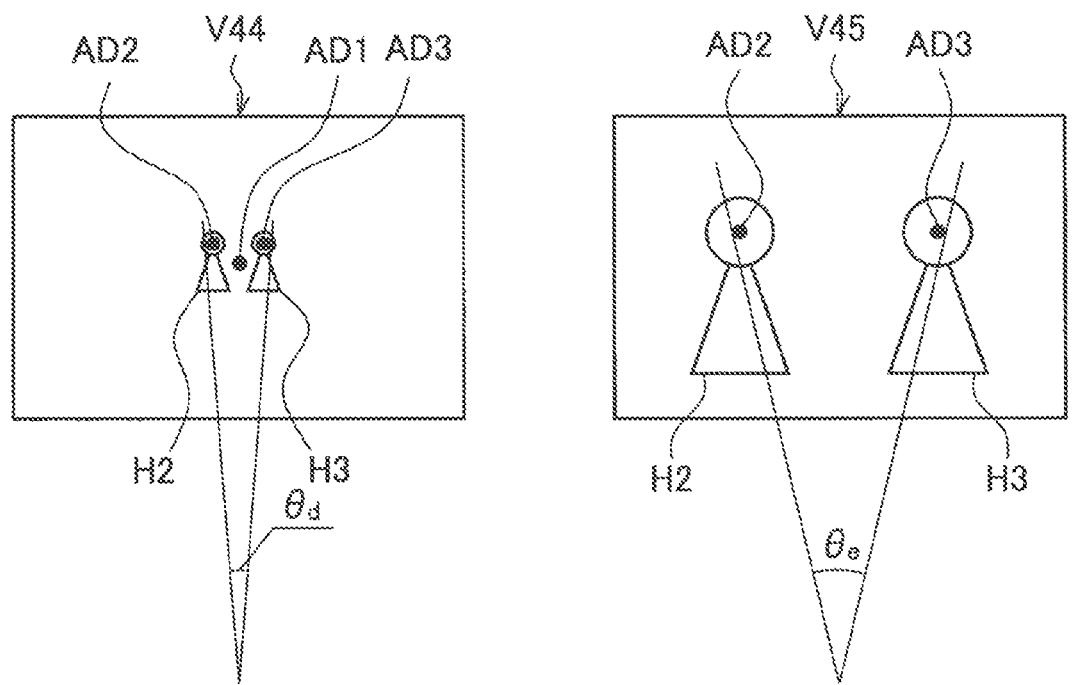
FIG. 13 is an explanatory diagram for explaining an angle between objects.

FIG. 13 is an explanatory diagram for explaining an angle between objects. As illustrated in FIG. 13, in the display state V44, an angle between an object relating to the object audio data AD2 (object corresponding to the vocalist H2) and an object relating to the object audio data AD3 (object corresponding to the vocalist H3) is an angle $\theta_d$. In a case where this angle $\theta_d$ is small as in the display state V44, because a difference between positions of the two objects is not recognized by the user, it is sufficient if sound comes from one direction at the center. Therefore, in the display state V44, the object audio data AD1 in which the object audio data AD2 and the object audio data AD3 are mixed is utilized.

On the other hand, as illustrated in FIG. 13, in the display state V45, an angle between an object relating to the object audio data AD2 and an object relating to the object audio data AD3 is an angle $\theta_e$ ($\theta_e > \theta_d$). In a case where this angle $\theta_e$ is large as in the display state V45, because positions of the two objects are separately recognized by the user, it is desirable that sound separately come from two directions. Therefore, in the display state V45, the object audio data AD2 and the object audio data AD3 are utilized.

As described above, combination of object audio data to be utilized (to be acquired) by the client 200 can differ depending on the magnitude of the angle between two objects. In the present example, the display state is specified from the size of the angle between two objects, so that it is possible to specify combination of object audio data to be utilized.

In the present example, object selection information for selecting object audio data may include the following information.

position information of two objects between which an angle is to be calculated
angle information regarding an angle between two objects
utilization information regarding object audio data to be utilized The position information of two objects between which an angle is to be calculated may be information similar to the position information of the objects included in the above-described object metadata. However, two objects between which an angle is to be calculated are determined for each piece of object selection information, and the position information of these two objects is included in the object selection information.

The angle information may include, for example, information of a range of an angle. As will be described later, the angle information can be used as a threshold.

The utilization information according to the present example may be similar to the utilization information in Example 1. That is, the utilization information may include information indicating all types of combination of the object audio data to be utilized. Alternatively, the utilization information may include information indicating a difference of combination of object audio data to be utilized with respect to combination of predetermined object audio data determined in advance.

Figure 14:
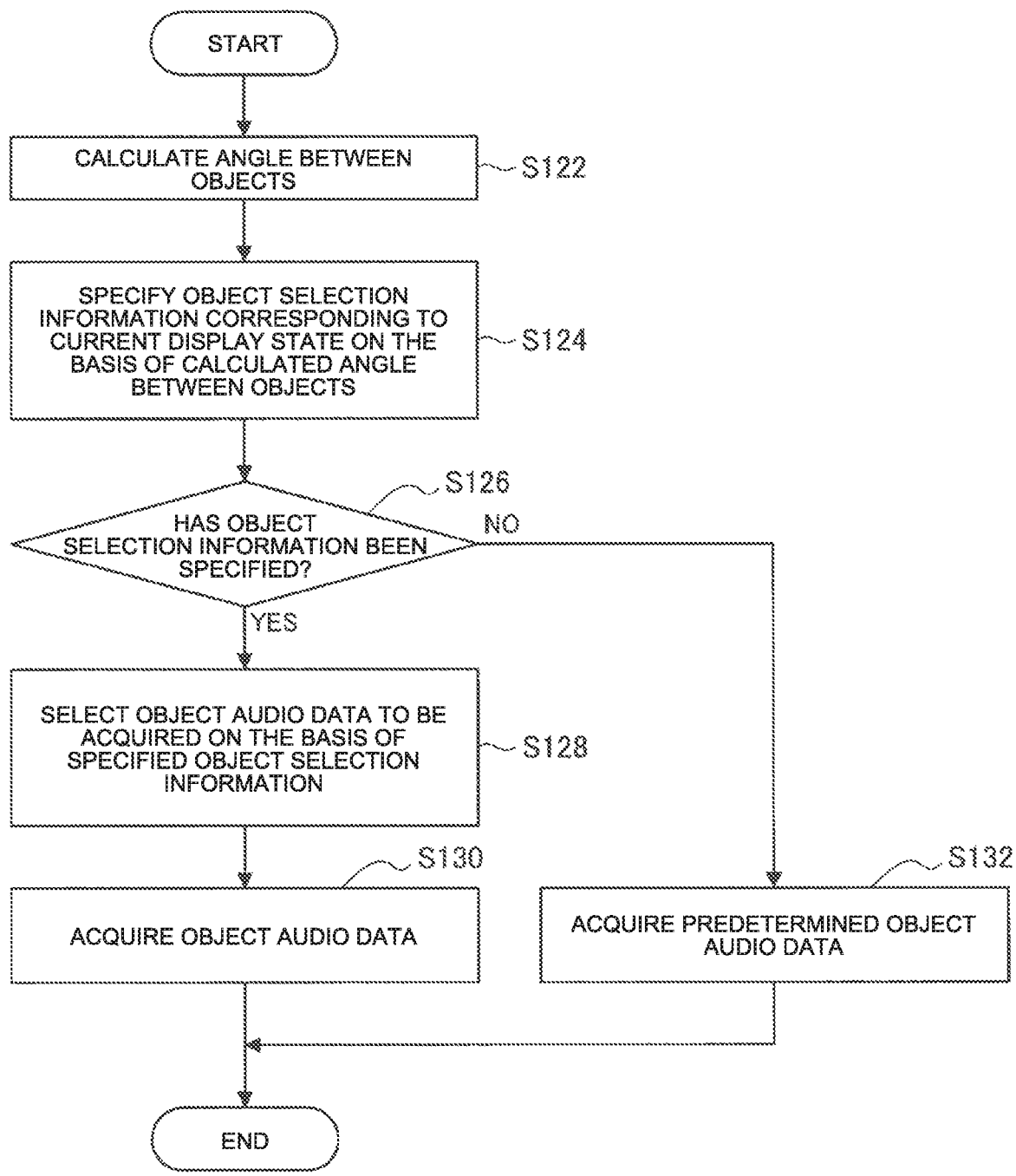
FIG. 14 is a flowchart illustrating a method of a client 200 selecting and acquiring object audio data to be utilized on the basis of object selection information.

A method of the processing unit 210 of the client 200 selecting and acquiring object audio data to be utilized on the basis of the object selection information according to the above-described example will be described with reference to FIG. 14. FIG. 14 is a flowchart illustrating a method of a client 200 selecting and acquiring object audio data to be utilized on the basis of object selection information according to the present example. Note that, in an example illustrated in FIG. 14, it is assumed that combination of the predetermined object audio data is determined in advance, and a plurality of pieces of object selection information has already been acquired by the client 200 and, for example, is stored in the storage unit 240.

First, as illustrated in FIG. 14, the processing unit 210 calculates an angle between objects (S122). In step S122, the processing unit 210 may calculate an angle between objects on the basis of position information of two objects between which an angle is to be calculated, included in the object selection information stored in the storage unit 240, and information of a viewing position of the user. Further, the information of the viewing position of the user may be specified, for example, by the control unit 220 on the basis of the sensor data acquired by the sensor unit 250 and may be provided from the control unit 220 to the processing unit 210.

Subsequently, the processing unit 210 specifies object selection information corresponding to a current display state among a plurality of pieces of object selection information stored in the storage unit 240 on the basis of the angle between objects calculated in step S122.

For example, the processing unit 210 extracts object selection information which includes angle information in a range of an angle including the angle between the objects calculated in step S122. Further, in a case where only one piece of object selection information is extracted, the processing unit 210 may specify the extracted one piece of object selection information as object selection information corresponding to the current display state. In a case where a plurality of pieces of object selection information is extracted, the processing unit 210 may specify object selection information for which positions of the two objects between which an angle is to be obtained are the closest to a viewing direction of the user among the extracted plurality of pieces of object selection information.

Note that, in a case where object selection information which includes angle information in a range of an angle including the angle between the objects calculated in step S122 does not exist, the processing unit 210 does not have to specify the object selection information in step S124.

In a case where the object selection information corresponding to the current display state is specified (S126: Yes), the processing unit 210 selects combination of object audio data to be acquired on the basis of the utilization information included in the specified object selection information (S128). For example, in a case where information indicating all types of combination of object audio data to be utilized is included in the object selection information as the utilization information, the processing unit 210 only requires to select the object audio data indicated by the utilization information as is. Alternatively, in a case where information indicating a difference of combination of object audio data to be utilized with respect to combination of the predetermined object audio data is included in the object selection information as the utilization information, the processing unit 210 only requires to select the object audio data to be acquired on the basis of the combination of the predetermined object audio data.

Subsequently, the processing unit 210 acquires the object audio data selected in step S128 from the server 100.

Meanwhile, in a case where the object selection information corresponding to the current display state has not been specified (S126: No), the processing unit 210 acquires the predetermined object audio data (S120).

Note that, among the above-described processing, processing from step S124 to S128 can be executed by, for example, the segment file selecting unit 213, and processing in step S130 and S132 can be executed by, for example, the segment file acquiring unit 214.

4. Example of Filing in View of Display State (Example 2)

Two examples (Example 1-1 and Example 1-2) have been described above as examples of object selection information and selection of object audio data selection using the object selection information. Subsequently, an example of filing of object audio data in view of a plurality of display states will be described as Example 2. Note that Example 2 which will be described below can be arbitrarily combined with the above-described examples, and may be combined with either Example 1-1 or Example 1-2.

In streaming delivery using MPEG-DASH, in a case where object audio data is acquired, the object audio data is acquired for each audio file. Through filing according to the present example which will be described below, it becomes possible to acquire object audio data for each audio file instead of acquiring object audio data for each object. Further, according to the present example, it is possible to file object audio data so that both an amount of data to be stored in the server 100 and the number of files to be acquired by the client 200 are suppressed.

In the following description, after flow of filing according to the present example is described with reference to FIG. 15, a specific example of filing will be described with reference to FIG. 16 to FIG. 18. Note that filing of object audio data described below is executed by the generating unit 110 of the server 100, and, for example, can be executed by the segment file generating unit 113 of the generating unit 110.

Figure 15:
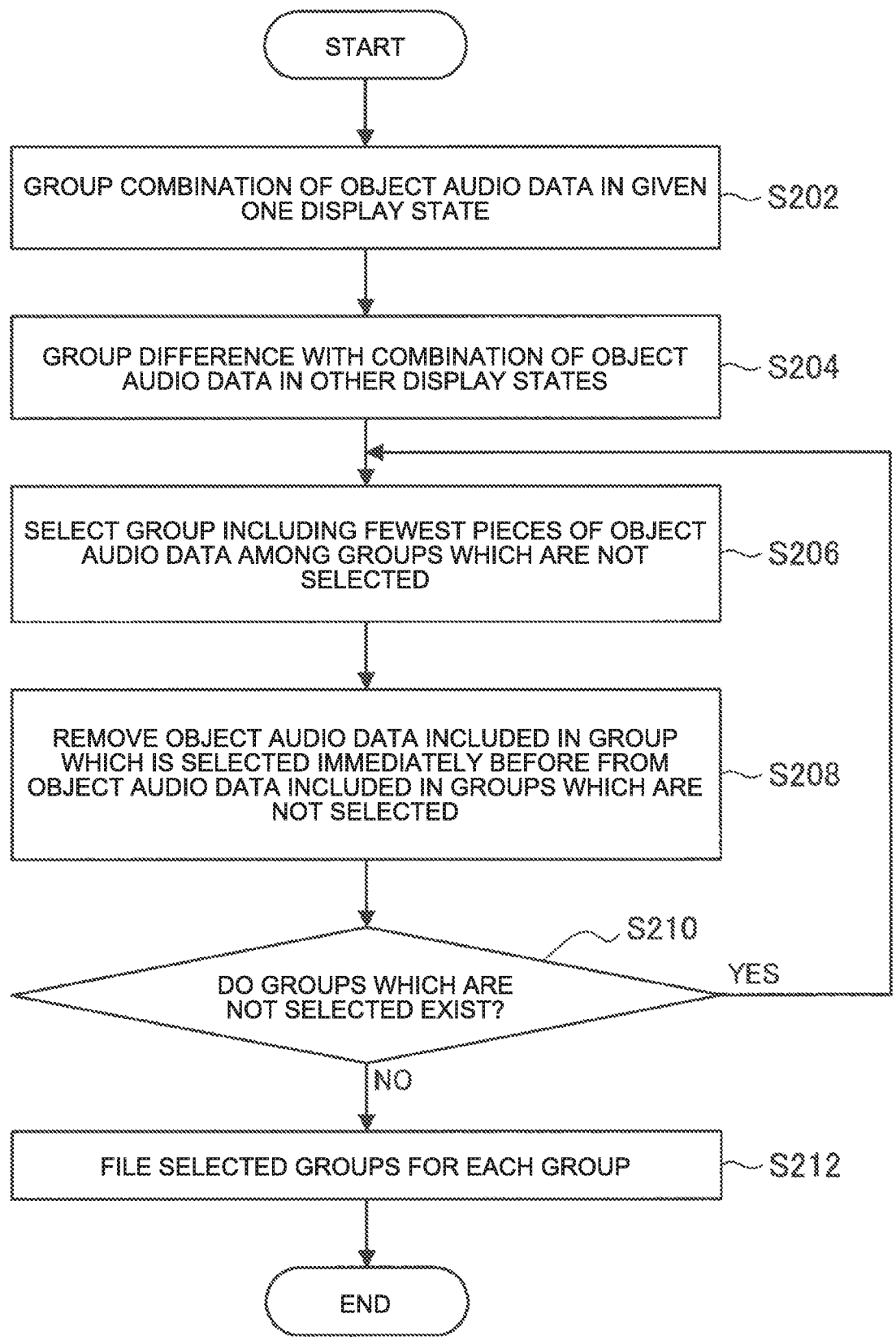
FIG. 15 is a flowchart illustrating flow of filing.

FIG. 15 is a flowchart illustrating flow of filing according to the present embodiment. First, as illustrated in FIG. 15, the segment file generating unit 113 groups combination of object audio data in a given one display state (S202). In step S202, combination of object audio data in the display state can be specified, for example, on the basis of the object selection information corresponding to the display state.

Subsequently, the segment file generating unit 113 groups a difference between a group formed in step S202 and combination of object audio data in other display states (display states other than the one display state used in step S202) (S204). In step S204, the segment file generating unit 113 respectively separately groups combination of object audio data which is to be newly utilized, and combination of object audio data which is not to be utilized when the display state transitions from the one display state used in step S202 to respective display states.

Subsequently, the segment file generating unit 113 selects a group including the fewest pieces of object audio data among groups formed in step S202 and S204 (S206). Note that, in a case where there is a plurality of groups including the fewest pieces of object audio data, it is only necessary to select any one of the plurality of groups. Further, as will be described later, the processing in step S206 may be repeatedly executed a plurality of times, and, in a case where the processing in step S206 is executed second and subsequent times, the segment file generating unit 113 selects a group including the fewest pieces of object audio data among groups which are not selected.

Subsequently, the segment file generating unit 113 removes object audio data included in the group which is selected immediately before from object audio data included in the groups which are not selected (S208).

In a case where groups which are not selected exist (S210: Yes), the processing returns to step S206, and the processing from step S206 to S210 is repeated until all the groups are selected. If the processing is repeated until groups which are not selected no longer exist (S210: No), the segment file generating unit 113 files the selected groups for each group (S212). In step S212, the segment file generating unit 113 generates an audio file by storing one or two or more pieces of object audio data included in each group in one audio file.

Note that the above-described processing from step S202 to S212 can be executed by, for example, the segment file generating unit 113.

The flow of filing according to the present example has been described above. Subsequently, a specific example of filing described above will be described. FIGS. 16 to 18 are explanatory diagrams for explaining a specific example of filing according to the present embodiment.

A specific example where the generating unit 110 generates a file in a case where there are three display states V51, V52 and V53 illustrated in FIG. 16 will be described below. As illustrated in FIG. 16, images including four vocalists H11 to H14 are displayed in all display states V51, V52 and V53. Further, in the display state V51, three pieces of object audio data AD11, AD12 and AD15 are utilized. Further, in the display state V52, four pieces of object audio data AD11, AD12, AD13 and AD14 are utilized. Further, in the display state V53, one piece of object audio data AD16 is utilized.

Operation in a case where processing from step S202 to S204 in FIG. 15 is executed on display states V51 to V53 illustrated in FIG. 16 will be described with reference to FIG. 17. If the processing in step S202 is executed on the display state V51, a group G11 can be obtained as indicated in step S222 in FIG. 17.

Subsequently, if the processing in step S204 is executed on transition from the display state V51 to the display state V52 and transition from the display state V51 to the display state V53, groups G12 to G15 can be obtained as indicated in step S224 in FIG. 17.

Operation in a case where the processing from step S206 to S212 in FIG. 15 is executed on the five groups G11 to G15 illustrated in FIG. 17 will be described with reference to FIG. 18. First, before the processing in step S206 is executed first time, as indicated in step S226 in FIG. 18, the state is a state where all the groups G11 to G15 are unselected. If the processing in step S206 is executed in a state in step S226, for example, the group G12 is selected. Further, if the processing in step S208 is executed, as indicated in step S228 in FIG. 18, object audio data AD15 included in the group G12 which is selected immediately before is removed from the groups G11 and G14. In a state in step S228, because unselected groups exist, it is determined as Yes in step S210, and the processing in step S206 is executed again.

If the processing in step S206 is executed in a state in step S228, for example, the group G15 is selected. Here, in a state in step S228, object audio data AD16 included in the group G15 is not included in other groups. Therefore, even if the processing in step S208 is executed, as indicated in step S230 in FIG. 18, there is no change in object audio data included in each group. In a state in step S230, because unselected groups exist, it is determined as Yes in step S210, and the processing in step S206 is executed again.

If the processing in step S206 is executed in a state in step S230, for example, the group G11 is selected. Here, in a state in step S230, the object audio data included in the group G11 is the same as the object audio data included in the group G14. Therefore, if the processing in step S208 is executed, as indicated in step S232 in FIG. 18, object audio data AD11 and AD12 included in the group G11 which is selected immediately before are removed from the group G14, and the group G14 disappears. In a state in step S232, because unselected groups exist, it is determined as Yes in step S210, and the processing in step S206 is executed again.

If the processing in step S206 is executed in a state in step S232, for example, the group G13 is selected. Here, if the group G13 is selected in a state in step S230, an unselected group no longer exists. Therefore, even if the processing in step S208 is executed, as indicated in step S234 in FIG. 18, there is no change in object audio data included in each group. In a state in step S234, because unselected groups do not exist, it is determined as NO in step S210, and the processing in step S212 is executed.

Figure 18:
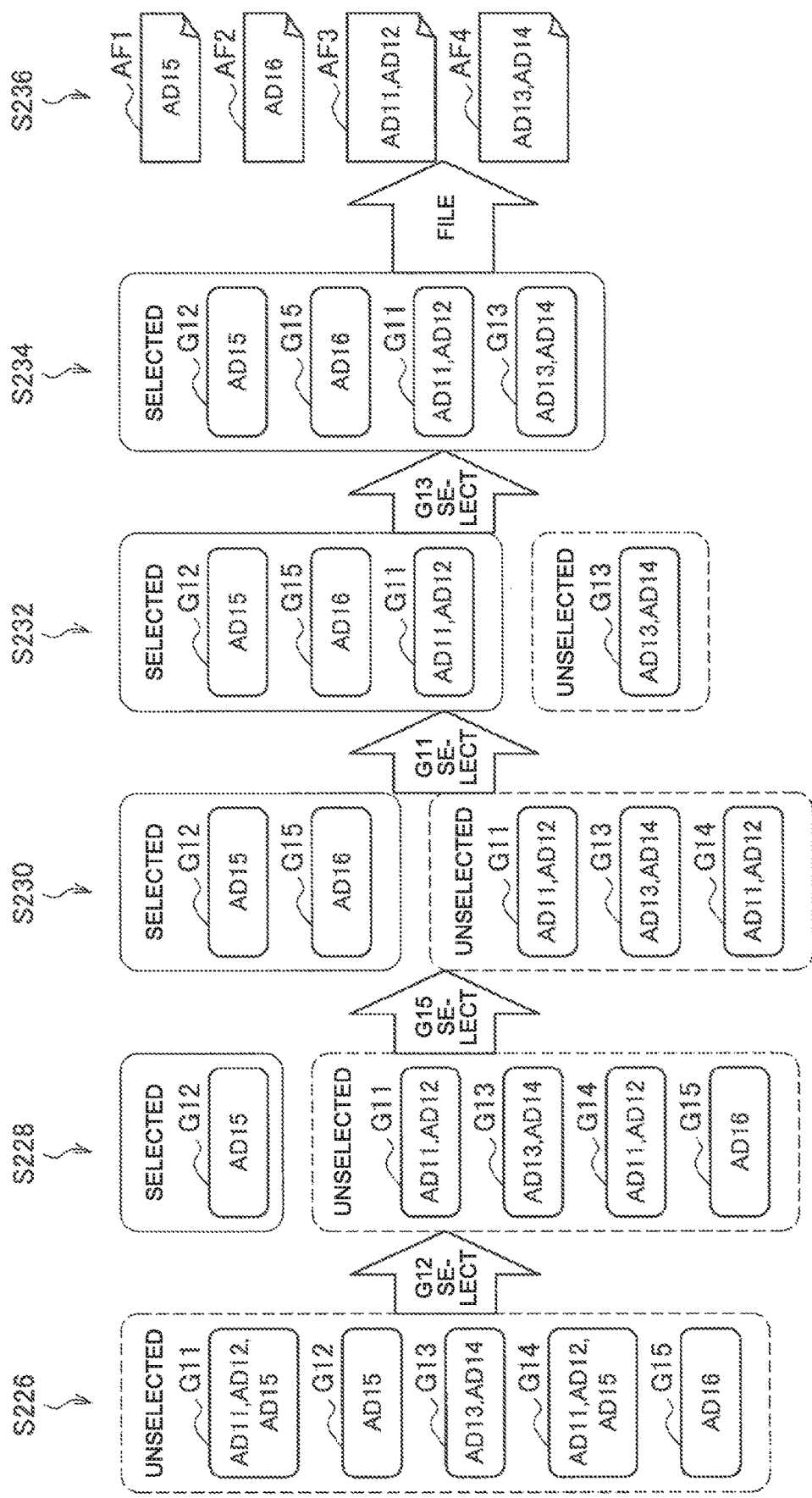
FIG. 18 is an explanatory diagram for explaining a specific example of filing.

If the processing in step S212 is executed in a state in step S234, as indicated in step S236 in FIG. 18, audio files AF1 to AF4 in which object audio data respectively included in the groups G12, G15, G11 and G13 are stored are generated.

As illustrated in FIG. 18, because each piece of the object audio data AD11 to AD16 is stored in any one of the audio files AF1 to AF4, the server 100 does not have to store a plurality of pieces of the same object audio data. Therefore, it is possible to minimize an amount of data of the object audio data to be stored in the server 100.

Figure 16:
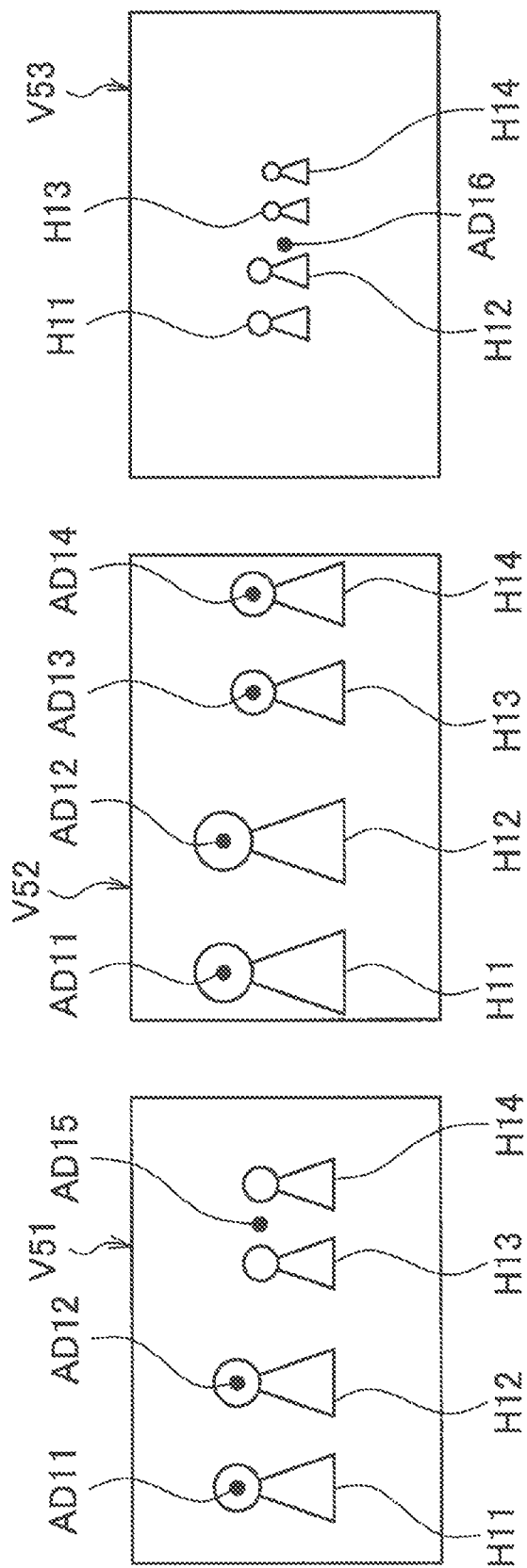
FIG. 16 is an explanatory diagram for explaining a specific example of filing.
Figure 17:
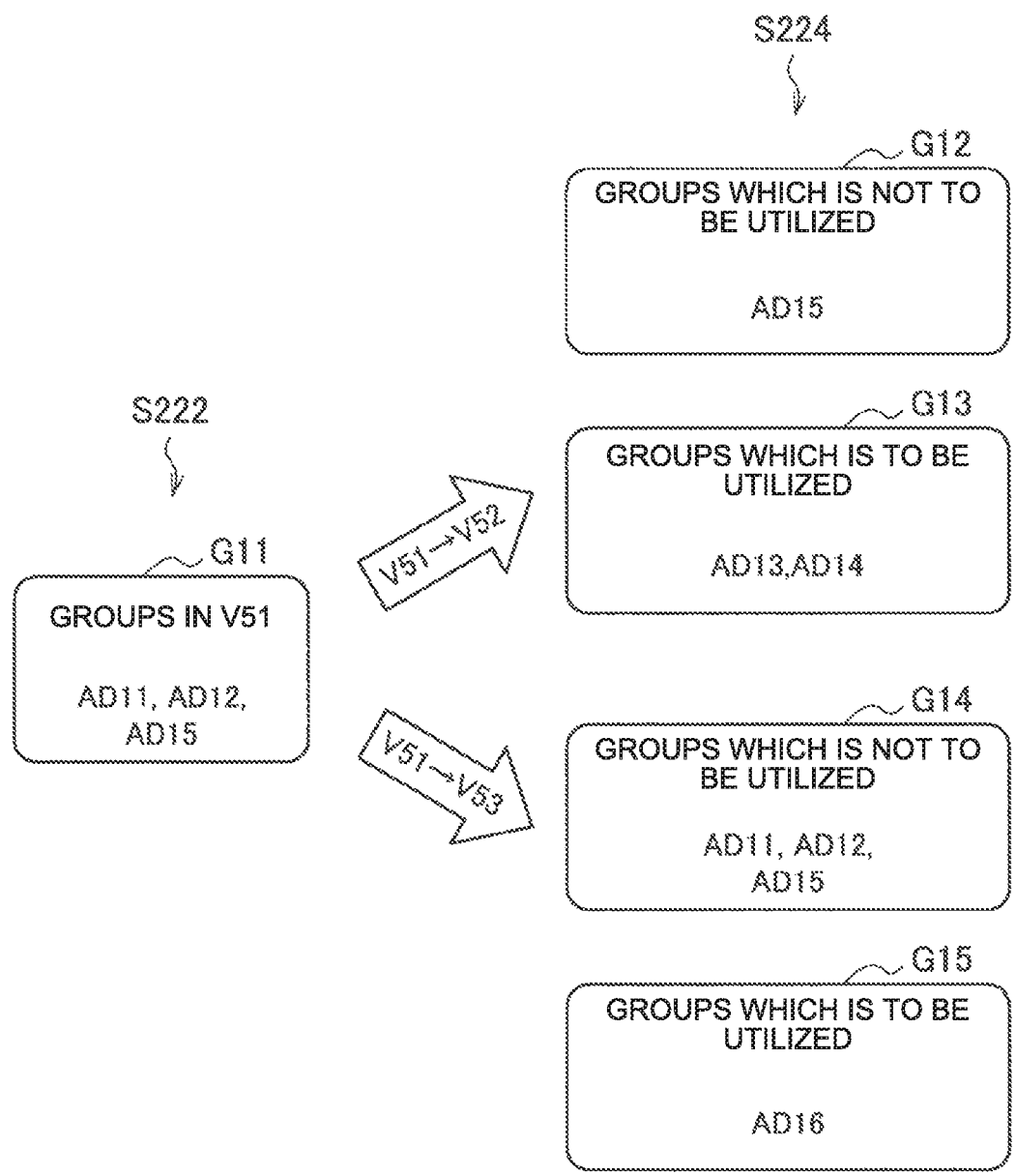
FIG. 17 is an explanatory diagram for explaining a specific example of filing.

Further, by object audio data being filed as illustrated in FIG. 18, it is possible to suppress the number of files to be acquired by the client 200 in respective display states of the display states V51 to V53 illustrated in FIG. 16. For example, in the display state V51 illustrated in FIG. 16, it is only necessary to acquire two audio files of an audio file AF1 and an audio file AF3. Further, in the display state V52 illustrated in FIG. 16, it is only necessary to acquire two audio files of the audio file AF3 and an audio file AF4. Still further, in the display state V53 illustrated in FIG. 16, it is only necessary to acquire one audio file of an audio file AF2.

Meanwhile, in a case where one piece of object audio data is filed so as to be stored in one file, it is necessary to acquire three audio files in the display state V51, four audio files in the display state V52, and one audio file in the display state V51.

Therefore, by the object audio data being filed as illustrated in FIG. 18, compared to a case where one piece of object audio data is filed so as to be stored in one file, the number of audio files to be acquired in the display state V51 and in the display state V52 is suppressed.

As described above, according to the present example, it is possible to generate an audio file so that both an amount of data to be stored in the server 100 and the number of files to be acquired by the client 200 are suppressed.

5. Example of Signaling of Object Selection Information in a Case where Combination of Object Audio Data does not Change Over Time (Example 3)

The example of filing of object audio data in view of a plurality of display states has been described above as Example 2. Subsequently, an example of signaling of object selection information in a case where combination of object audio data to be utilized does not change over time will be described.

Note that information to be signaled can differ depending on whether the object selection information is information using an angle of view described in Example 1-1, or information using an angle between objects described in Example 1-2. Therefore, in the following description, Example 3-1 corresponding to Example 1-1, and Example 3-2 corresponding to Example 1-2 will be sequentially described.

5-1. Example of Signaling of Object Selection Information Using Angle of View (Example 3-1)

First, as Example 3-1, an example of signaling of object selection information using an angle of view described in Example 1-1 will be described. In the present example, in a case where the utilization information described in Example 1-1 is signaled in a file level, and streaming delivery is realized with MPEG-DASH, it is only necessary that the utilization information be signaled in an AdaptationSet level.

Note that an example where the object selection information includes the following information will be described below.
  direction information including information of an angle in a horizontal direction and information of an angle in a vertical direction
  clipping angle of view information including information of a range of a horizontal angle of view and information of a range of a vertical angle of view of a clipped image
  viewing angle of view information including information of a range of a horizontal angle of view and information of a range of a vertical angle of view upon viewing with respect to a displayed image
  utilization information indicating all pieces of AdaptationSet including object audio data to be utilized In the present example, information for the display state is newly signaled with SupplementalProperty. schemeIdUri designates "urn:mpeg:dash:objectAudio:objectSelection", and "direction_azimuth, direction_elevation, clipping_azimuth_range, clipping_elevation_range, viewing_azimuth_range, viewing_elevation_range, and AdaptationSet_list" are sequentially signaled with values while they are separated by commas. FIG. 19 is a table indicating values to be signaled and detailed description (description) of the respective values in the present example.

In the present example, the above-described object selection information can be stored in the MPD file. In the present example, an example of the MPD file to be generated by the MPD file generating unit 114 of the server 100 will be described with reference to FIG. 20 and FIG. 21. FIG. 20 is a view illustrating an example of an MPD file to be generated by an MPD file generating unit 114 in the present embodiment. In addition, FIG. 21 is a table indicating respective pieces of information in the MPD file illustrated in FIG. 20. In a table in FIG. 21, direction information, clipping angle of view information, viewing angle of view information, utilization information and corresponding SupplementalProperty in the MPD file illustrated in FIG. 20 are indicated.

In the MPD file in FIG. 20, combination of predetermined (default) AdaptationSet in preselectionComponents of Preselection is "o2 o3" as indicated in the third line. Further, in the MPD file in FIG. 20, four patterns of SupplementalProperty which are combination different from predetermined combination are indicated from the fourth to the seventh lines. In this manner, by combination of the predetermined AdaptationSet being determined in advance, it is only necessary to prepare SupplementalProperty only for combination in which object audio data to be utilized is different in respective display states.

Figure 22:
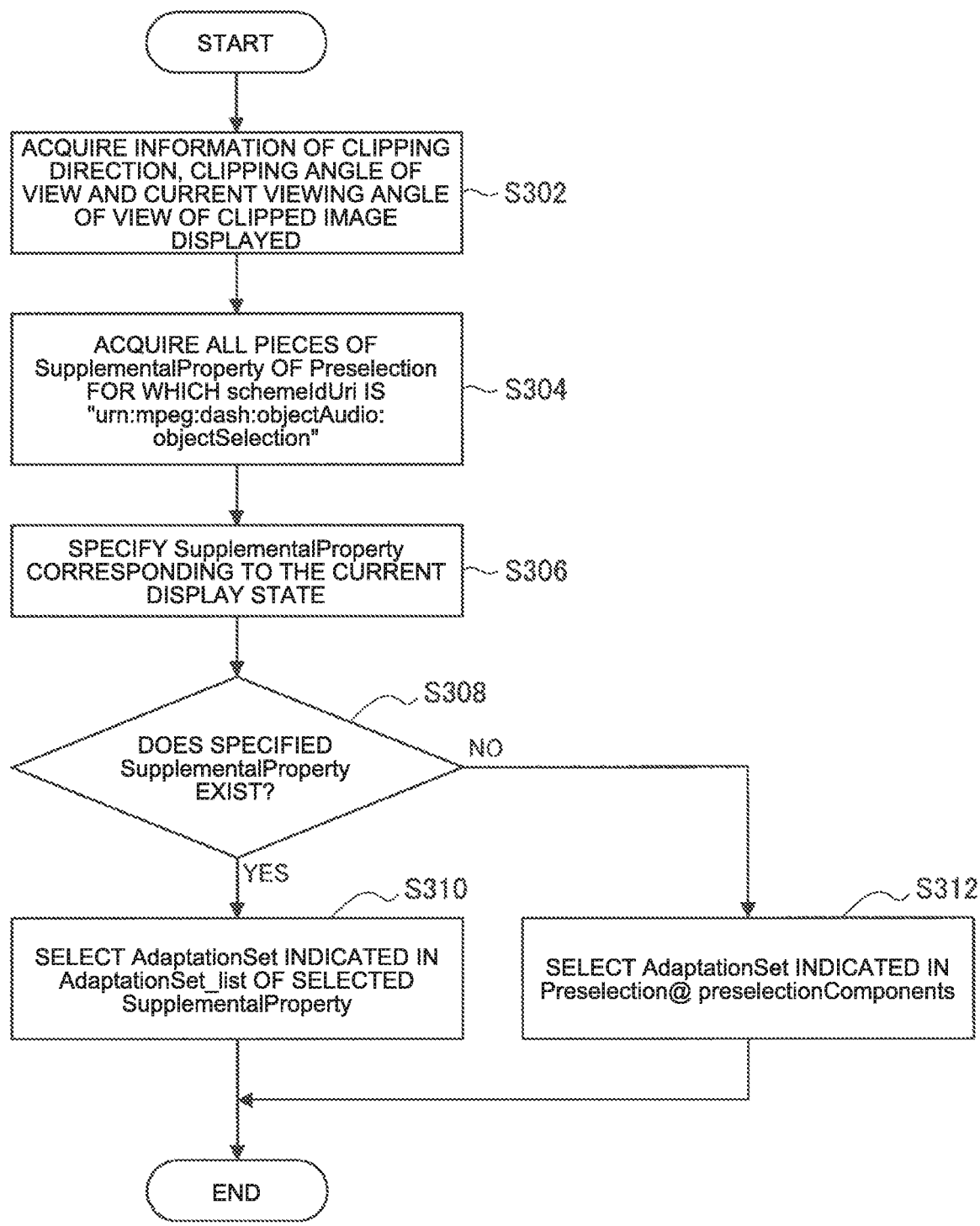
FIG. 22 is a flowchart illustrating an example of a method for selecting AdaptationSet acquired by the client 200.

In an example of the MPD File illustrated in FIG. 20, a method of the processing unit 210 of the client 200 selecting AdaptationSet to be acquired will be described with reference to FIG. 22. FIG. 22 is a flowchart illustrating an example of a method for selecting AdaptationSet acquired by the client 200.

First, as illustrated in FIG. 22, the processing unit 210 acquires information of a clipping direction, a clipping angle of view, and a current viewing angle of view of the clipped image to be displayed by the client 200 (S302).

Subsequently, the processing unit 210 acquires all pieces of SupplementalProperty of Preselection for which schemeIdUri is "urn:mpeg:dash:objectAudio:objectSelection" (S304).

Subsequently, the processing unit 210 specifies SupplementalProperty corresponding to the current display state among SupplementalProperty acquired in step S304 on the basis of the information acquired in step S302 (S306). For example, SupplementalProperty specified in step S306 may be SupplementalProperty for which values of direction_azimuth and direction_elevation are close to the clipping direction of the clipped image to be displayed by the client 200. Further, SupplementalProperty specified in step S306 may be SupplementalProperty for which the clipping angle of view of the clipped image to be displayed by the client 200 is included in clipping_azimuth_range and clipping_elevation_range. Still further, SupplementalProperty specified in step S306 may be SupplementalProperty for which a current viewing angle of view is included in viewing_azimuth_range and viewing_elevation_range. Note that, in a case where SupplementalProperty which satisfies the above-described conditions does not exist, the processing unit 210 does not have to specify any SupplementalProperty in step S306.

In a case where SupplementalProperty corresponding to the current display state is specified (S308: Yes), the processing unit 210 selects AdaptationSet indicated in AdaptationSet_list of the specified SupplementalProperty (S310).

Meanwhile, in a case where SupplementalProperty corresponding to the current display state is not specified (S308: No), the processing unit 210 selects predetermined (default) AdaptationSet indicated in Preselection@preselectionComponents (S312).

Note that the processing from step S302 to S312 illustrated in FIG. 22 can be executed by, for example, the segment file selecting unit 213.

An example of the MPD file according to the present example has been described above. However, in the present example, the MPD file to be generated is not limited to the example illustrated in FIG. 20.

For example, as a modified example of the MPD file in a case where Preselection is used, AdaptationSet_list of a value of SupplementalProperty may be signaled with preselectionComponents. FIG. 23 is a view illustrating an example of an MPD file to be generated by an MPD file generating unit 114 in the modified example. In the MPD file in FIG. 23, as indicated in the third line, the seventh line and the eighth line, Preselection is separated, and a portion which becomes AdaptationSet_list is indicated as preselectionComponents. Other portions of the MPD file illustrated in FIG. 23 are similar to the MPD file illustrated in FIG. 20.

As another modified example, viewing_azimuth_range and viewing_elevation_range do not have to be included (set) in the MPD file. In such a case, in step S306 in FIG. 22, it is only necessary to select AdaptationSet only using direction_azimuth, direction_elevation, clipping_azimuth_range and clipping_elevation_range. However, in such a case, because a viewing angle of view is not taken into account, the selected AdaptationSet may not be the most appropriate AdaptationSet.

As still another modified example, in addition to direction_azimuth and direction_elevation, direction_angle may be included in the MPD file as the direction information. Here, direction_angle indicates an angle from the clipping direction vector described in Example 1-1.

As yet another modified example, in place of direction_azimuth and direction_elevation, direction_azimuth_range and direction_elevation_range may be included in the MPD file as the direction information. Here, direction_azimuth_range indicates the range of the angle in the horizontal direction described in Example 1-1, and direction_elevation_range indicates the range of the angle in the vertical direction described in Example 1-1.

As a further modified example, in place of clipping_azimuth_range, clipping_elevation_range, viewing_azimuth_range and viewing_elevation_range, clipping_magnification_range and viewing_magnification_range may be included as the clipping angle of view information and the viewing angle of view information. Here, clipping_magnification_range indicates the range of the magnification of the angle of view upon clipping described in Example 1-1, and viewing_magnification_range indicates the range of the magnification of the viewing angle of view described in Example 1-1.

As a still further modified example, AdaptationSet_list may be replaced with a list of a difference with preselectionComponents. For example, AdaptationSet_list may be replaced with AdaptationSet_del_list and AdaptationSet_add_list. AdaptationSet_del_list is a list of AdaptationSet which is to be deleted from preselectionComponents, and AdaptationSet@id are described while they are separated by space. Further, AdaptationSet_add_list is a list of AdaptationSet which is to be added to preselectionComponents, and AdaptationSet@id are described while they are separated by space. Note that AdaptationSet_del_list and AdaptationSet_add_list correspond to information indicating a difference of combination of object audio data to be utilized with respect to combination of the predetermined object audio data, described in Example 1-1.

As a yet further modified example, SupplementalProperty may be signaled in AdaptationSet. In a case where combination of object audio data is stored in one file (in a case where object audio data is not stored in a plurality of files), because Preselection is not utilized, by signaling SupplementalProperty in AdaptationSet, it is possible to select AdaptationSet to be utilized.

5-2. Example of Signaling of Object Selection Information Using Angle Between Objects (Example 3-2)

The example of signaling of object selection information using the angle of view has been described above as Example 3-1. Next, as Example 3-2, an example of signaling of object selection information using an angle between objects described in Example 1-2 will be described. In the present example, in a case where the utilization information described in Example 1-2 is signaled in a file level, and streaming delivery is realized with MPEG-DASH, it is only necessary that the utilization information be signaled in an AdaptationSet level.

Note that an example where the object selection information includes the following information will be described below.

- position information of two objects between which an angle is to be calculated
- angle information including information of a range of an angle between objects, which becomes a threshold
- utilization information indicating all pieces of AdaptationSet including object audio data to be utilized In the present example, information for the display state is newly signaled with SupplementalProperty. schemeIdUri designates "urn:mpeg:dash:objectAudio:objectSelectionAngle", and "object1_azimuth, object1_elevation, object2_azimuth, object2_elevation, threshold_range, AdaptationSet_list" are sequentially signaled with values while they are separated by commas. FIG. 24 is a table indicating values to be signaled and detailed description of the respective values in the present example.

In the present example, an example of the MPD file to be generated by the MPD file generating unit 114 of the server 100 will be described with reference to FIG. 25 and FIG. 26. FIG. 25 is a view illustrating an example of an MPD file to be generated by an MPD file generating unit 114 in the present embodiment. In addition, FIG. 26 is a table indicating respective pieces of information in the MPD file illustrated in FIG. 25. In the table in FIG. 25, position information of the first object, position information of the second object, angle information, utilization information and corresponding SupplementalProperty in the MPD file illustrated in FIG. 25 are indicated.

In the MPD file in FIG. 25, combination of predetermined (default) AdaptationSet in preselectionComponents of Preselection is "o2 o3" as indicated in the third line. Further, in the MPD file in FIG. 25, two patterns of SupplementalProperty which are combination different from predetermined combination are indicated from the fourth to the fifth lines. In this manner, by combination of the predetermined AdaptationSet being determined in advance, it is only necessary to prepare SupplementalProperty only for combination in which object audio data to be utilized is different in respective display states.

Figure 27:
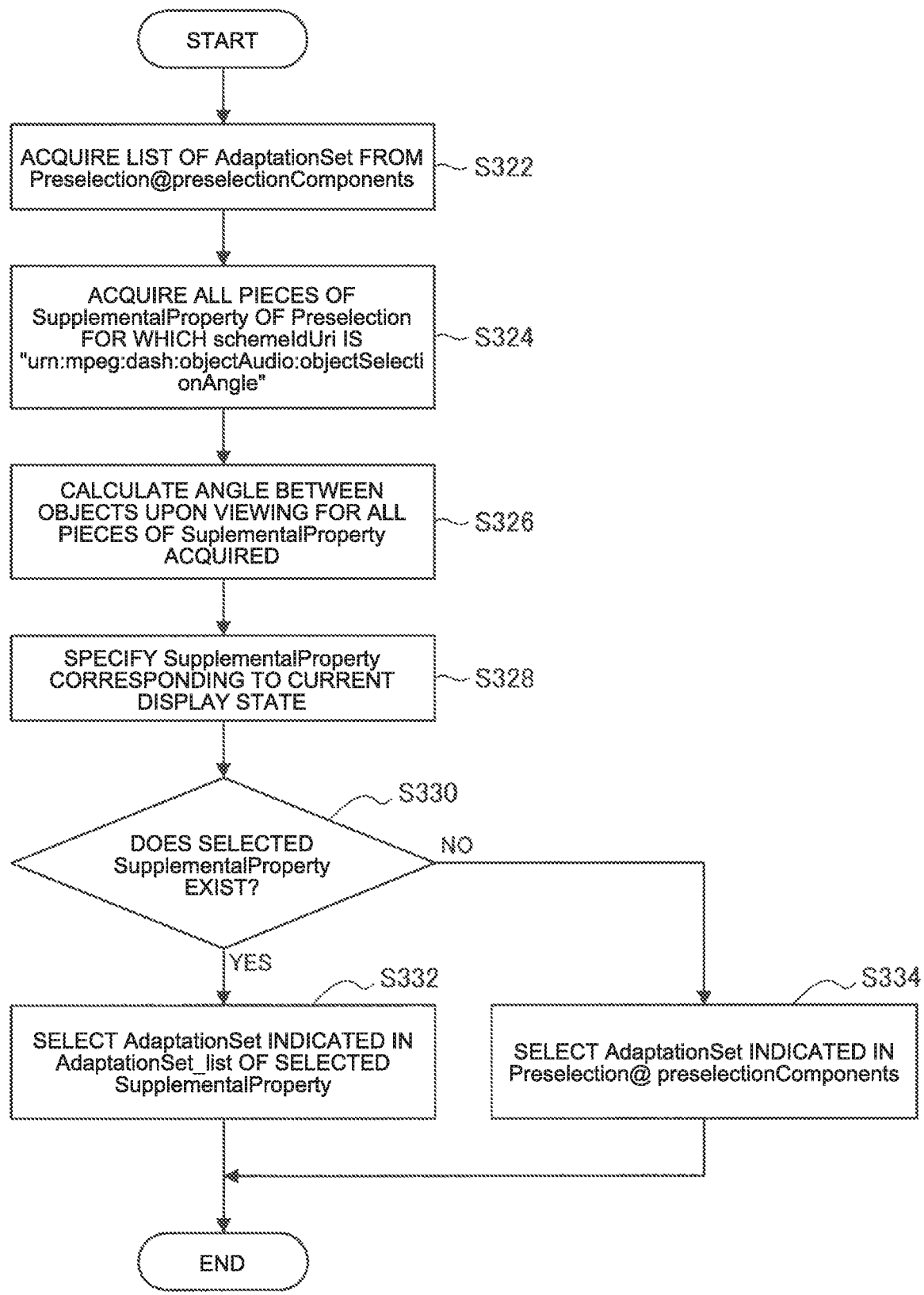
FIG. 27 is a flowchart illustrating an example of a method for selecting AdaptationSet acquired by the client 200.

In an example of the MPD File illustrated in FIG. 25, a method of the processing unit 210 of the client 200 selecting AdaptationSet to be acquired will be described with reference to FIG. 27. FIG. 27 is a flowchart illustrating an example of a method for selecting AdaptationSet acquired by the client 200.

First, as illustrated in FIG. 27, the processing unit 210 acquires a list of AdaptationSet from Preselection@ preselectionComponents (S322). Subsequently, the processing unit 210 acquires all pieces of SupplementalProperty of Preselection for which schemeIdUri is "urn:mpeg:dash:objectAudio:objectSelectionAngle" (S324).

Subsequently, the processing unit 210 calculates an angle between objects upon viewing for all pieces of SuplementalProperty acquired in step S324 (S326). In step S326, the processing unit 210 calculates positions of objects upon viewing on the basis of object1_azimuth, object1_elevation, object2_azimuth and object2_elevation in each piece of SupplementalProperty and calculates an angle between the objects upon viewing.

Subsequently, the processing unit 210 specifies SupplementalProperty corresponding to the current display state among SupplementalProperty acquired in step S324 on the basis of the angle between the objects calculated in step S326 (S328). For example, in step S328, the processing unit 210 may specify SupplementalProperty for which the angle between the objects calculated in step S326 is included in threshold_range among SupplementalProperty acquired in step S324. Note that, in a case where SupplementalProperty which satisfies the above-described conditions does not exist, the processing unit 210 does not have to specify any SupplementalProperty in step S328.

In a case where SupplementalProperty corresponding to the current display state is specified (S330: Yes), the processing unit 210 selects AdaptationSet indicated in AdaptationSet_list of the specified SupplementalProperty (S332).

Meanwhile, in a case where SupplementalProperty corresponding to the current display state is not specified (S330: No), the processing unit 210 selects predetermined (default) AdaptationSet indicated in Preselection@preselectionComponents (S334).

Note that the processing from step S322 to S334 illustrated in FIG. 27 can be executed by, for example, the segment file selecting unit 213.

An example of the MPD file according to the present example has been described above. However, in the present example, the MPD file to be generated is not limited to the example illustrated in FIG. 25.

For example, as a modified example, the position information of the objects may be acquired from a metadata file. For example, in a case where a metadata file which stores only object metadata including position information of all objects exists, link for accessing the metadata file (an example of metadata file access information) may be signaled. Note that such a metadata file can be interpreted as a metadata file including (part of) object selection information. Further, such a metadata file may be generated by, for example, the segment file generating unit 113 of the server 100 and stored in the storage unit 140 of the server 100.

FIG. 28 is a view illustrating an example of an MPD file to be generated by an MPD file generating unit 114 in the modified example. In the MPD file in FIG. 28, object1_azimuth, object1_elevation, object2_azimuth and object2_elevation are not included. Instead, in the MPD file in FIG. 28, as indicated in the fourth line and the fourteenth line, link to the metadata file (an example of the metadata file access information) is stored in SupplementalProperty of AdaptationSet. Further, in the MPD file in FIG. 28, as indicated in the fifth line and the sixth line, two objects between which an angle is to be calculated are indicated with id (object_metadata_AdaptationSet) of AdaptationSet of the metadata file and two numbers (object1_num and object2_num) of object metadata in id.

The segment file acquiring unit 214 of the client 200 generates request information of the metadata file on the basis of such link to the metadata file to obtain position information of the objects, and acquires the metadata file from the server 100. Then, the segment file acquiring unit 214 acquires azimuth information and elevation information of the corresponding objects from the metadata file as the position information.

As another modified example, in place of AdaptationSet_list, a list of AdaptationSet before being replaced in a case where the angle is included in threshold_range (before_AdaptationSet_list) and a list of AdaptationSet after being replaced (after_AdaptationSet_list) may be included in the MPD file. For example, this method can be utilized also in a case where three or more pieces of object audio data are integrated (mixed) into one piece of object audio data.

Further, while an example of calculation of an angle from positions of the two objects has been described above, angle information also including spread may be used using spread information included in the object metadata. In a case where signaling is performed with a value of SupplementalProperty, spread information is added to each of object1 and object2. Specifically, spread_width, spread_height and spread_radius may be included in the MPD file while they are separated by space. If they are not separated by space, only spread_width may be used.

Further, as threshold_range, a threshold in the horizontal direction (threshold_azimuth_range) and a threshold in the vertical direction (threshold_elevation_range) may be separately included in the MPD file. The processing unit 210 of the client 200 may utilize only the horizontal direction, only the vertical direction or both. Further, information designating whether to utilize only the horizontal direction, only the vertical direction or both may be included in the MPD file.

6. Example of Signaling of Object Selection Information in a Case where Combination of Object Audio Data Changes Over Time (Example 4)

The example of signaling of the object selection information in a case where combination of object audio data to be utilized does not change over time has been described above. Subsequently, an example of signaling of the object selection information in a case where combination of the object audio data to be utilized changes over time will be described. Note that whether or not combination of the object audio data to be utilized changes over time can be, for example, selected as appropriate by a creator of content.

In streaming delivery using MPEG-DASH, combination of object audio data to be utilized for each time or combination of necessary files can be stored in a content file and transmitted. Here, the content file may be, for example, an ISO base media file format (ISOBMFF) file (an example of an MP4 file) for which standards are defined in ISO/IEC 14496-12.

In a case where combination of the object audio data to be utilized changes over time, the client 200 only requires to acquire this ISOBMFF file in advance and determine the file to be acquired in accordance with time. In the following description, seven examples (Example 4-1 to Example 4-7) will be described concerning signaling of object selection information in a case where combination of object audio data changes over time. In Example 4-1 to Example 4-7 described below, an example will be described where the object selection information is stored in a metadata file included in the ISOBMFF file.

6-1. Example of Extended Metadata File (Example 4-1)

First, as Example 4-1, an example where the segment file generating unit 113 generates an extended metadata file will be described.

Figure 29:
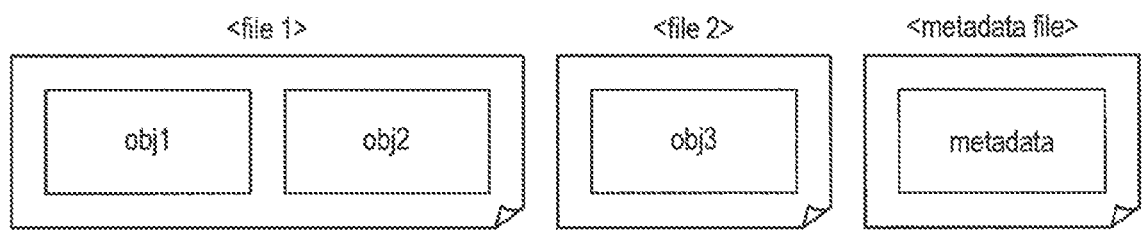
FIG. 29 is an explanatory diagram for explaining a structure of a metadata file.
Figure 30:
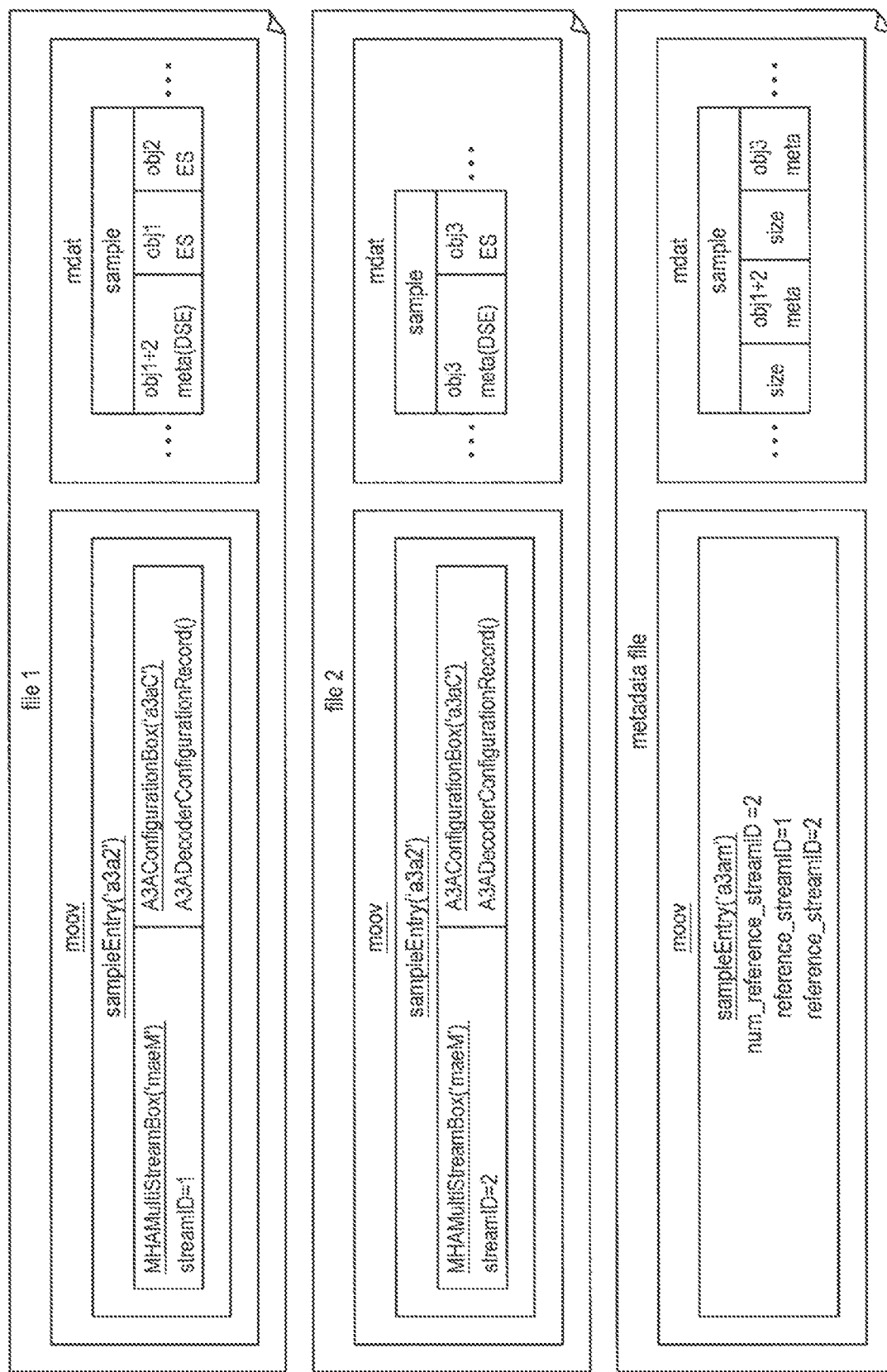
FIG. 30 is an explanatory diagram for explaining a structure of a metadata file.

First, an example of a structure of a metadata file before being extended will be described with reference to FIG. 29 and FIG. 30. FIGS. 29 and 30 are explanatory diagrams for explaining a structure of a metadata file. As illustrated in FIG. 30, an audio file 1 (file1) illustrated in FIG. 29 includes object audio data 1 (obj1) and object audio data 2 (obj2). In this audio file 1, streamID which is an identifier of a file is stored in MHAMultiStreamBox ('maeM'), and streamID indicates "1". An object audio file 2 (file2) illustrated in FIG. 29 includes object audio data 3 (obj3) as illustrated in FIG. 30, and streamID indicates "2".

The metadata file (metadata file) illustrated in FIG. 29 includes object metadata (metadata) included in the audio file 1 and the audio file 2. As illustrated in FIG. 30, reference_streamID of sampleEntry ('a3am') of the metadata file (metadata file) indicates which file of object metadata is included. In this metadata file, sampleEntry (sample entry) indicates that object metadata of two files is included (num_reference_streamID=2), the first object metadata included in a sample is object metadata of a file whose streamID=1 (reference_streamID=1), and the second object metadata is object metadata of a file whose streamID=2 (reference_streamID=2). FIG. 31 is a view illustrating a syntax of the metadata file illustrated in FIG. 29 and FIG. 30.

Note that MHAMultiStreamBox has a structure illustrated in FIG. 61, 3da_meta_data( ) has a structure illustrated in FIG. 62, and DSE has a structure illustrated in FIG. 63. Note that 3da_ancillary_data stored in data_stream_byte in DSE illustrated in FIG. 63 has a structure illustrated in FIG. 64. However, in a case where a size of 3da_meta_data( ) is larger than a maximum size of data_stream_byte of DSE, 3da_meta_data( ) is divided and stored in a plurality of pieces of DSE.

In the present example, the metadata file described with reference to FIG. 29 to FIG. 31 is extended. In the present example, the segment file generating unit 113 generates the extended metadata file in which object selection information for selecting object audio data is to be stored. An example of the extended metadata file to be generated in the present example will be described below with reference to FIG. 32 and FIG. 33.

Figure 32:
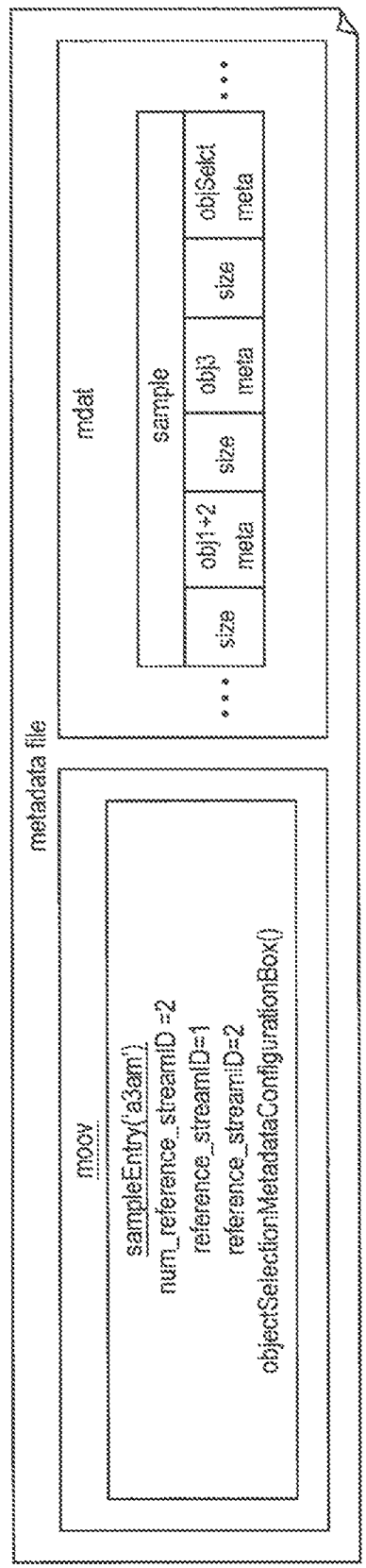
FIG. 32 is a view illustrating an example of an extended metadata file.

FIG. 32 is a view illustrating an example of an extended metadata file according to the present example. In addition, FIG. 33 is a view illustrating a syntax of the extended metadata file according to the present example.

As illustrated in FIG. 32 and FIG. 33, in the extended metadata file, objectSelectionMetadataConfigurationBox( ) is additionally stored in SampleEntry ('a3am') of moov box, and objectSelectionMetadata( ) is additionally stored in sample of mdat. The object selection information can be stored in such objectSelectionMetadataConfigurationBox( ) and objectSelectionMetadata( ). Further, as illustrated in FIG. 33, in the extended metadata file, combination of object audio data to be utilized or files for each time is indicated in objectSelectionMetadata( ). Further, as illustrated in FIG. 33, in the extended metadata file, objectSelectionMetadataConfigurationBox( ) stores information indicating in which file the object audio data is stored, indicated with objectSelectionMetadata( ). Note that details of objectSelectionMetadataConfigurationBox( ) and objectSelectionMetadata( ) will be described later.

Note that extension of the metadata file described with reference to FIG. 32 and FIG. 33 can be similarly performed for a metadata file of MPEG-H 3D Audio.

6-2. Example of Object Selection Metadata File (Example 4-2)

The extended metadata file has been described above as Example 4-1. Subsequently, as Example 4-2, an example of generation of a metadata file dedicated for object selection (hereinafter, referred to as an object selection metadata file) will be described with reference to FIG. 34 and FIG. 35. In the present example, the object selection metadata file may be generated by the segment file generating unit 113, and may include only the object selection information.

Figure 34:
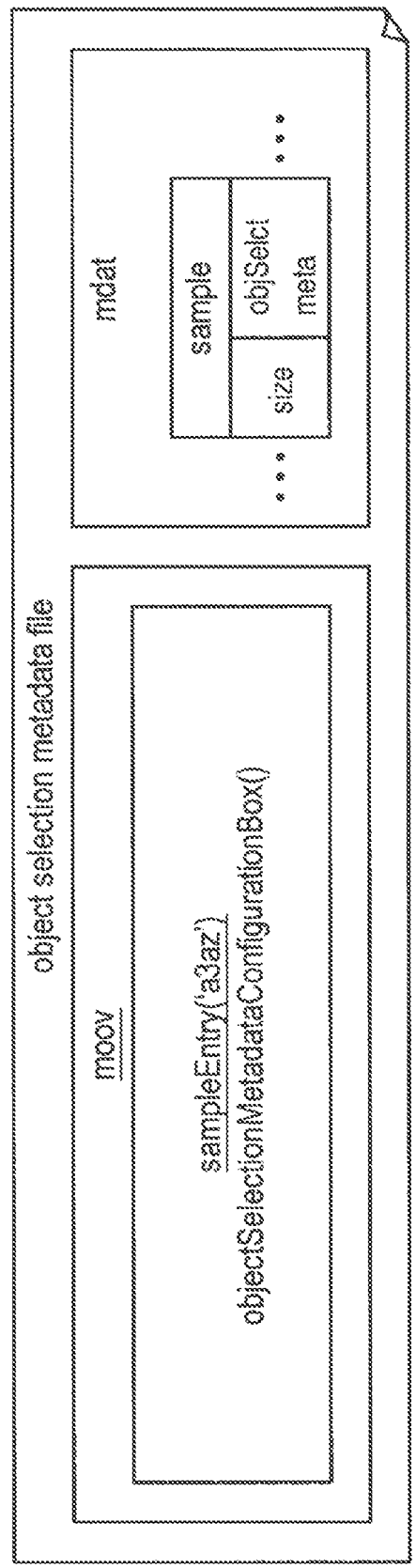
FIG. 34 is a view illustrating an example of an object selection metadata file.

FIG. 34 is a view illustrating an example of an object selection metadata file according to the present example. In addition, FIG. 35 is a view illustrating a syntax of the object selection metadata file according to the present example.

As illustrated in FIG. 34 and FIG. 35, in the object selection metadata file, objectSelectionMetadataConfigurationBox( ) is stored in SampleEntry of moov box in a similar manner to the extended metadata file described above. Further, as illustrated in FIG. 34 and FIG. 35, in the object selection metadata file, objectSelectionMetadata( ) is stored in sample of mdat in a similar manner to the extended metadata file described above. Note that details of objectSelectionMetadataConfigurationBox( ) and objectSelectionMetadata( ) will be described later.

Note that the object selection metadata file described with reference to FIG. 34 and FIG. 35 can be similarly generated also in MPEG-H 3D Audio.

6-3. Storage Example of Object Selection Information Using Angle of View (Example 4-3)

Subsequently, as Example 4-3, an example where the object selection information using the angle of view described in Example 1-1 is stored in the above-described metadata file will be described. The present example may be combined with either Example 4-1 or Example 4-2 described above. In the following description, objectSelectionMetadataConfigurationBox and objectSelectionMetadata according to the present example will be described.

FIG. 36 is a view illustrating an example of objectSelectionMetadataConfigurationBox according to the present example. Further, FIG. 37 is a table indicating values of objectSelectionMetadataConfigurationBox illustrated in FIG. 36 and detailed description of the respective values. As illustrated in FIG. 37, in objectSelectionMetadataConfigurationBox illustrated in FIG. 36, an audio file including object_id indicated in objectSelectionMetadata is indicated with stream_id, and what number of object audio data is the object audio data is indicated with object_num_in_stream. In the present example, streamID (stream_id) is information for accessing an audio file in which the object audio data is stored (hereinafter, also referred to as audio file access information). Further, predetermined (default) object audio data to be utilized is indicated with default_object_id.

FIG. 38 is a view illustrating an example of objectSelectionMetadata according to the present example. In addition, FIG. 39 is a table indicating values of objectSelectionMetadata illustrated in FIG. 38 and detailed description of the respective values. In objectSelectionMetadata illustrated in FIG. 38, the number of pieces of SupplementalProperty in Example 3-1 is indicated with mixed_object_list_num. Further, concerning other parameters, a portion indicating the list of AdfaptationSet in Example 3-1 is indicated with a list of id(object_id) of object audio data (hereinafter, also referred to as an object list). It is possible to indicate combination of object audio data to be acquired by combining the present example with the above-described Example 4-1 or Example 4-2.

Note that objectSelectionMetadata according to the present example is not limited to the examples illustrated in FIG. 38 and FIG. 39. For example, as a modified example, in place of the fourteenth to the seventeenth lines of objectSelectionMetadata illustrated in FIG. 38, a difference from default object indicated in objectSelectionMetadataConfigurationBox may be indicated. FIG. 40 is a view illustrating a modified example of such objectSelectionMetadata. Note that FIG. 40 illustrates only a portion which can be replaced with the fourteenth to the seventeenth lines of objectSelectionMetadata illustrated in FIG. 38. In addition, FIG. 41 is a table indicating detailed description of the respective values illustrated in FIG. 40.

As another modified example, in addition to direction_azimuth and direction_elevation, direction_angle may be included in objectSelectionMetadata as the direction information. Here, direction_angle indicates an angle from the clipping direction vector described in Example 1-1.

As a still further modified example, as the direction information, in place of direction_azimuth and direction_elevation, min_direction_azimuth_range, maz_direction_azimuth_range, min_direction_elevation_range and max_direction_elevation_range may be included in objectSelectionMetadata. Here, min_direction_azimuth_range, and maz_direction_azimuth_range indicate the range of the angle in the horizontal direction described in Example 1-1, and min_direction_elevation_range, and max_direction_elevation_range indicate the range of the angle in the vertical direction described in Example 1-1.

As a yet another modified example, as the clipping angle of view information and the viewing angle of view information, in place of min_clipping_azimuth_range, max_clipping_azimuth_range, min_clipping_elevation_range, max_clipping_elevation_range, max_viewing_azimuth_range, min_viewing_elevation_range and min_viewing_elevation_range, min_clipping_magnification_range, max_clipping_magnification_range, min_viewing_magnification_range and max_viewing_magnification_range may be included in objectSelectionMetadata. Here, min_clipping_magnification_range and max_clipping_magnification_range indicate a range of magnification of an angle of view upon clipping described in Example 1-1, and min_viewing_magnification_range and max_viewing_magnification_range indicate a range of magnification of a viewing angle of view described in Example 1-1.

As a further modified example, in objectSelectionMetadataConfigurationBox and objectSelectionMetadata, combination of files may be indicated instead of combination of object audio data. Such a modified example will be described with reference to FIG. 42 to FIG. 45.

FIG. 42 is a view illustrating an example of objectSelectionMetadataConfigurationBox according to the present example. Further, FIG. 43 is a table indicating values of objectSelectionMetadataConfigurationBox illustrated in FIG. 42 and detailed description of the respective values. In objectSelectionMetadataConfigurationBox illustrated in FIG. 42, information indicating in which file object audio data is included, and information of predetermined object audio data to be utilized are not included. Then, in objectSelectionMetadataConfigurationBox illustrated in FIG. 42, combination of audio files to be utilized in a predetermined (default) state is indicated using stream_id as default_stream_id. FIG. 44 is a view illustrating an example of objectSelectionMetadata according to the present modified example. Further, FIG. 45 is a table indicating values of objectSelectionMetadata illustrated in FIG. 44 and detailed description of the respective values. Also in objectSelectionMetadata illustrated in FIG. 44, instead of combination of object audio data, combination of audio files is indicated using stream_id. Also in the present example, stream_id is audio file access information for accessing an audio file in which object audio data is stored.

According to the present example described with reference to FIG. 42 to FIG. 45, advantages are provided that the client 200 does not have to determine a file including object audio data to be acquired.

6-4. Storage Example of Object Selection Information Using Angle Between Objects (Example 4-4)

The storage example of the object selection information using the angle of view has been described above as Example 4-3. Subsequently, as Example 4-4, an example where the object selection information using the angle between objects described in Example 1-2 is stored in the above-described metadata file will be described. The present example may be combined with either Example 4-1 or Example 4-2 described above.

In the present example, objectSelectionMetadataConfigurationBox may be similar to objectSelectionMetadataConfigurationBox in Example 4-3 described above. In the following description, objectSelectionMetadata according to the present example will be described.

FIG. 46 is a view illustrating an example of objectSelectionMetadata according to the present example. In addition, FIG. 47 is a table indicating values of objectSelectionMetadata illustrated in FIG. 46 and detailed description of the respective values. In objectSelectionMetadata illustrated in FIG. 46, the number of pieces of SupplementalProperty in Example 3-2 is indicated with mixed_object_list_num. Further, concerning other parameters, a portion indicating the list of AdfaptationSet in Example 3-2 is indicated with a list of id(object_id) of object audio data. It is possible to indicate combination of object audio data to be acquired by combining the present example with the above-described Example 4-1 or Example 4-2.

Note that objectSelectionMetadata according to the present example is not limited to the examples illustrated in FIG. 46 and FIG. 47. For example, as a modified example, in place of the tenth to the thirteenth lines of objectSelectionMetadata illustrated in FIG. 46, a list of objects before default object indicated in objectSelectionMetadataConfigurationBox is replaced and a list of objects after default object is replaced may be included. FIG. 48 is a view illustrating a modified example of such objectSelectionMetadata. Note that FIG. 48 illustrates only a portion which can be replaced with the tenth to the thirteenth lines of objectSelectionMetadata illustrated in FIG. 46. In addition, FIG. 49 is a table indicating detailed description of the respective values illustrated in FIG. 48.

As another modified example, position information of the objects may be acquired from object metadata. For example, objectSelectionMetadata according to the present modified example may include object1_id and object2 id in place of object1_azimuth, object1_elevation, object2_azimuth and object2_elevation. Further, the processing unit 210 of the client 200 may acquire azimuth and elevation from the object metadata. In a case where objectSelectionMetadata is not included in the object metadata, it is only necessary to extend track reference, set reference_type 'obmt', designate a track of object metadata, and perform signaling so that the object metadata on the track can be utilized.

6-5. Example of Signaling which Enables Selection of Object Selection Information (Example 4-5)

Subsequently, as Example 4-5, there is described an example which can realize various structures by including additional information in objectSelectionMetadataConfigurationBox described in Example 4-3 and Example 4-4. For example, in the present example, it is possible to signal information indicating whether object audio data is indicated with a list of object audio files as described with reference to FIG. 36 or indicated with a list of files (stream) as described with reference to FIG. 42.

FIG. 50 is a view illustrating an example of objectSelectionMetadataConfigurationBox according to the present example. In addition, FIG. 51 is a table indicating values of objectSelectionMetadataConfigurationBox illustrated in FIG. 50 and detailed description of the respective values.

objectSelectionMetadataConfigurationBox illustrated in FIG. 50 includes list_is_object which is a flag indicating objectSelectionMetadataConfigurationBox of which type of FIG. 36 and FIG. 42 is signaled, and sample_type indicating a structure of objectSelectionMetadata. According to such a configuration, it is possible to realize various structures.

6-6. Example of Signaling with MPD File (Example 4-6)

Subsequently, an example of signaling of an ISOBMFF file including object selection information with an MPD file will be described as Example 4-6. The MPD file described in the present example can be generated by the MPD file generating unit 114 of the server 100. Further, in the MPD file generated in the present example, metadata file access information for accessing a metadata file including the object selection information is stored.

First, an example of the MPD file generated by the MPD file generating unit 114 of the server 100 in a case where the object selection information is stored in the extended metadata file described above as Example 4-1 will be described with reference to FIG. 52. FIG. 52 is a view illustrating an example of an MPD file to be generated according to the present example.

In the MPD file in FIG. 52, as indicated in the third line, schemeIdUri designates urn:mpeg:dash:objectAudio:objectMetadataFile in SupplementalProperty of Preselection, and AdaptationSet@id of the metadata file is designated with a value. Further, as indicated in the twelfth line in the MPD file in FIG. 52, in AdaptationSet including the metadata file, schemeIdUri designates urn:mpeg:dash:objectAudio:objectMetadataStreamID in SupplementalProperty, so that relationship between streamID and AdaptationSet can be indicated.

Next, an example of the MPD file generated by the MPD file generating unit 114 of the server 100 in a case where the object selection information is stored in the object selection metadata file described above as Example 4-2 will be described with reference to FIG. 53. FIG. 53 is a view illustrating an example of an MPD file to be generated according to the present example.

In the MPD file in FIG. 53, as indicated in the fourth line, in SupplementalProperty of Preselection, schemeIdUri designates urn:mpeg:dash:objectAudio:objectSelectionMetadataFile, and AdaptationSet@id of the object selection metadata file is designated with a value. In the MPD file in FIG. 53, AdaptationSet@id="m2" is indicated. Further, in the MPD file in FIG. 53, as indicated in the nineteenth line, in AdaptationSet (AdaptationSet@id="m2") of the object selection metadata file, schemeIdUri signals urn:mpeg:dash:objectAudio:objectMetadataFile in SupplementalProperty. This is required in a case where it is necessary to refer to the metadata file to obtain an angle between two objects in a case where "object selection information using an angle between two objects upon display is stored" in objectSelectionMetadata. Signaling of urn:mpeg:dash:objectAudio:objectMetadataStreamID by schemeIdUri in SupplementalProperty is utilized to indicate a file of which AdaptationSet, stream_id signaled within the object selection metadata file indicates.

Note that signaling of urn:mpeg:dash:objectAudio:objectSelectionMetadataFile by schemeIdUri in SupplementalProperty of Preselection can be also applied to a case where the object selection information is stored in the extended metadata file described with reference to FIG. 52.

Further, in AdaptationSet (AdaptationSet@id="m2") of the object selection metadata file, a portion in which schemeIdUri signals urn:mpeg:dash:objectAudio:objectMetadataFile in SupplementalProperty may be indicated with associationId of Representation. Such an example will be described with reference to FIG. 54. FIG. 54 is a view illustrating another example of the MPD file to be generated according to the present example.

In the MPD file illustrated in FIG. 54, in place of <Representation id="op2"> in twenty-first line of the MPD file illustrated in FIG. 53, <Representation id="op2" associationId="op1"> is indicated. In the MPD file illustrated in FIG. 54, schemeIdUri does not utilize urn:mpeg:dash:objectAudio:objectMetadataFile in signaling in SupplementalProperty of AdaptationSet (AdaptationSet@id="m2") of the object selection metadata file.

6-7. Example of Selection of File to be Acquired by Client (Example 4-7)

Figure 55:
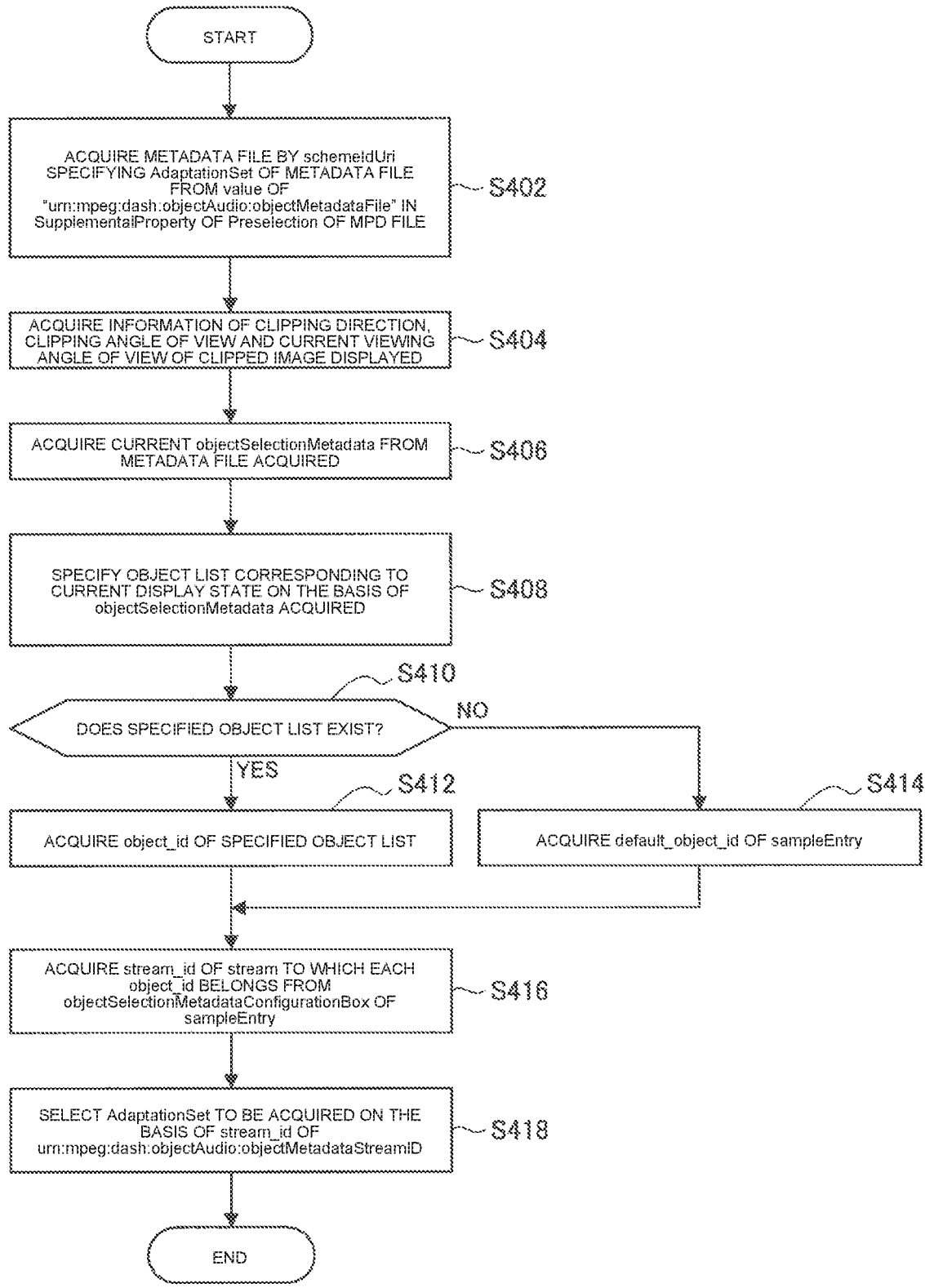
FIG. 55 is a flowchart illustrating an example of a method for selecting a file acquired by the client.

Subsequently, a method for selecting a file to be acquired by the processing unit 210 of the client 200 will be described as Example 4-7. FIG. 55 is a flowchart illustrating an example of a method for selecting a file acquired by the client. Note that FIG. 55 illustrates an example of a selection method in a case where the object selection information is stored in the extended metadata file described with reference to FIG. 32 to FIG. 33 as described with reference to FIG. 36 to FIG. 39, and signaling is performed with the MPD file described with reference to FIG. 52. Further, illustrated in FIG. 55

First, as illustrated in FIG. 55, the processing unit 210 acquires the metadata file from the server 100 by schemeIdUri specifying AdaptationSet of the metadata file from a value of "urn:mpeg:dash:objectAudio:objectMetadataFile" in SupplementalProperty of Preselection of the MPD file (S402). Subsequently, the processing unit 210 acquires information of the clipping direction, the clipping angle of view and the current viewing angle of view of the clipped image displayed by the client 200 (S404). Subsequently, the processing unit 210 acquires current objectSelectionMetadata from the metadata file acquired in step S402 (S406).

Further, the processing unit 210 specifies an object list corresponding to the current display state on the basis of objectSelectionMetadata acquired in step S406 (S408). For example, the object list specified in step S408 may be an object list in which the clipping direction of the clipped image displayed by the client 200 is close to values of direction_azimuth and direction_elevation. Further, the object list specified in step S408 may be an object list in which the clipping angle of view of the clipped image displayed by the client 200 is included in a range of the angle of view indicated by min_clipping_azimuth_range, man_clipping_azimuth_range, min_clipping_elevation_range and min_clipping_elevation_range. Still further, the object list specified in step S408 may be an object list in which the current viewing angle of view is included in a range of the angle of view indicated by min_viewing_azimuth_range, max_viewing_azimuth_range, min_viewing_elevation_range and max_viewing_elevation_range. Note that, in a case where the object list which satisfies the above-described conditions does not exist, the processing unit 210 does not have to specify any object list in step S408.

In a case where the object list corresponding to the current display state is specified (S410: Yes), the processing unit 210 acquires object_id of the specified object list (S412). Meanwhile, in a case where the object list corresponding to the current display state is not specified (S410: No), the processing unit 210 acquires default_object_id of sampleEntry (S414).

Subsequently, the processing unit 210 acquires stream_id of stream to which each object_id belongs from objectSelectionMetadataConfigurationBox of sampleEntry (S416). Further, the processing unit 210 selects AdaptationSet (file) to be acquired on the basis of stream_id of urn:mpeg:dash:objectAudio:objectMetadataStreamID (S418).

Note that the processing from step S402 to S418 illustrated in FIG. 55 can be executed by, for example, the segment file selecting unit 213.

7. Application Example

An embodiment of the present disclosure has been described above. The technology described above in the present disclosure (present technology) can be applied to various kinds of content, and, for example, can be also applied to Multi View content which can be viewed at a plurality of viewing positions. In the following description, an application example in a case where the present technology is applied to Multi View content will be described.

Figure 56:
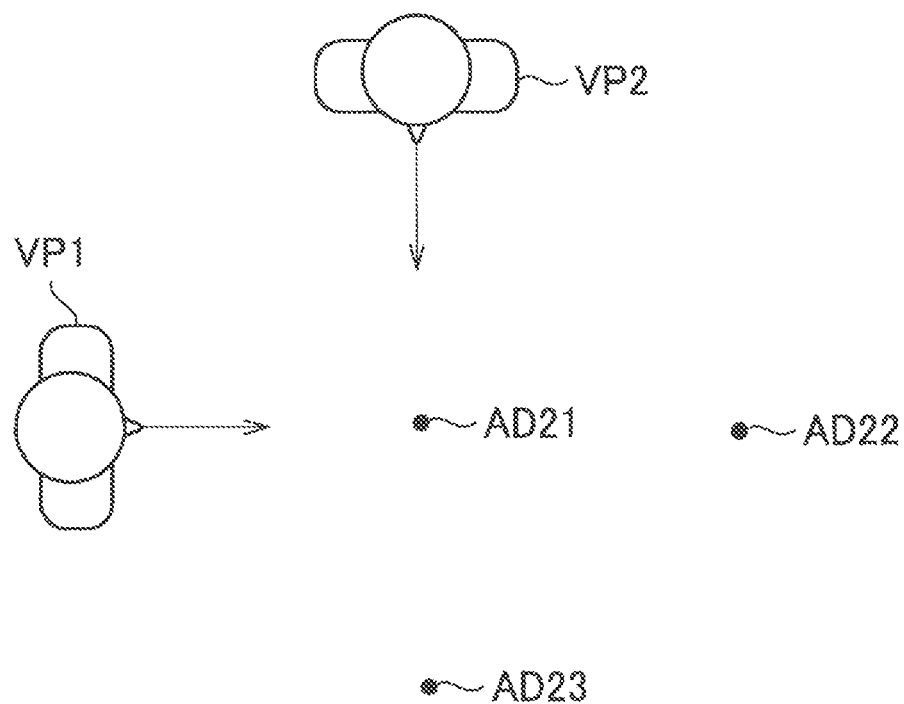
FIG. 56 is an explanatory diagram for explaining an application example.
Figure 57:
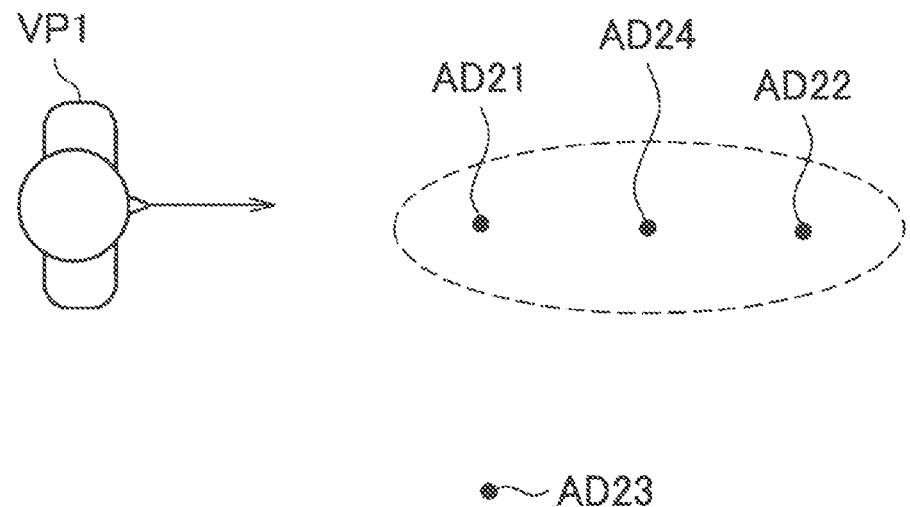
FIG. 57 is an explanatory diagram for explaining an application example.
Figure 58:
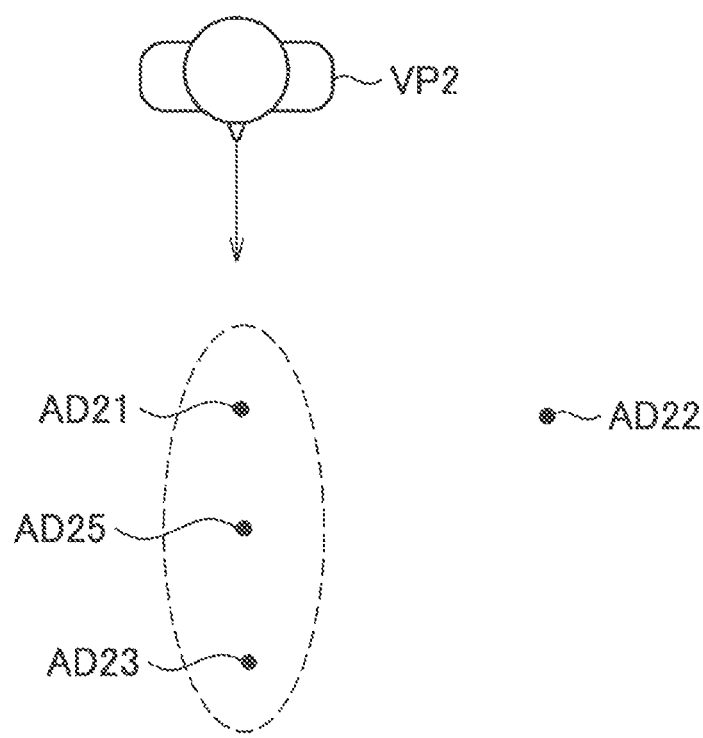
FIG. 58 is an explanatory diagram for explaining an application example.

FIGS. 56 to 58 are explanatory diagrams for explaining an application example. In the following description, a case where three pieces of object audio data AD21 to AD23 exist and two viewing positions VP1 and VP2 exist as illustrated in FIG. 56 will be described.

As illustrated in FIG. 57, in a case where an image is viewed at the viewing position VP1, the object audio data AD21 and the object audio data AD22 appear to overlap with each other. Therefore, object audio data AD24 in which the object audio data AD21 and the object audio data AD22 are integrated is prepared. Then, there can be a case where three pieces of object audio data AD21 to AD23 are utilized, and a case where two pieces of object audio data AD23 and AD24 are utilized in accordance with the display state.

On the other hand, as illustrated in FIG. 58, in a case where an image is viewed at the viewing position VP2, the object audio data AD22 and the object audio data AD23 appear to overlap with each other. Therefore, object audio data AD25 in which the object audio data AD22 and the object audio data AD23 are integrated is prepared. Then, there can be a case where three pieces of object audio data AD21 to AD23 are utilized, and a case where two pieces of object audio data AD22 and AD25 are utilized in accordance with the display state.

As described with reference to FIG. 56 to FIG. 58, there can be a case where object audio data to be utilized differs depending on the viewing position. Also in such a case, in a similar manner to the above-described embodiment, it is only necessary to designate object audio data to be utilized for each viewing position. An example of the MPD file to be generated in such a case will be described with reference to FIG. 59. FIG. 59 is a view illustrating an example of an MPD file to be generated in a case where object audio data to be utilized is different depending on a viewing position. Note that an example of the MPD file to be generated in a case where object audio data to be utilized does not change over time will be described in FIG. 59.

In the example illustrated in FIG. 59, the viewing position is identified using Viewpoint (existing Element utilized in Multi View content). Each Viewpoint indicates combination of AdaptationSet for each display state. view1 corresponding to the viewing position VP1 is indicated by Preselection@id="1", and combination of the predetermined object audio data is o1, o2 and o3, and o3 and o4 are indicated in SupplementalProperty as other kinds of combination. view2 corresponding to the viewing position VP2 is indicated with Preselection@id="2", and combination of the predetermined object audio data is o1, o2 and o3, and o2 and o5 are indicated in SupplementalProperty as other kinds of combination.

Further, the above-described method can be also applied to free viewpoint content. The free viewpoint content is content which can be viewed from free positions within given space. First, Multi View content is prepared, and combination of object audio data to be utilized is determined at a plurality of viewing positions. In this event, each viewing position is indicated by position coordinates being signaled, or the like, with a value of Viewpoint. Upon reproduction, it is only necessary to select Preselection of Viewpoint which is the closest to the desired viewpoint position among viewpoint positions included in Viewpoint and determine objects to be utilized from meta information in Preselection.

8. Hardware Configuration Example

Figure 60:
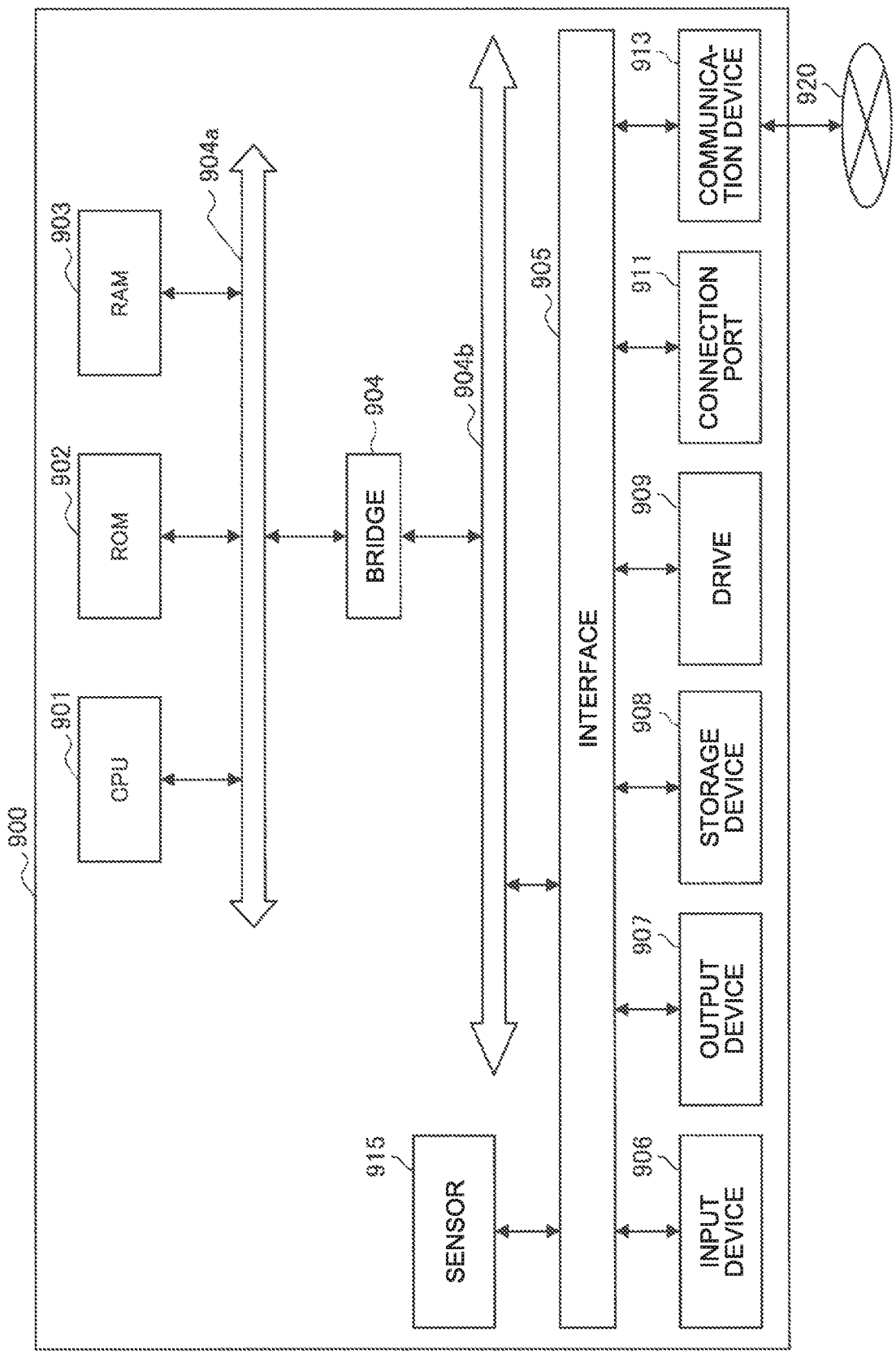
FIG. 60 is an explanatory diagram illustrating a hardware configuration example.

Embodiments of the present disclosure have been described hereinabove. Finally, a hardware configuration of the information processing apparatus according to the present embodiment will be described with reference to FIG. 60. FIG. 60 is a block diagram illustrating an example of a hardware configuration of the information processing apparatus according to the present embodiment. Note that an information processing apparatus 900 illustrated in FIG. 60 can realize, for example, the server 100 and the client 200 illustrated in FIGS. 8 and 9, respectively. The information processing by the server 100 and the client 200 according to the present embodiment is realized by cooperation of software and hardware described below.

As illustrated in FIG. 60, the information processing apparatus 900 includes a central processing unit (CPU) 901, a read only memory (ROM) 902, a random access memory (RAM) 903, and a host bus 904a. Furthermore, the information processing apparatus 900 includes a bridge 904, an external bus 904b, an interface 905, an input device 906, an output device 907, a storage device 908, a drive 909, a connection port 911, a communication device 913, and a sensor 915. The information processing apparatus 900 may include a processing circuit such as a DSP or an ASIC instead of or in addition to the CPU 901.

The CPU 901 functions as an arithmetic processing unit and a control unit, and controls the overall operation in the information processing apparatus 900 according to various programs. Furthermore, the CPU 901 may be a microprocessor. The ROM 902 stores programs, arithmetic parameters, and the like, which are used by the CPU 901. The RAM 903 temporarily stores the programs used in the execution of the CPU 901 and the parameters that suitably vary in this execution, and the like. The CPU 901 can form, for example, the generating unit 110, a control unit 120, processing unit 210, and the control unit 220.

The CPU 901, the ROM 902, and the RAM 903 are mutually connected by the host bus 904a including a CPU bus and the like. The host bus 904a is connected with the external bus 904b such as a peripheral component interconnect/interface (PCI) bus via the bridge 904. The host bus 904a, the bridge 904, and the external bus 904b are not necessarily separately configured, and these functions may be implemented on one bus.

The input device 906 is implemented by, for example, a device such as a mouse, a keyboard, a touch panel, buttons, a microphone, a switch, and a lever to which information is input by the user. Furthermore, the input device 906 may be, for example, a remote control device using infrared rays or other radio waves, or may be an external connection device such as a mobile phone or a PDA corresponding to the operation of the information processing apparatus 900. Furthermore, the input device 906 may include, for example, an input control circuit that generates an input signal based on the information input by the user using the input means described above, and outputs the generated input signal to the CPU 901. The user of the information processing apparatus 900 can input various data to the information processing apparatus 900 and give an instruction on processing operations by operating the input device 906.

The output device 907 is formed of a device capable of visually or aurally notifying the user of the acquired information. As such devices, there are a display device such as a CRT display device, a liquid crystal display device, a plasma display device, an EL display device, or a lamp, a voice output device such as a speaker and a headphone, a printer device, and the like. The output device 907 outputs, for example, results obtained by various processes performed by the information processing apparatus 900. Specifically, the display device visually displays the results obtained by the various processes performed by the information processing apparatus 900 in various formats, such as text, image, table, and graph. The voice output device converts an audio signal composed of reproduced audio data, acoustic data, and the like into an analog signal and aurally outputs it. The output device 907 may form, for example, the display unit 260 and the speaker 270.

The storage device 908 is a device for data storage formed as an example of a storage unit of the information processing apparatus 900. The storage device 908 is implemented by, for example, a magnetic storage unit device such as an HDD, a semiconductor storage device, an optical storage device, a magneto-optical storage device, or the like. The storage device 908 may include a storage medium, a recording device for recording data on the storage medium, a reading device for reading data from the storage medium, a deletion device for deleting data recorded on the storage medium, and the like. The storage device 908 stores programs and various types of data executed by the CPU 901, various types of data acquired from the outside, and the like. The storage device 908 may form, for example, the storage unit 140 and the storage unit 240.

The drive 909 is a reader/writer for a storage medium, and is built in or externally attached to the information processing apparatus 900. The drive 909 reads information recorded in a removable storage medium such as a mounted magnetic disk, optical disk, magneto-optical disk, or semiconductor memory, and outputs the information to the RAM 903. In addition, the drive 909 can write information into the removable storage medium.

The connection port 911 is an interface connected to an external device, and serves as a connection port to an external device capable of transmitting data by universal serial bus (USB), for example.

The communication device 913 is, for example, a communication interface formed of a communication device or the like for connecting to a network 920. The communication device 913 is a communication card or the like for a wired or wireless local area network (LAN), long term evolution (LTE), Bluetooth (registered trademark), or wireless USB (WUSB), for example. In addition, the communication device 913 may be a router for optical communication, a router for asymmetric digital subscriber line (ADSL), various communication modems, or the like. The communication device 913 can transmit and receive signals and the like according to a predetermined protocol such as TCP/IP, for example, over the Internet or with another communication device. The communication device 913 may form, for example, the communication unit 130 and the communication unit 230.

The sensor 915 corresponds to various types of sensors such as an acceleration sensor, a gyro sensor, a geomagnetic sensor, a light sensor, a sound sensor, a distance measuring sensor, and a force sensor, for example. The sensor 915 acquires information regarding a state of the information processing apparatus 900 such as a posture of a housing of the information processing apparatus 900, and information regarding an environment surrounding the information processing apparatus 900 such as luminous intensity and noise around the information processing apparatus 900. In addition, the sensor 915 may include a GPS sensor that receives a GPS signal, and measures latitude, longitude, and altitude of the device. The sensor 915 may form, for example, the sensor unit 250.

The network 920 is a wired or wireless transmission path of information transmitted from a device connected to the network 920. For example, the network 920 may include a public circuit network such as the Internet, a telephone circuit network, or a satellite communication network, various local area networks (LANs) including Ethernet (registered trademark), a wide area network (WAN), and the like. The network 920 may also include a dedicated line network such as an Internet protocol-virtual private network (IP-VPN).

As described above, an example of the hardware configuration capable of realizing the functions of the information processing apparatus 900 according to the present embodiment of the present disclosure has been described. The above-described components may be implemented using universal members, or may be implemented by hardware specific to the function of the respective components. Therefore, the hardware configuration to be used can be changed as appropriate according to the technical level of the time of carrying out the present embodiment of the present disclosure.

Note that a computer program for realizing each function of the information processing apparatus 900 according to the above-described present embodiment of the present disclosure can be prepared and implemented on a PC or the like. In addition, a computer-readable recording medium on which such a computer program is stored can also be provided. The recording medium is a magnetic disc, an optical disc, a magneto-optical disc, a flash memory, or the like, for example. Furthermore, the above-described computer program may be distributed via, for example, a network without using any recording medium.

9. Conclusion

As described above, according to the embodiment of the present disclosure, it is possible to select object audio data in accordance with a display state. For example, it becomes possible to hear sound from a more appropriate position which suits a viewing environment when object audio data is streamed using MPEG-DASH. Further, in a case where the display state changes by zoom-in or zoom-out, the user can have an experience in which sound comes from an appropriate position in accordance with an image at that time. Still further, it is possible to file object audio data so that both an amount of data to be stored in the server and the number of files to be acquired by the client are suppressed. Therefore, a transmission amount is reduced so that it can become possible to increase, for example, a bit rate of other data to be acquired.

While the preferred embodiments of the present disclosure have been described in detail above with reference to the accompanying drawings, the technical scope of the present disclosure is not limited to such examples. It will be apparent to those skilled in the art of the present disclosure that various modifications and alterations can be conceived within the scope of the technical idea described in the claims and naturally fall within the technical scope of the present disclosure.

Furthermore, the effects described in this specification are merely illustrative or exemplified effects, and are not limitative. That is, the technology according to the present disclosure can exhibit other effects obvious to those skilled in the art from the description of the present specification in addition to or in place of the above-described effects.

Note that the following configurations come under the technical scope of the present disclosure.

(1)
An information processing apparatus comprising:
a generating unit configured to generate a content file including object selection information for selecting object audio data in accordance with a display state of an image,
wherein the generating unit stores the object selection information in a metadata file included in the content file.

(2)
The information processing apparatus according to (1), wherein the metadata file is a file for which standards are defined in ISO/IEC 14496-12.

(3)
The information processing apparatus according to (2), wherein the object selection information is stored in sampleEntry in a moov box of the metadata file.

(4)
The information processing apparatus according to (3), wherein the object selection information is stored in objectSelectionMetadataConfigurationBox included in the sampleEntry.

(5)
The information processing apparatus according to (4), wherein the object selection information includes audio file access information for accessing an audio file in which the object audio data is stored.

(6)
The information processing apparatus according to (5), wherein the audio file access information includes streamID.

(7)
The information processing apparatus according to any one of (1) to (6), wherein the object selection information includes direction information regarding a direction of a clipped image.

(8)
The information processing apparatus according to (7), wherein the direction information includes information of an angle in a horizontal direction and information of an angle in a vertical direction.

(9)
The information processing apparatus according to (8), wherein the direction information further includes information of a range of an angle from a clipping direction vector.

(10)
The information processing apparatus according to (7), wherein the direction information includes information of a range of an angle in a horizontal direction and information of a range of an angle in a vertical direction.

(11)
The information processing apparatus according to any one of (1) to (10), wherein the object selection information includes angle of view information regarding an angle of view of a clipped image or an angle of view upon viewing with respect to a displayed image.

(12)
The information processing apparatus according to (11), wherein the angle of view information includes information of a range of a horizontal angle of view and information of a range of a vertical angle of view.

(13)
The information processing apparatus according to (11), wherein the angle of view information includes information of a range of magnification with respect to a reference angle of view.

(14)
The information processing apparatus according to any one of (1) to (6), wherein the object selection information includes position information of two objects between which an angle is to be calculated.

(15)
The information processing apparatus according to (14), wherein the object selection information further includes angle information regarding an angle between the two objects.

(16)
The information processing apparatus according to any one of (1) to (15), wherein the object selection information includes information regarding the object audio data to be utilized.

(17)
An information processing method to be executed by an information processing apparatus, the information processing method comprising:
generating a content file including object selection information for selecting object audio data in accordance with a display state of an image,
wherein the object selection information is stored in a metadata file included in the content file.

(18)
A program for causing
a computer to realize:
a function of generating a content file including object selection information for selecting object audio data in accordance with a display state of an image,
wherein the object selection information is stored in a metadata file included in the content file.

(19)
An information processing apparatus, including: a processing unit configured to acquire a content file including object selection information for selecting object audio data in accordance with a display state of an image,
in which the object selection information is stored in a metadata file included in the content file.

(20)
The information processing apparatus according to (19), in which the metadata file is a file for which standards are defined in ISO/IEC 14496-12.

(21)
The information processing apparatus according to (20), in which the object selection information is stored in sampleEntry in a moov box of the metadata file.

(22)

The information processing apparatus according to (21), in which the object selection information is stored in objectSelectionMetadataConfigurationBox included in the sampleEntry.

(23)

The information processing apparatus according to (22), in which the object selection information includes audio file access information for accessing an audio file in which the object audio data is stored.

(24)

The information processing apparatus according to (23), in which the audio file access information includes streamID.

(25)

The information processing apparatus according to any one of (19) to (24), in which the object selection information includes direction information regarding a direction of a clipped image.

(26)

The information processing apparatus according to (25), in which the direction information includes information of an angle in a horizontal direction and information of an angle in a vertical direction.

(27)

The information processing apparatus according to (26), in which the direction information further includes information of a range of an angle from a clipping direction vector.

(28)

The information processing apparatus according to (25), in which direction information includes information of a range of an angle in a horizontal direction and information of a range of an angle in a vertical direction.

(29)

The information processing apparatus according to any one of (19) to (28), in which the object selection information includes angle of view information regarding an angle of view of a clipped image or an angle of view upon viewing with respect to a displayed image.

(30)

The information processing apparatus according to (29), in which the angle of view information includes information of a range of a horizontal angle of view and information of a range of a vertical angle of view.

(31)

The information processing apparatus according to (29), in which the angle of view information includes information of a range of magnification with respect to a reference angle of view.

(32)

The information processing apparatus according any one of (19) to (24), in which the object selection information includes position information of two objects between which an angle is to be calculated.

(33)

The information processing apparatus according to (32), in which the object selection information further includes angle information regarding an angle between the two objects.

(34)

The information processing apparatus according to any one of (19) to (33), in which the object selection information includes information regarding the object audio data to be utilized.

(35)

An information processing method to be executed by an information processing apparatus, the information processing method including: acquiring a content file including object selection information for selecting object audio data in accordance with a display state of an image, in which the object selection information is stored in a metadata file included in the content file.

(36)

A program for causing a computer to realize:

a function of acquiring a content file including object selection information for selecting object audio data in accordance with a display state of an image, in which the object selection information is stored in a metadata file included in the content file.

REFERENCE SIGNS LIST

100 Server
110 Generation unit
111 Data acquiring unit
112 Encoding processing unit
113 Segment file generating unit
114 File generating unit
120 Control unit
130 Communication unit
140 Storage unit
200 Client
210 Processing unit
211 File acquiring unit
212 File processing unit
213 Segment file selecting unit
214 Segment file acquiring unit
215 Decoding processing unit
216 Synthesis processing unit
220 Control unit
230 Communication unit
240 Storage unit
250 Sensor unit
260 Display unit
270 Speaker

The invention claimed is:

1. An information processing apparatus comprising:
a generating unit configured to generate a content file including object selection information for selecting object audio data in accordance with a display state of an image,
wherein the generating unit stores the object selection information in a metadata file included in the content file,
wherein the object selection information includes angle of view information regarding an angle of view of a clipped image or an angle of view upon viewing with respect to a displayed image,
wherein the angle of view information includes information of a range of magnification with respect to a reference angle of view, and
wherein the generating unit is implemented via at least one processor.

2. The information processing apparatus according to claim 1, wherein the metadata file is a file for which standards are defined in ISO/IEC 14496-12.

3. The information processing apparatus according to claim 2, wherein the object selection information is stored in sampleEntry in a moov box of the metadata file.

4. The information processing apparatus according to claim 3, wherein the object selection information is stored in objectSelectionMetadataConfigurationBox included in the sampleEntry.

5. The information processing apparatus according to claim 4, wherein the object selection information includes audio file access information for accessing an audio file in which the object audio data is stored.

6. The information processing apparatus according to claim 5, wherein the audio file access information includes streamID.

7. The information processing apparatus according to claim 1, wherein the object selection information includes direction information regarding a direction of a clipped image.

8. The information processing apparatus according to claim 7, wherein the direction information includes information of an angle in a horizontal direction and information of an angle in a vertical direction.

9. The information processing apparatus according to claim 8, wherein the direction information further includes information of a range of an angle from a clipping direction vector.

10. The information processing apparatus according to claim 7, wherein the direction information includes information of a range of an angle in a horizontal direction and information of a range of an angle in a vertical direction.

11. The information processing apparatus according to claim 1, wherein the angle of view information includes information of a range of a horizontal angle of view and information of a range of a vertical angle of view.

12. The information processing apparatus according to claim 1, wherein the object selection information further includes angle information regarding an angle between the two objects.

13. The information processing apparatus according to claim 1, wherein the object selection information includes information regarding the object audio data to be utilized.

14. An information processing apparatus comprising:
a generating unit configured to generate a content file including object selection information for selecting object audio data in accordance with a display state of an image,
wherein the generating unit stores the object selection information in a metadata file included in the content file,
wherein the object selection information includes position information of two objects between which an angle is to be calculated, and
wherein the generating unit is implemented via at least one processor.

15. A reproduction apparatus comprising:
circuitry configured to initiate reproduction based on a content file including object selection information for selecting object audio data in accordance with a display state of an image,
wherein the object selection information is stored in a metadata file included in the content file,
wherein the object selection information includes angle of view information regarding an angle of view of a clipped image or an angle of view upon viewing with respect to a displayed image, and
wherein the angle of view information includes information of a range of magnification with respect to a reference angle of view.

16. A reproduction apparatus comprising:
circuitry configured to initiate reproduction based on a content file including object selection information for selecting object audio data in accordance with a display state of an image,
wherein the object selection information is stored in a metadata file included in the content file,
wherein the object selection information includes position information of two objects between which an angle is to be calculated.

* * * * *